(12) United States Patent
Ghassabian

(10) Patent No.: US 11,221,756 B2
(45) Date of Patent: Jan. 11, 2022

(54) DATA ENTRY SYSTEMS

(71) Applicant: KEYLESS SYSTEMS LTD., Jerusalem (IL)

(72) Inventor: Benjamin Firooz Ghassabian, Jerusalem (IL)

( * ) Notice: Subject to any disclaimer, the term of this patent is extended or adjusted under 35 U.S.C. 154(b) by 137 days.

(21) Appl. No.: 15/554,218

(22) PCT Filed: Mar. 31, 2016

(86) PCT No.: PCT/US2016/025127
§ 371 (c)(1),
(2) Date: Aug. 29, 2017

(87) PCT Pub. No.: WO2016/161056
PCT Pub. Date: Oct. 6, 2016

(65) Prior Publication Data
US 2018/0081539 A1     Mar. 22, 2018

Related U.S. Application Data

(60) Provisional application No. 62/297,890, filed on Feb. 21, 2016, provisional application No. 62/287,077, filed on Jan. 26, 2016, provisional application No. 62/278,536, filed on Jan. 14, 2016, provisional application No. 62/245,300, filed on Oct. 23, 2015, provisional application No. 62/209,427, filed on Aug. 25, 2015, provisional application No. 62/205,011, filed on Aug. 14, 2015, provisional application No. 62/193,176, filed on Jul. 16, 2015, provisional application No. 62/188,785, filed on Jul. 6, 2015, provisional application No. 62/156,404, filed on May 4, 2015, provisional application No. 62/146,322, filed
(Continued)

(51) Int. Cl.
*G06F 3/0488*     (2013.01)
*G06F 3/023*      (2006.01)
*G06F 40/274*     (2020.01)

(52) U.S. Cl.
CPC ........ *G06F 3/04886* (2013.01); *G06F 3/0233* (2013.01); *G06F 3/0236* (2013.01); *G06F 3/0237* (2013.01); *G06F 40/274* (2020.01); *G06F 2203/04803* (2013.01)

(58) Field of Classification Search
CPC .............. G06F 3/04886; G06F 3/0236; G06F 2203/04803; G06F 3/0237; G06F 40/274; G06F 3/0233; G04G 21/00; H04M 2250/70
See application file for complete search history.

(56) References Cited

U.S. PATENT DOCUMENTS

| 6,053,647 A * | 4/2000 | Parkinson ............. G06F 3/0219 400/486 |
| 9,189,472 B2 * | 11/2015 | Medlock ............... G06F 40/274 |
| 10,275,152 B2 * | 4/2019 | Fallah .................. G06F 3/0488 |

(Continued)

OTHER PUBLICATIONS

PCT Written Opinion, PCT/US2016/025127, dated Jul. 26, 2016.

*Primary Examiner* — Nicholas Ulrich

(57) ABSTRACT

A keyboard is divided into a number of large zones each large zone having a number of small zones. The large zones, together, include substantially all of the letters of a language. A word predictive system analyzes the user's interaction with the large zones relating to the small zones to predict a word.

6 Claims, 18 Drawing Sheets

Related U.S. Application Data on Apr. 12, 2015, provisional application No. 62/140,602, filed on Mar. 31, 2015.

(56) References Cited

U.S. PATENT DOCUMENTS

| | | | |
|---|---|---|---|
| 2003/0189553 A1* | 10/2003 | Goren | G06F 3/04886 345/173 |
| 2007/0079239 A1* | 4/2007 | Ghassabian | G06F 3/014 715/707 |
| 2007/0100635 A1* | 5/2007 | Mahajan | G10L 15/22 704/276 |
| 2007/0130128 A1* | 6/2007 | Garg | G06F 3/0236 |
| 2007/0161400 A1* | 7/2007 | Sharp | G06F 3/0234 455/550.1 |
| 2008/0168366 A1* | 7/2008 | Kocienda | G06F 3/0237 715/764 |
| 2009/0049395 A1* | 2/2009 | Lee | H04N 7/147 715/765 |
| 2009/0088217 A1* | 4/2009 | Chung | G06F 3/04886 455/566 |
| 2010/0020033 A1* | 1/2010 | Nwosu | G06F 3/04883 345/173 |
| 2011/0167375 A1* | 7/2011 | Kocienda | G06F 1/3203 715/773 |
| 2011/0193797 A1* | 8/2011 | Unruh | G06F 3/0237 345/173 |
| 2011/0302518 A1* | 12/2011 | Zhang | G06F 3/0234 715/773 |
| 2013/0046544 A1* | 2/2013 | Kay | G06F 3/04883 704/275 |
| 2013/0080965 A1* | 3/2013 | Whytock | G06F 3/04886 715/773 |
| 2013/0249818 A1* | 9/2013 | Zhai | G06F 3/04886 345/173 |
| 2013/0307781 A1* | 11/2013 | Ghassabian | G06F 3/0487 345/168 |
| 2014/0201671 A1 | 7/2014 | Zhai | |
| 2015/0121285 A1* | 4/2015 | Eleftheriou | G06F 3/04842 715/773 |
| 2015/0143255 A1* | 5/2015 | Agrawal | H04L 51/02 715/752 |
| 2015/0160856 A1* | 6/2015 | Jang | G06F 3/04886 715/773 |
| 2015/0370365 A1* | 12/2015 | Lee | G06F 3/04886 345/174 |
| 2016/0098160 A1* | 4/2016 | Groset | G06F 3/0482 345/156 |
| 2017/0052702 A1* | 2/2017 | Norris, III | G06F 3/0482 |

* cited by examiner

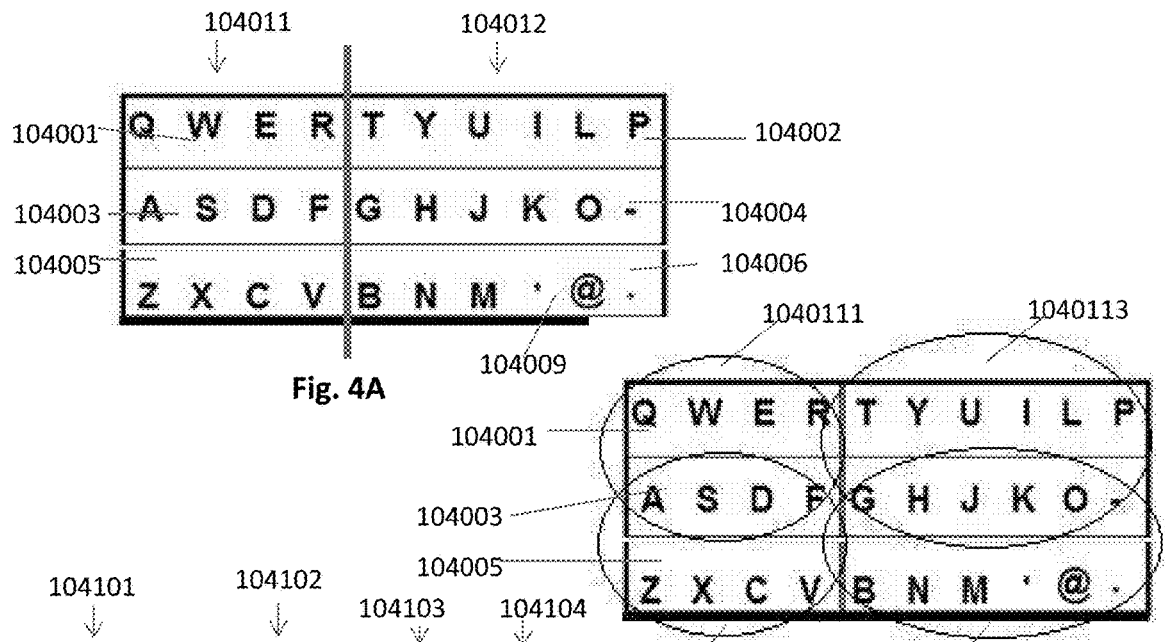
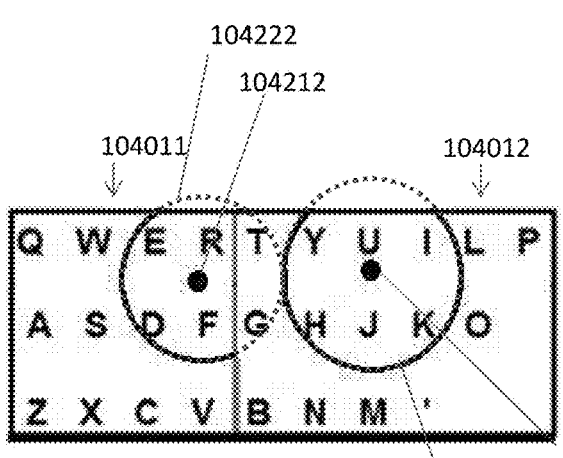
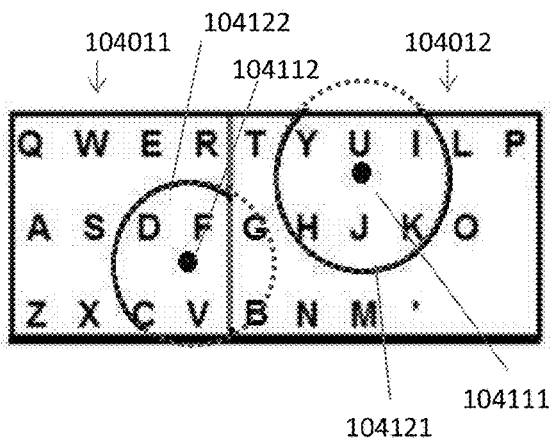
Fig. 4A
Fig. 4B
Fig. 4C
Fig. 4D
Fig. 4E

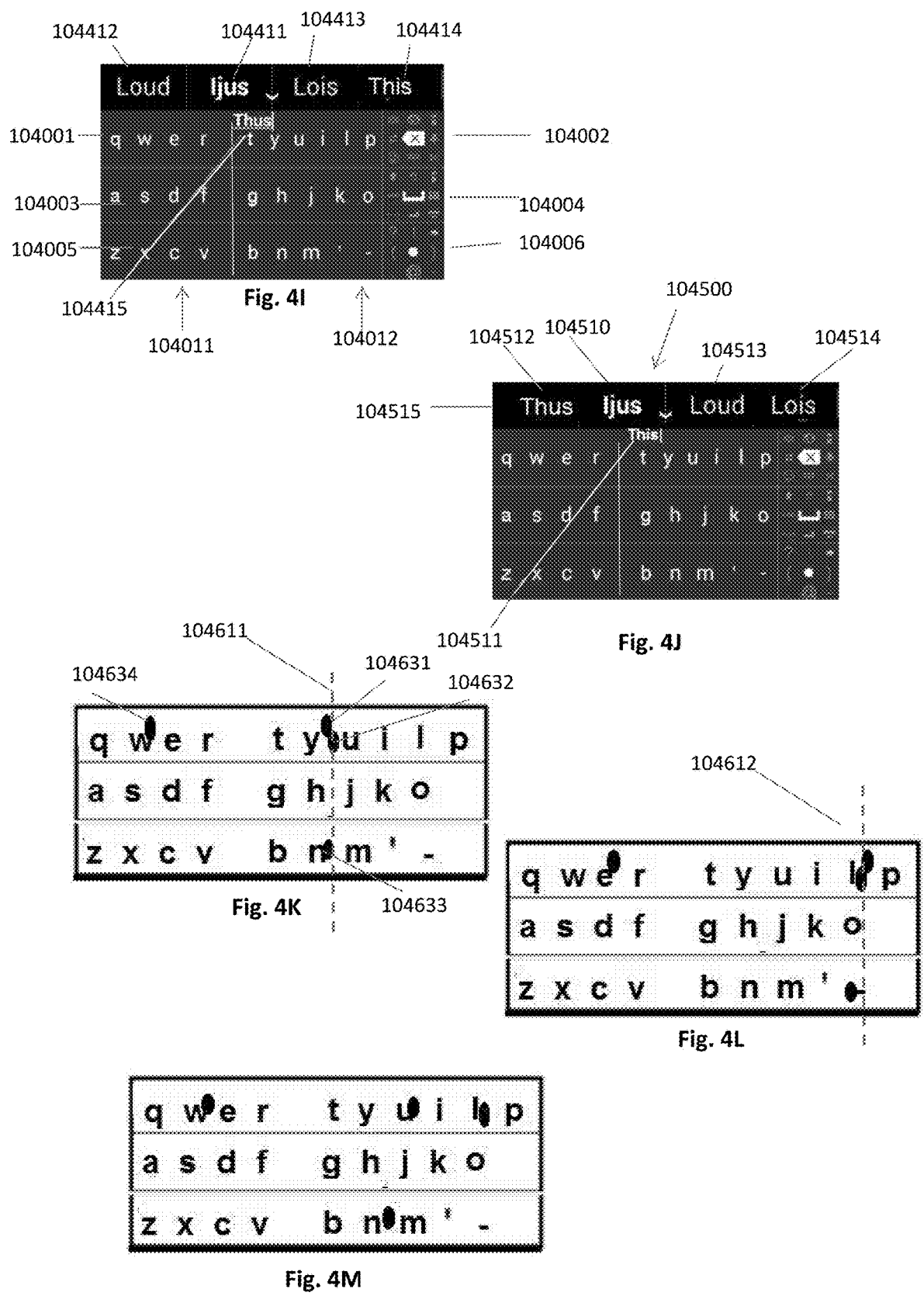

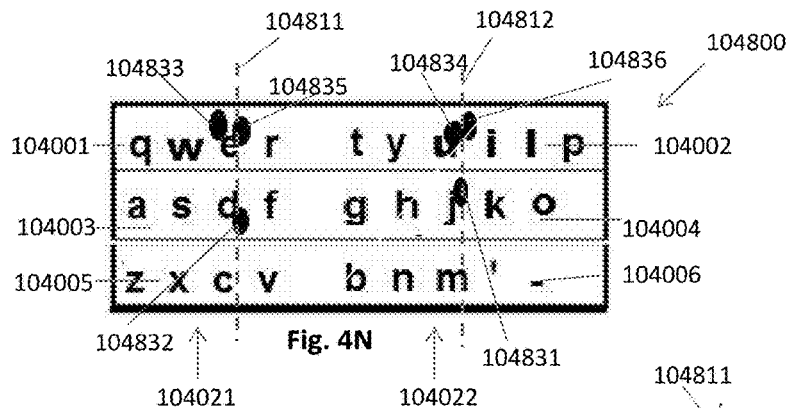
Fig. 4N
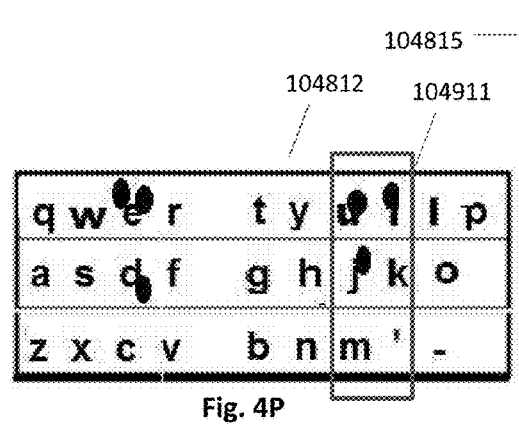
Fig. 4P
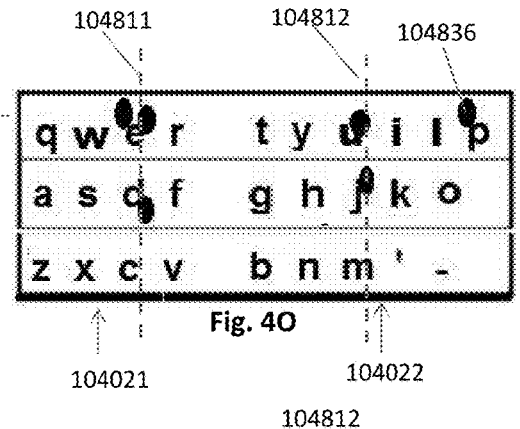
Fig. 4O
Fig. 4Q
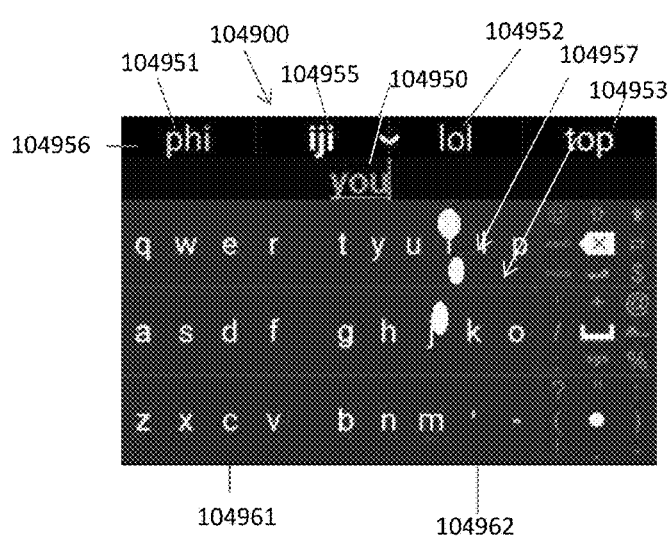
Fig. 4R
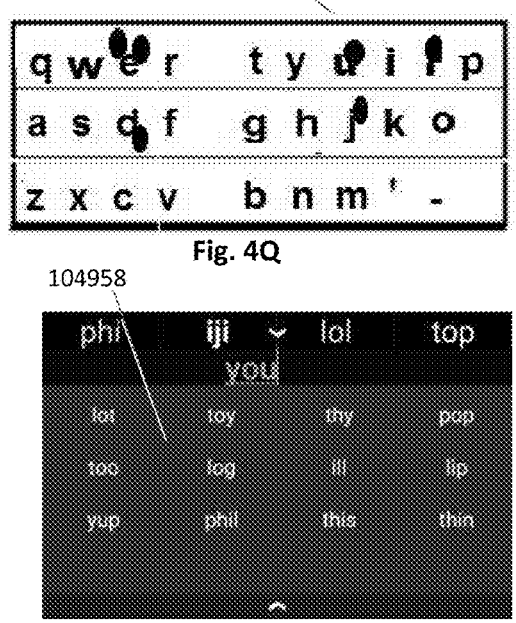
Fig. 4S

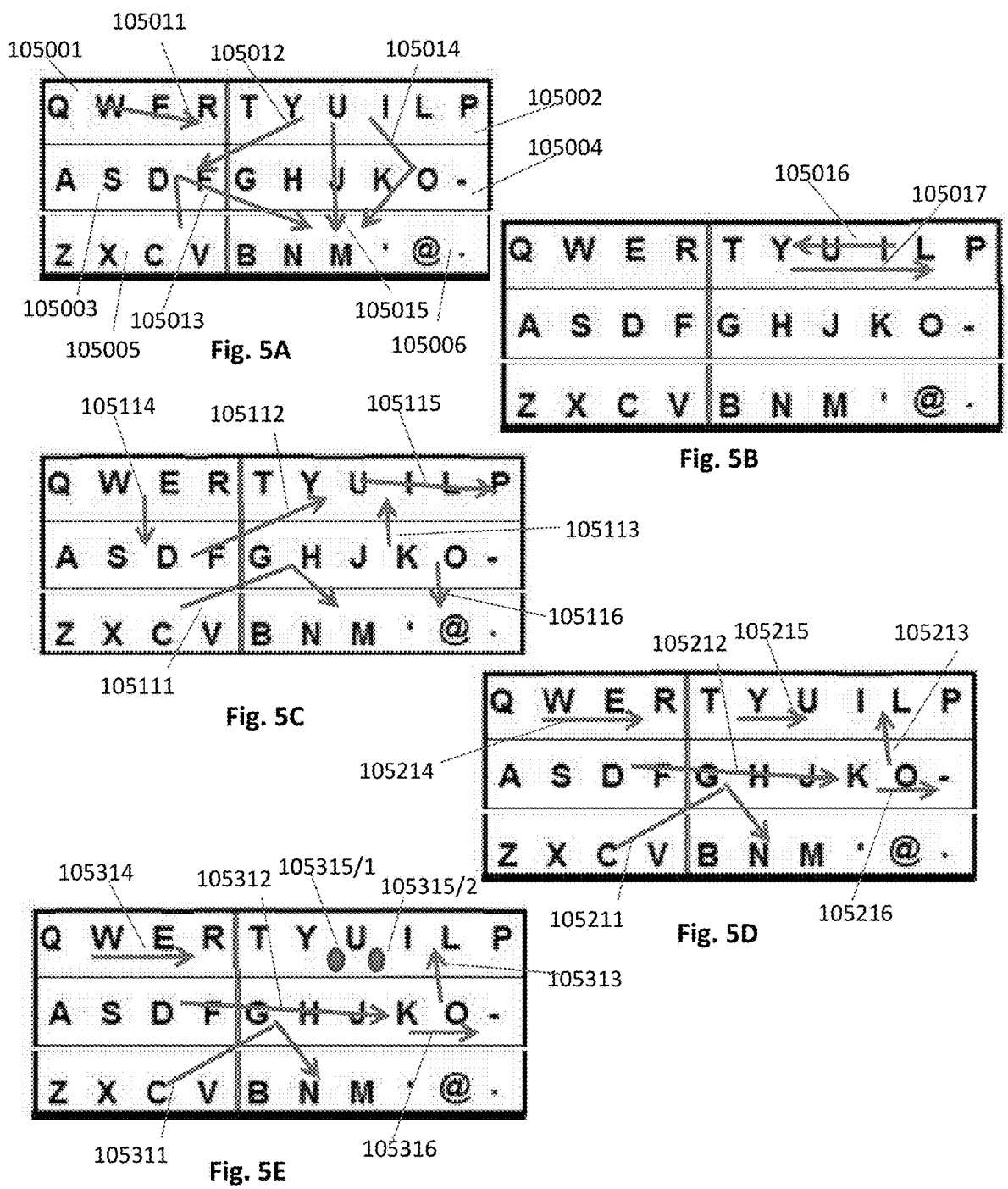

Fig. 5G How

DATA ENTRY SYSTEMS

The present application claims priority from U.S. provisional patent applications: application No. 62/131,914 filed on Mar. 12, 2015, application No. 62/140,602 filed on Mar. 31, 2015, application No. 62/146,322 filed on Apr. 12, 2015, application No. 62/156,404 filed on May 4, 2015, application No. 62/188,785 filed on Jul. 6, 2015, application No. 62/193,176 filed on Jul. 16, 2015, application No. 62/205,011 filed on Aug. 12, 2015, application No. 62/209,427 filed on Aug. 25, 2015, application No. 62/245,300 filed on Oct. 23, 2015, application No. 62/278,536 filed on Jan. 14, 2015, application No. 62/287,077 filed on Jan. 26, 2015, application No. 62/297,890 filed on Feb. 21, 2016, which are entirely incorporated herein by reference. The present application also benefits from PCT applications: PCT/US13/26044, PCT/US14/16777, and PCT/US15/17638, which are entirely incorporated herein by reference.

FIELD OF THE INVENTION

The present invention relates to data input systems and particularly systems and methods for entering letters, words, other symbols and/or other information. The present invention also relates to a method of social interaction by texting on virtual content(s) such as a picture or a video, controlling and/or securing contents.

For simplicity and clarity of illustration, reference numerals may be repeated among the figures to indicate corresponding or analogous elements. Also, similarly named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the example embodiments described herein. The description is not to be considered as limited to the scope of the example embodiments described herein.

BACKGROUND OF THE INVENTION

Mobile devices including cellular phones, personal digital aids and miniature computers are widely used as they are easily carried around and can perform many tasks. One problem of mobile device(s) is text entry, which is problematic because of the small size of a device. One solution for text entry in mobile devices is using a limited key set in which at least some of the keys are ambiguously associated with a plurality of letters. Upon receiving a sequence of key interactions (e.g. providing a sequence of input signals, which herein be referred to as 'input information') corresponding/relating to a desired word, a word predictive system may predict/propose one or more words from a dictionary/database of words. A word (e.g. with highest priority) may be presented by the system and may be entered by providing a predefined interaction such as pressing the space key. Such a word may herein be referred to as 'current word'). The problem of such system is that when a word is not in the database the user must use another method of text entry.

Another problem of mobile devices is how to enter easily symbols other than letters. With the emergence of devices having touch screens, on screen full (e.g. QWERTY) keyboard systems are used on most devices. Due to the size of mobile devices, and the number of keys of a full keyboard, such keys are reduced in size rendering the keyboard cumbersome and the data entry slow. The screen of a device is intended to display the output. A real mobile data entry system must be mobile, enabling to enter data in any environment such as while standing, walking, in the dark, etc. In addition, such system must preferably free the screen from an input interface (e.g. a keyboard) that occupies a large portion of the screen.

SUMMARY OF THE INVENTION

The data entry system, described in this application, provides a system that is adapted to mobile environments. It is also intuitive, accurate, fast, and easy to understand and use.

An aspect of the inventions relates to an input interface (e.g. herein may be referred to as a keyboard) having a plurality of input means and a processor adapted to relate an input signal received by/through an interaction with an input means to an unambiguous character (e.g. herein such an input signal may be referred to as unambiguous/identified input signal, and such a character may be referred to as identified/precise character) and/or to ambiguously relate said interaction to any character of a group of characters assigned to an/said input means (e.g. herein such an input signal may be referred to as ambiguous input signal, and such a character may be referred to as ambiguous character). Preferably, said input signals are together associated with all of the letters of a language such as the Latin/Roman alphabet or a phonetic alphabet.

Optionally, and interaction with an input means is related to an identified characters. Optionally an interaction with an input is ambiguously related to any character of a group of characters assigned to said input means and/or to an identified character (e.g. such an input means may herein be referred to as an ambiguous key or a (ambiguous) zone).

An aspect of some embodiments of the invention relates to an input interface (e.g. hereafter may be referred to as keypad/keyboard) having (e.g. at least) a number (e.g. few, such as 4 to 12) of its input means wherein interacting with any of at least some of said input means is related by a processor to any of a plurality of characters assigned to said input means and/or to an identified character (e.g. on which the interaction impact is provided), and wherein interacting with any of at least some other of said input means is related by a processor to an identified character.

Optionally, at least some of said input means are hard/physical keys. Preferably, said input means are touch sensitive keys such as on-screen keys. Optionally, said input means are predefined input means. Optionally, at least some of said input means are dynamically defined upon interacting with a location of the input interface. Such an input means may herein be referred to as a dynamic zone/key. Optionally, the assignment of a group of characters to a dynamic zone may vary based on some parameters such as where and/or how said interaction is provided. Preferably, said input means together represent all of the letters of an alphabet.

An aspect of some embodiments of the invention relates to an input interface adapted to identify user interactions with the input interface and to associate at least some of the user interactions with different types of input signals.

An aspect of the invention relates to a word predictive data entry system using a keyboard having a number of large zones each including a number of letters. Preferably, each of the large zones has a number of small zones wherein at least one, preferably each, of the small zones including some of the letters of a large zone. Preferably, said keyboard is a traditional keyboard (e.g., QWERTY, AZERTY, QWERTZ, etc.). Preferably, the small zones are linear (e.g. preferably horizontal) zones wherein at least one (e.g. preferably each) small zone having at least some of the letters of a corresponding row of letters of the keyboard. The keyboard may have soft/virtual keys and of physical/hard keys. Preferably, the keyboard has two large zones each including three small zones. According to one method, small zone may substantially include all of the letters of a row of the keyboard. In this case, according to one aspect, a keyboard may have three small zones each substantially including all of the letters of a corresponding row of the keyboard, and a single large zone that includes said small zones.

An aspect of the invention relates to some embodiments regarding a word prediction system/data entry system that uses a keyboard having a few large zones, together including all the letters (e.g. alphabetic, phonetic, etc.) of a language. Preferably, each large zone includes a number of small zones, each small zone having a portion of the characters of its corresponding large zone. Preferably, said small zones are linear zone, preferably horizontal zone, Optionally wherein at least some them having at a plurality of the letters of a row of letters of the keyboard, the/a word prediction system predicts words by considering users interactions with large and/or small zones. Various methods of prediction based on the principles of interaction with large and/or small zones are considered. Optionally, factors/principles such as a word's frequency of use, words that their (e.g. corresponding) characters best match the large zone interactions, words that their (e.g. corresponding) characters best match the small zone interactions, words that at least some of their characters are entered precisely, etc. are considered to predict one or more words. Preferably, the keyboard is a virtual (e.g. on-screen) keyboard. Optionally, the keyboard has physical keys. Optionally, the keyboard has a combination of virtual/soft and physical/hard keys. In a preferred method, the system may preferably consider words that all of their characters match the large zone interactions.

An aspect of the invention relates to dividing at least a large portion, preferably all, of the letters of a keyboard into a number of (e.g. preferably two) large zones, wherein each large zone having a number of (e.g. preferably three) small zones. According to one aspect, an interaction with a small zone may ambiguously be related by a processor to any of the characters assigned to said small zone and/or it may ambiguously be related to any of the characters of the corresponding large zone. In some cases (e.g. with less priority), said interaction may be related to any other character of the keyboard. For ease of description, herein, such a large zone may be referred to as "broadly ambiguous zone" and such a small zone may be referred to as "narrowly ambiguous zone" or vise versa. Note that the word letter used herein may also be related to a special character too.

Because interactions with the large zones are generally accurate because of the size of the large zone, preferably, upon receiving a sequence of interactions with the zones, the system may first choose a number of words of a database that correspond to said interactions in/with the large zone. This filtering method may dramatically reduce the number of possible choices corresponding to said interactions. Among said chosen words the system preferably select one or more words based on said interactions with the small zones. Different, methods of selecting such words are described throughout this application.

An aspect of some embodiments of the invention relates to a procedure of auto correction, assisting a user to correctly enter a word upon mistyping a few (e.g. one or more) of its characters. For such purpose (e.g. upon meeting one or more conditions) within a received sequence of interactions with the keys/zones of the keyboard, the processor may relate an (e.g. one or more) interaction with a zone/key to a character of another zone/key.

An aspect of the invention is related to a virtual keyboard having two large zones being split and positioned on opposite sides on a touch sensitive surface.

Preferably, the input interface is used with a word prediction system/software wherein upon/during receiving a sequence of one or more interactions with the input interface (e.g. the input information), the system predicts one or more words from the corresponding entries of a database of words used by the system. A word predictive system/software predicting words as such is known by people skilled in the art and some of such software (e.g. T9, iTap, or auto correction software used with an on-screen QWERTY keyboard wherein an interaction with a key may ambiguously be related to said key and some of the surrounding keys, et.) are implemented in a variety of mobile devices.

Preferably, each/some of the small zones has a plurality of letters. Preferably, at least one of the small zones includes also at least one special character. Preferably, upon an interaction with such a zone, the system ambiguously relates said interaction to said plurality of letters and said at least one special character too.

Optionally, a (same) single letter may be assigned to more than one (e.g. small) zone/key.

Optionally, an interaction with a zone is related by the word predictive system to ambiguously and/or precisely correspond to one of the letters of said zone and/or to one of the letters near (e.g. on or near/around/adjacent, etc.) the interaction impact on the keyboard. Preferably said zone is a horizontal zone including at least some (e.g. 3-5, 3-6, etc.), optionally substantially all, of the letters of a row of letters of the keyboard. Optionally, substantially all of the letters of each row of the keyboard constitute (e.g. are included in) a separate horizontal zone. Preferably, said precise letter is the letter on/with which said interaction is provided. Optionally, said precise letter is a letter adjacent to the interaction impact. Preferably, said (e.g. adjacent) letter belongs to the small zone on which the interaction is provided. Optionally said (e.g. adjacent) letter belongs to an adjacent small zone. Preferably, the system gives priority to the letters of the interacted zone over the letters that are near the interaction impact from another zone. Optionally, the system gives priority to the letters that are near (e.g. around/adjacent) the interaction impact over other letters of the interacted zone that are not near (e.g. that are far from) the interaction impact. Optionally, upon a meeting a condition such as if there are not enough words for the input information received by the system, the system may relate each of a number of (e.g. few, 1, 2, 3, or a percentage of) interactions to another character of the keyboard.

According to a preferred aspect, when receiving an input information, in addition to presenting one or more words ambiguously predicted (e.g. by relating at least one of the interactions to an ambiguous character), the system may also present the chain of identified characters (e.g. word) corresponding to the letters/characters with which the user interacts (e.g. letters at/under the user's tapping impacts).

An aspect of the inventions is related to a traditional keyboard having a number of horizontal rows of letters, wherein the letters are divided into few groups (e.g. 6) each group assigned to/represented by a different zone.

Optionally, the input interface/keyboard has an alphabetical layout. Optionally, the keyboard has a traditional letter layout (e.g. QWERTY, QWERTZ, AZERTY). Preferably, (e.g. minor) modification to the layout may be provided. Preferably, a portion of the surface of a zone is assigned to an identified character. Preferably, interacting with a/said portion of a zone is related by the system to said identified character and/or ambiguously to any of the letters assigned to said zone. Preferably, the background (e.g. color, shade, etc.) of a zone is different than the background of its adjacent zone.

Optionally, the system and/or the input interface may be switched to a Precise Symbol Mode wherein a predefined interaction with a zone may provide an individual precise/ identified letter, special character or function. The interface of the system in such a mode may preferably be different than the interface in other modes. Preferably, special characters are divided into a plurality of groups (e.g. four to five groups) based on a common characteristic.

An aspect of some embodiments of the invention relates to an input system wherein a first (predefined) type of interaction with an input means ambiguously correspond to a first group of characters assigned to said input means, and wherein a second (predefined) type of interaction with the/said input means ambiguously correspond to a second group of characters assigned to said input means.

An aspect of some embodiments of the invention relates to an input system wherein a first predefined type of interaction (e.g. a tapping action) with an input means ambiguously correspond to any character of a group of characters assigned to said input means, and wherein a second predefined type of interaction (e.g. a long pressing action) with an input means (precisely) correspond to an identified character assigned to said input means. Preferably, said first type of interaction is a tapping action. Optionally, said second type of interaction is a long pressing action or a gesture. Preferably, said identified character is the character with/on/ from/to which said interaction is provided.

An aspect of the invention relates to an enhanced word predictive data entry system receiving input information in form of precise and/or ambiguous input signals to predict a (e.g. one or more) word. A precise input signal corresponds to an identified character in a (e.g. corresponding) character position in said word and an ambiguous signal corresponds to an ambiguous character in a different character position in said word.

An aspect of some embodiments of the invention relates to a data entry system using one or more N-gram (e.g. N>0) database of words to predict a word (e.g. N having a different value for each database).

An aspect of some embodiments of the invention relates to a first type of interactions (e.g. gliding/swiping actions) provided on a touch sensitive surface to emulate a second type of interactions (e.g. tapping actions) with the keys of a virtual keypad/keyboard. Preferably, said interaction is provided on a virtual keypad/keyboard displayed on the touch sensitive surface. Optionally, said interaction is provided (e.g. anywhere) on the screen in respective to an imaginary/ invisible keypad/keyboard model.

An aspect of the invention relates to a resizable keyboard having function keys and letter keys, wherein resizing the letter keys may preferably not resize and/or may slightly resize the function keys.

An aspect of the invention relates to a keyboard having a minimized size. The keyboard may have a few number of function and/or special characters keys. The function keys may be arranged (e.g. vertically, horizontally, etc.) in a linear manner.

An aspect of the invention relates to a (e.g. small) wearable device such as a smartwatch preferably having a minimized keyboard. The keyboard may have a few number of function and/or special character keys. The function keys may be arranged (e.g. vertically, horizontally, etc.) in a linear manner.

An aspect of the invention relates to replacing a first content (e.g. such as a keyboard) by a small window (e.g. such as an icon) so as to visualize a large portion of second content on a screen. Preferably, interacting with the small window, returns/displays back the first content to screen. Preferably, the small window may be moved on the screen. Optionally, the small window may be permanently displayed on the screen. In this case, interacting with the small window may switch the first content on and off the screen.

An aspect of the invention relates to some embodiments regarding replication/duplication of at least a portion of a content (e.g. related to a keyboard in use) and displaying/ presenting the replicated content to the user while using a keyboard. Preferably, the replicated content is generally a text. Preferably, the replicated content is the content close to and/or surrounding a cursor in content being replicated. Preferably, the replicated content also contains a cursor wherein said cursors are synchronized in both contents.

An aspect of the invention relates to some embodiments regarding a method of displaying a content on the screen of a device by providing an interaction such as a gliding action from a first predefined window towards a second predefined window. Preferably, said windows are each located on a different edge of said screen. Preferably, at least one of said windows are narrow bars. Optionally at least one of said windows are invisible.

An aspect of the invention relates to predicting words by considering matching values. A matching value is generally calculated to define how close a sequence of interactions provided by a user is to the characters of a word of the database on a keyboard. Different exemplary methods of calculation of a matching value are being described throughout this application. Other methods of calculation may be considered by people skilled in the art.

Preferably, for a word to be considered by the system as a possible desired word by the user, its matching value may preferably be above a predefined and/or dynamically defined minimum value. The term "best match" or "best matched" is used in this application generally refers to such a word. Alternatively, such term refers to a word alone or belonging to a group of words that have the highest matching value's corresponding to the interaction/input information provides by a user.

According to one aspect, said words are considered upon interaction with a keyboard in regard or regardless of a (e.g. one or more) large and/or small zone (e.g. each row of a keyboard is a single zone). Preferably, said matching values are calculated by using a keyboard having a number (e.g. 2) large zones (e.g. each) having a number of small zones. When the keyboard has large zones, the system preferably considers words that preferably all of their characters correspond to the interactions of the users with the large zones. As such, preferably, the matching values are calculated for said considered words. Large and small zones are being described in detail in this application and the previous patent applications filed by this inventor.

An aspect of the invention relates to some embodiments regarding a word prediction system/data entry system that uses any of the keyboards of the invention and the principles of predicting words described herein to predict words.

An aspect of some embodiments of the invention relates to commenting (e.g. writing text) in text box relating to a picture/video (e.g. shared or to be shared). For an edited video such comments may be time-stamped at any particular point in the video. Note that the product of such edited virtual contents may herein be referred to as an artwork.

An aspect of some embodiments of the invention relates to methods of hiding and/or unhiding (e g masking and/or unmasking) at least a portion of a/any (virtual) content (e.g. a text box, a photo, an artwork, a video, etc.). Preferably said content may be shared over a network with others. Preferably, said hiding and/or unhiding action can be done at any moment by the owner of the content before or after sharing said content.

An aspect of the invention relates to controlling at least a portion of a content and/or the secured access to a portion of a content preferably upon meeting one or more conditions. The content may be controlled and/or secured locally on a user's device, or may be controlled and/or secured remotely on the user's device from another/remote location/device such as a remote computer, server, (e.g. mobile device), etc.

BRIEF DESCRIPTION OF THE DRAWINGS

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which:

FIGS. 5A-5G show different keyboards used to describe swiping methods in accordance with different exemplary embodiments of the invention;

Figures 8A, 8B, 8C, 8D, 8E:
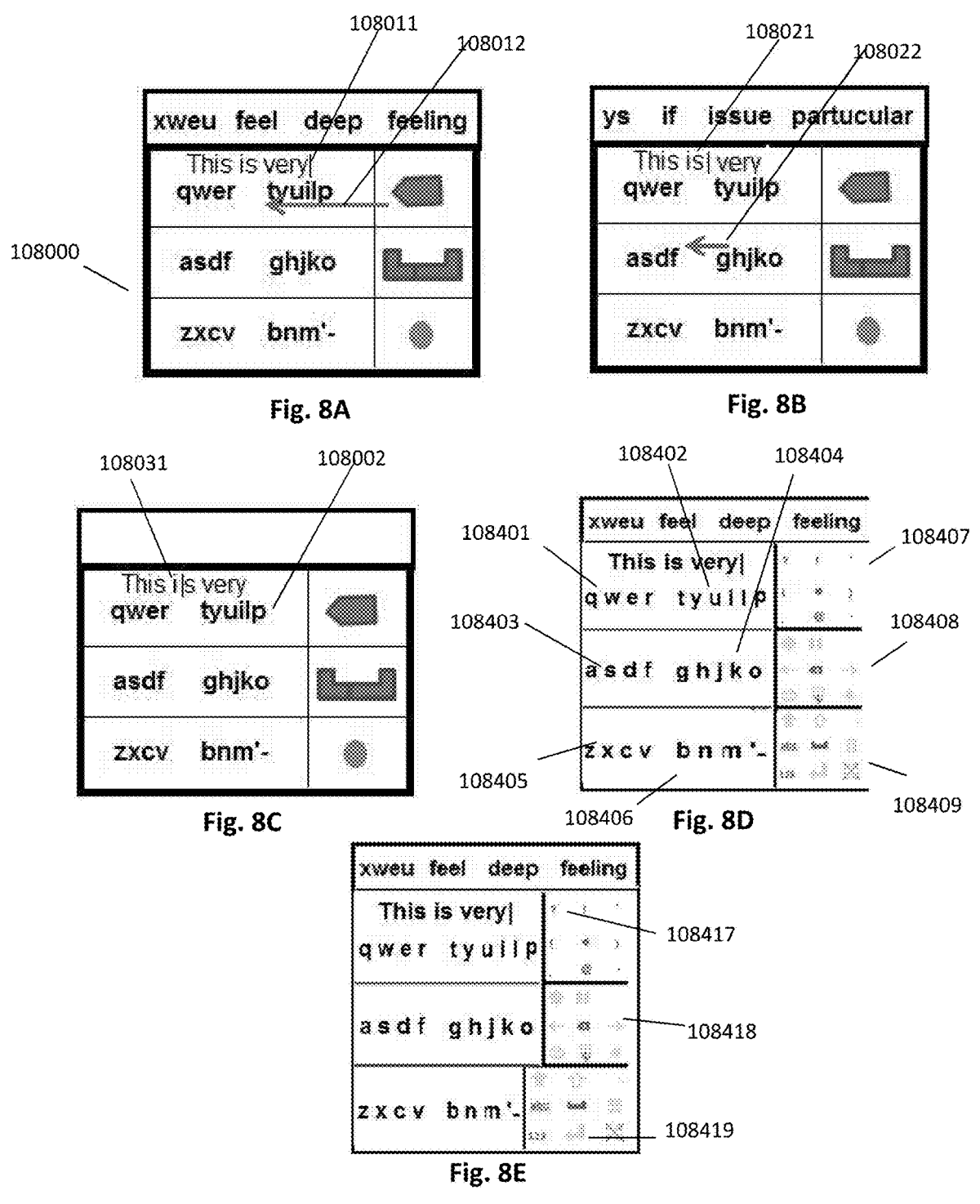

FIGS. 8A-8C show methods of moving a cursor in a text history field in accordance with exemplary embodiments of the invention;

FIGS. 8D-8E show different function bars of the invention in accordance with exemplary embodiments of the invention;

DETAILED DESCRIPTION OF EMBODIMENTS

Figure 1:
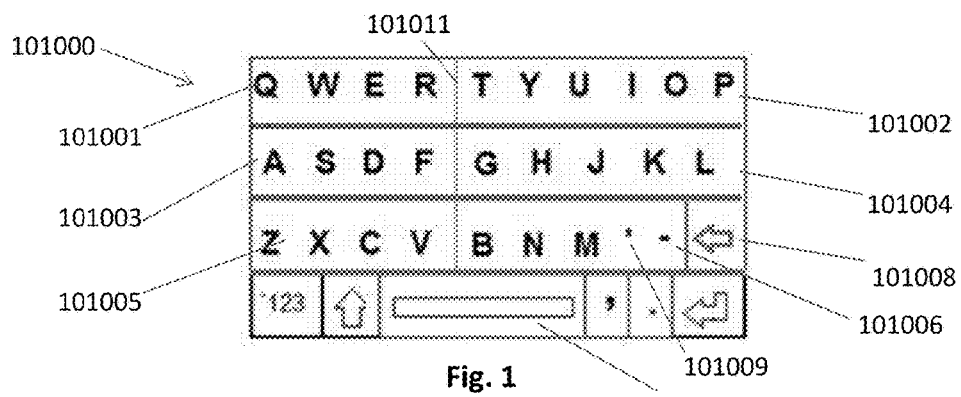
FIGS. 1-1B show different keyboards of the invention wherein the letters are divided into two large zones in accordance with different exemplary embodiments of the invention.
Figure 1A:
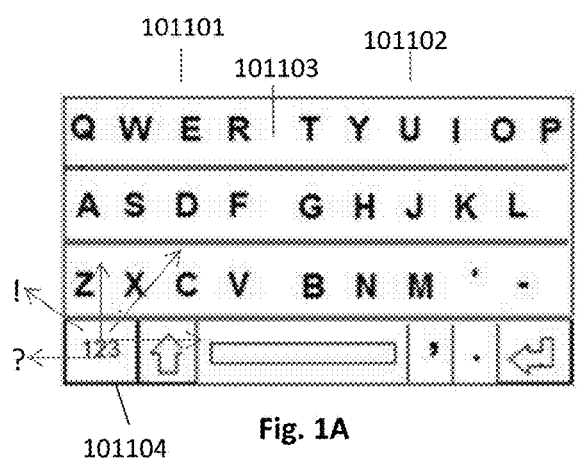
FIGS. 1C-1F show different keyboards of the invention having a vertical row of function keys in accordance with different embodiments of the invention.
FIGS. 1G-1H show, respectively, a resizable and a split keyboard of the invention in accordance with different embodiments of the invention.
Figure 1B:
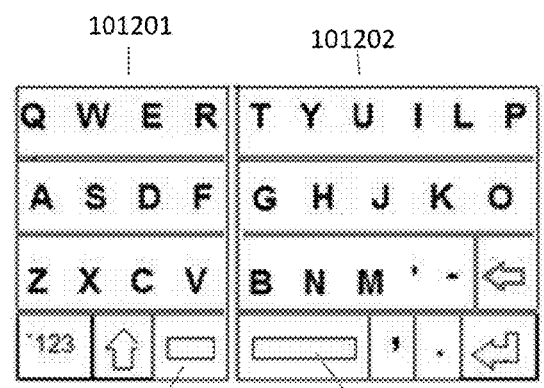
Figure 1C:
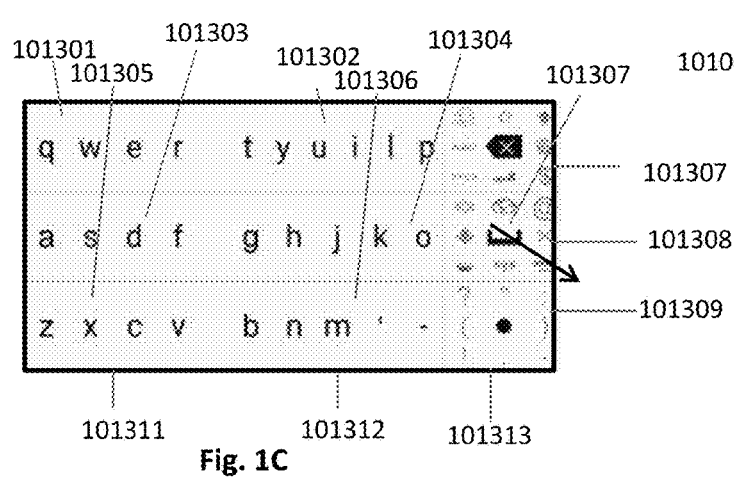
Figure 1D:
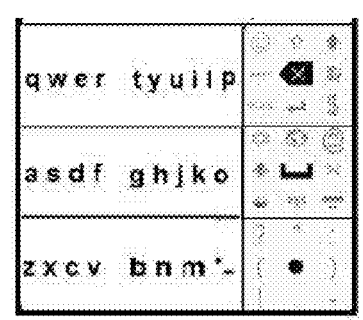
Figure 1E:
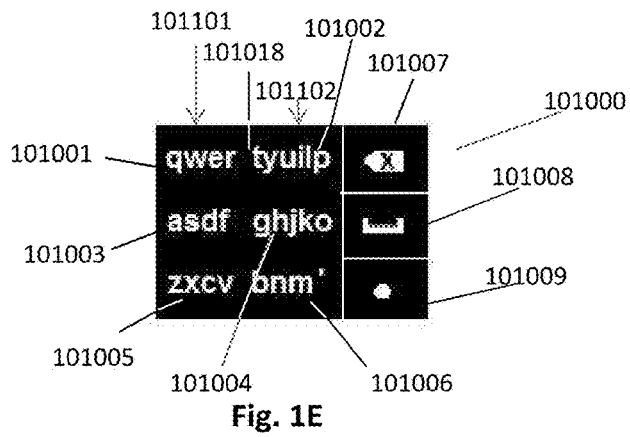
Figure 1F:
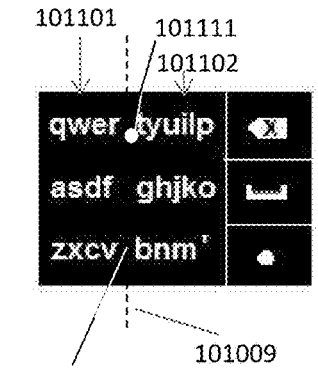
Figure 1G:
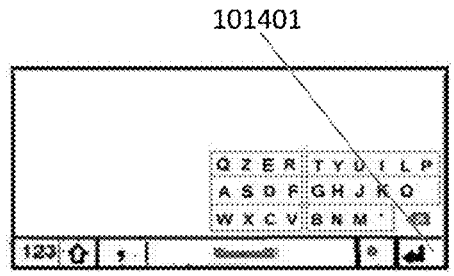
Figure 1H:
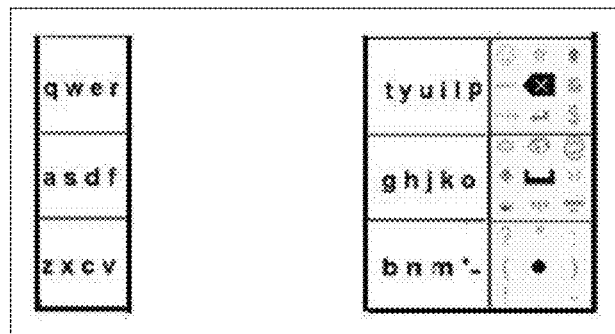
Figure 3:
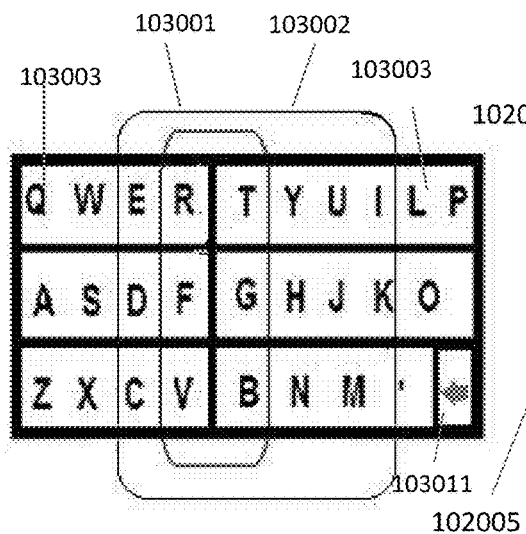
FIG. 3 shows an exemplary keyboard of the invention having different letter zones in accordance with different embodiments of the invention.
Figure 2:
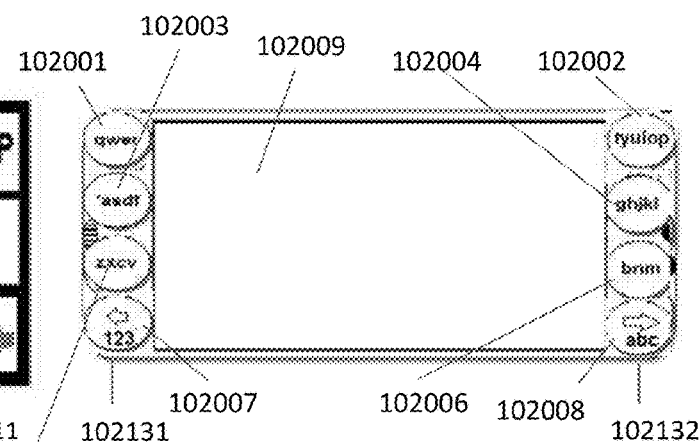
FIG. 2 shows a keyboard of the invention having physical keys and/or virtual keys in accordance with different embodiments of the invention.
Figure 4F:
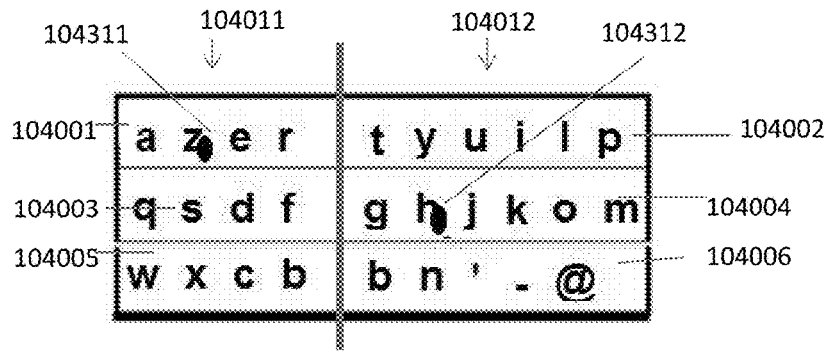
FIGS. 4A-4S show keyboards and tables used to describe different word predictive methods in accordance with different exemplary embodiments of the invention.
Figure 4F:
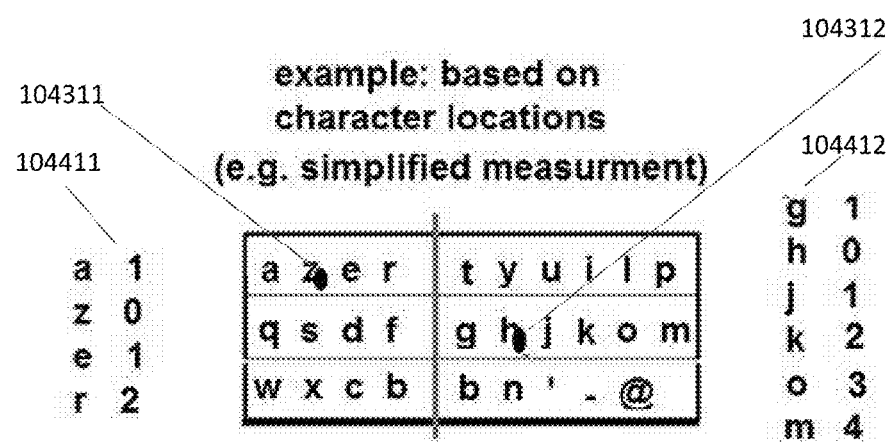
Figure 4G:
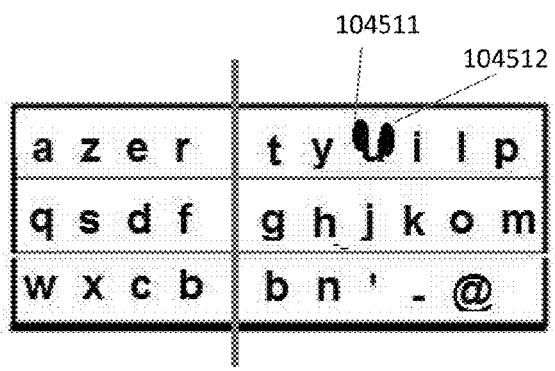
Figure 4H:
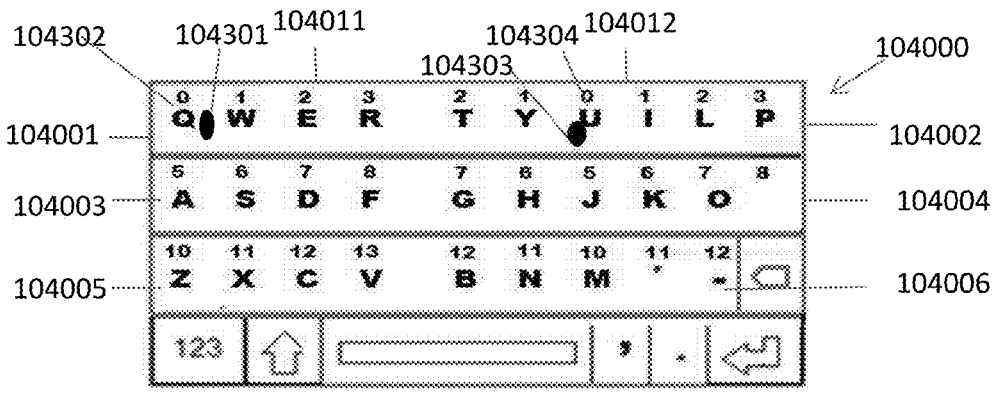
Figure 5F:
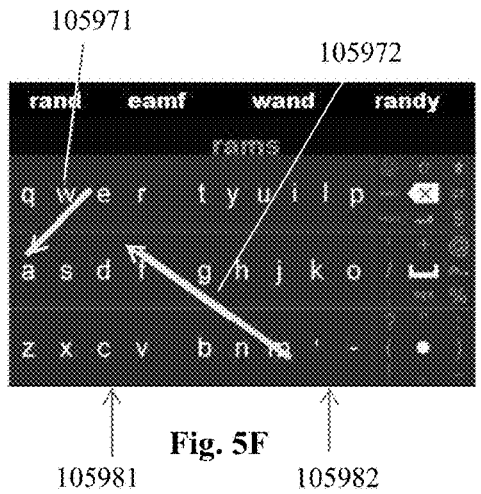
Figure 6A:
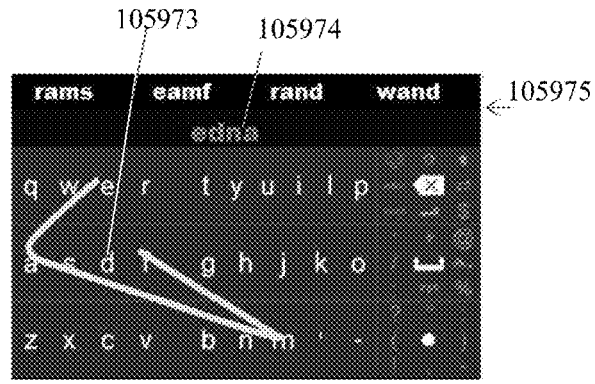
FIGS. 6A-6J show methods of data entry using keyboards for the smartwatch in accordance with different exemplary embodiments of the invention.
Figure 6A:
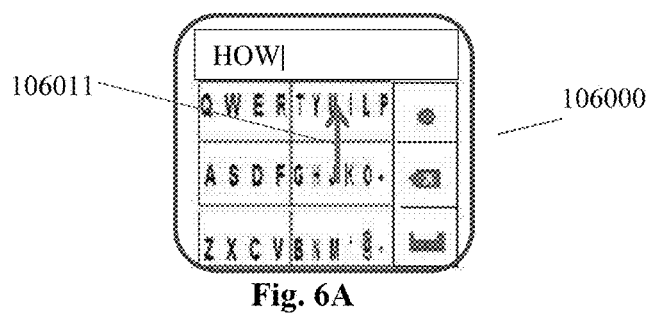
Figure 6B:
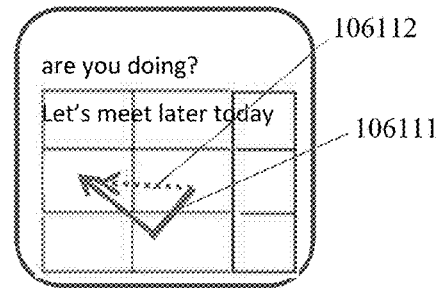
Figure 6C:
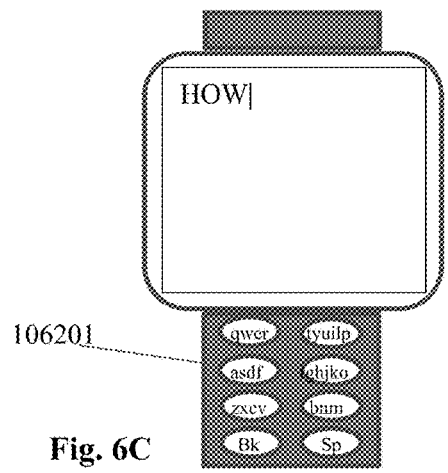
Figure 6D:
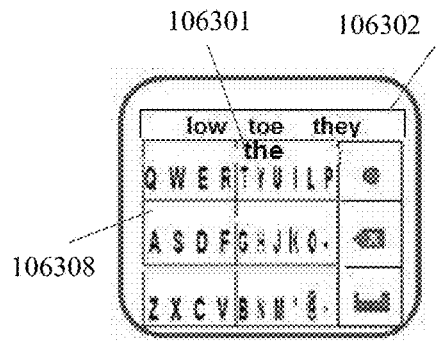
Figure 6E:
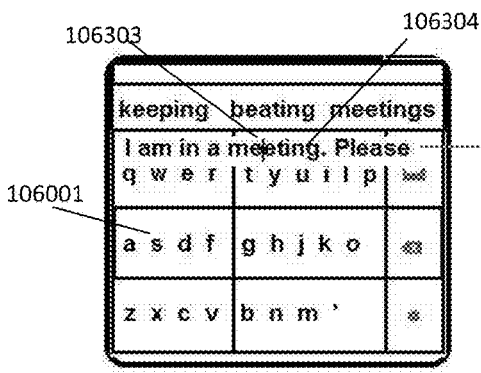
Figure 6F:
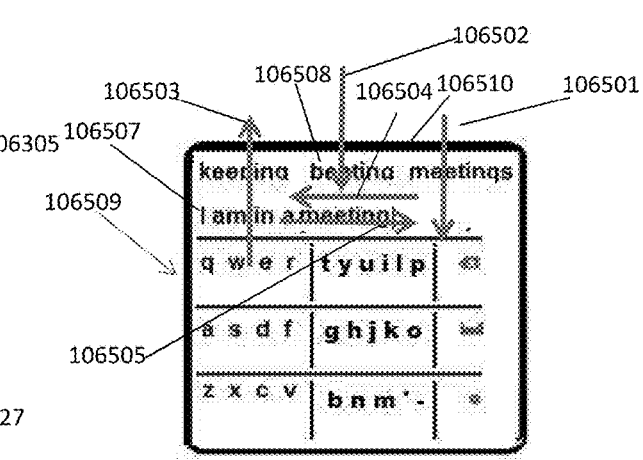
Figure 6G:
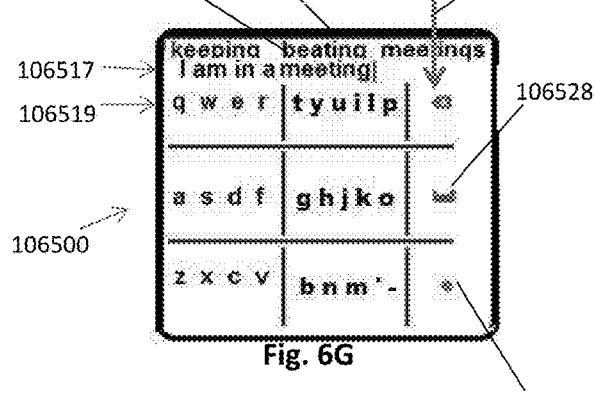
Figure 6H:
Figure 6I:
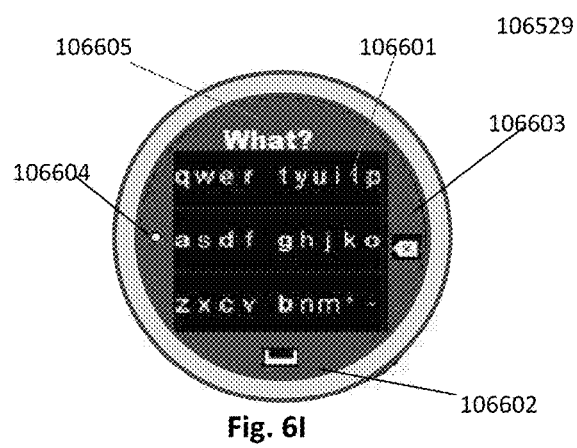
Figure 6J:
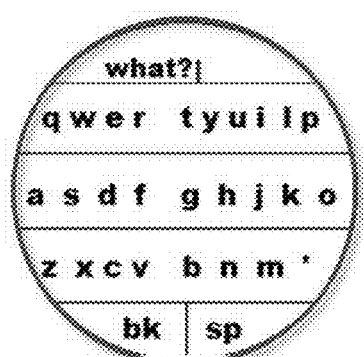
Figure 7A:
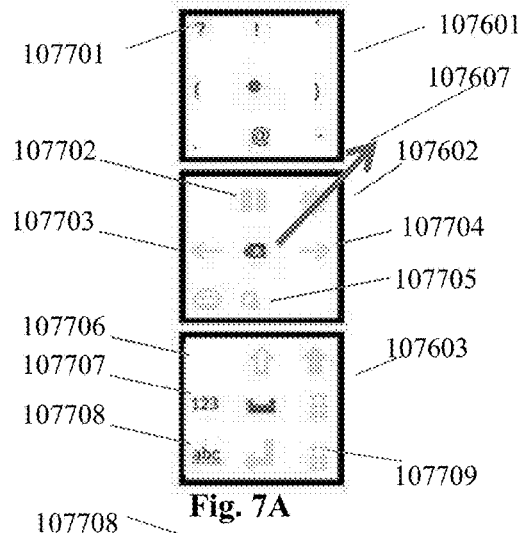
FIGS. 7A-7F show a function bar of the invention and methods of entering special characters and functions in accordance with exemplary embodiments of the invention.
Figure 7B:
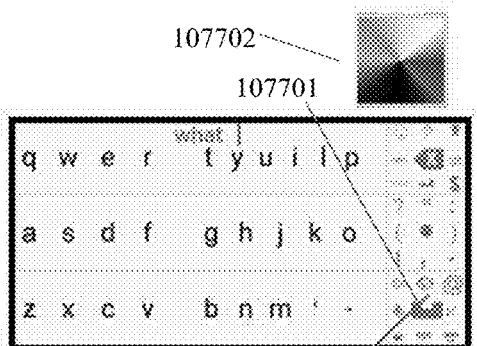
Figure 7C:
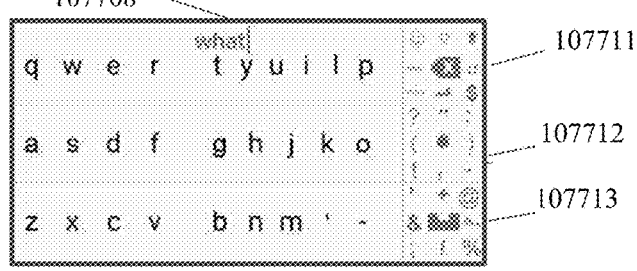
Figure 7D:
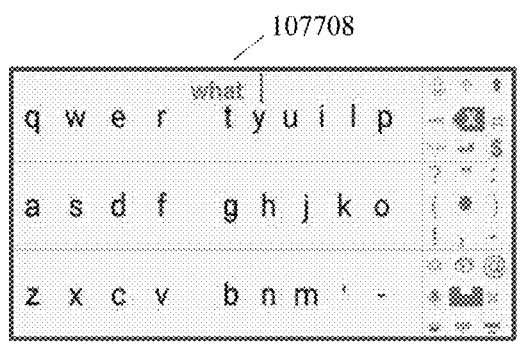
Figure 7E:
Figure 7F:
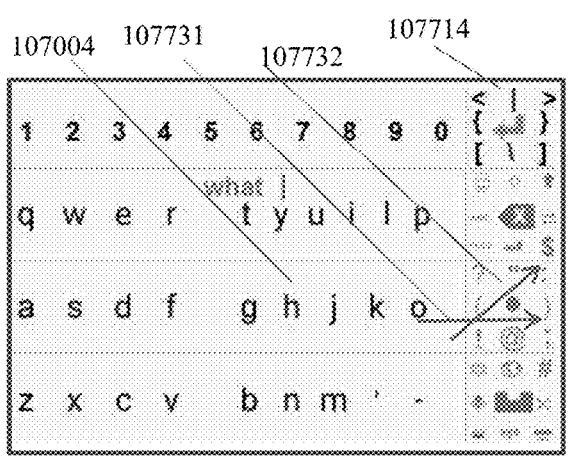
Figure 9A:
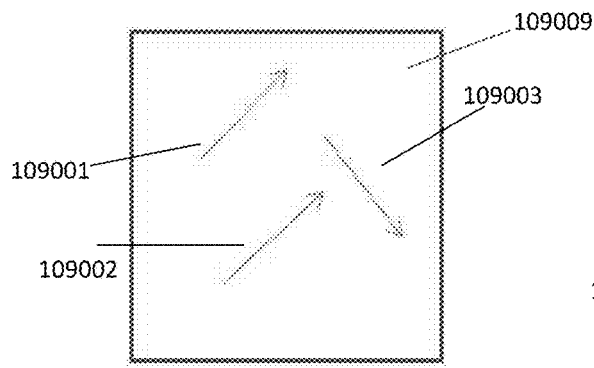
FIGS. 9A-9E show methods of accessing an application using gestures in accordance with an exemplary embodiment of the invention.
Figure 9B:
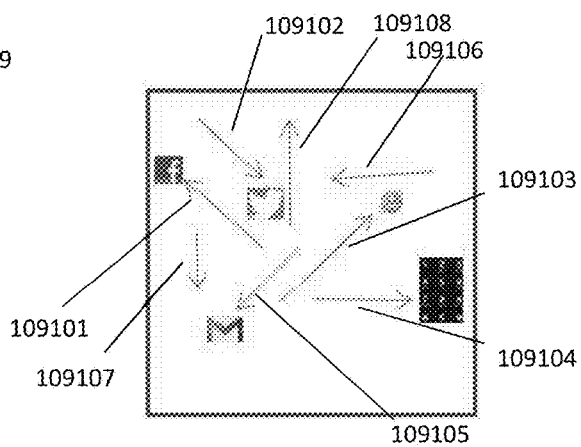
Figure 9C:
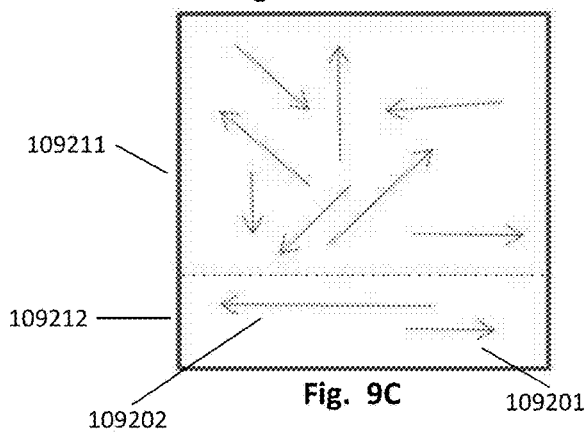
Figure 9D:
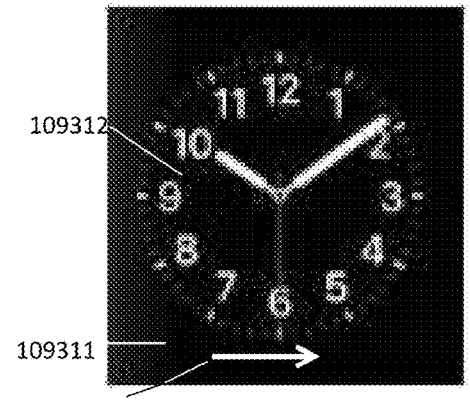
Figure 9E:
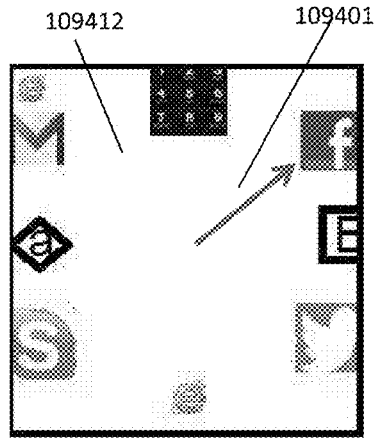
Figure 10A:
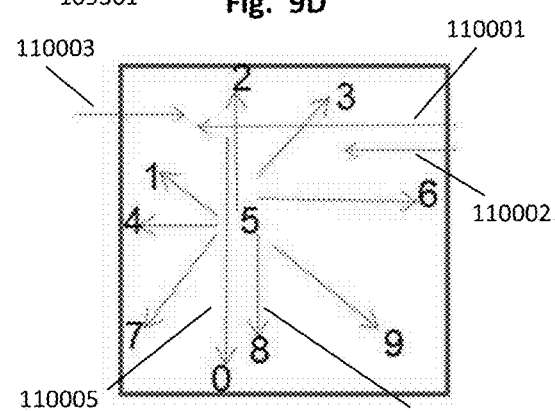
FIG. 10A shows a method of dialing numbers in a smartwatch in accordance with different exemplary embodiments of the invention.
Figure 11A:
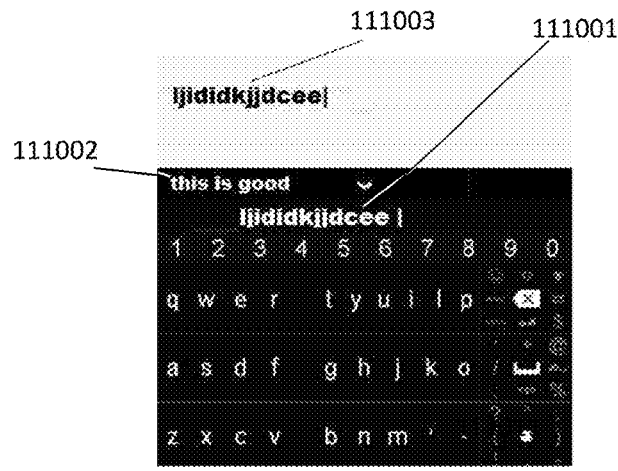
FIGS. 11A-11C show methods of entering consecutive words without using a space key in accordance with different exemplary embodiments of the invention.
Figure 11B:
Figure 11C:
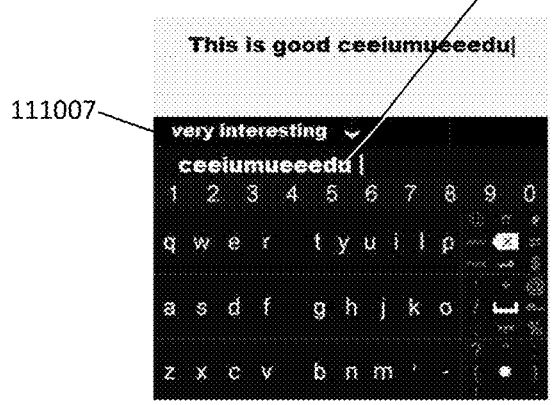
Figure 12A:
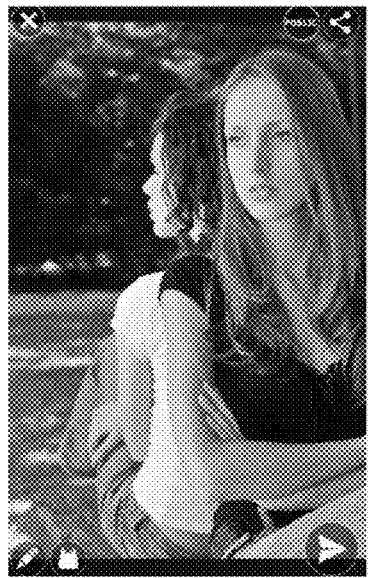
FIGS. 12A-12T show methods of sharing and controlling contents in accordance with different exemplary embodiments of the invention.
Figure 12B:
Figure 12C:
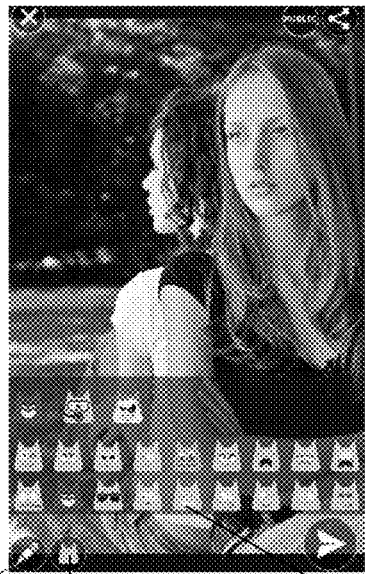
Figure 12D:
Figure 12E:
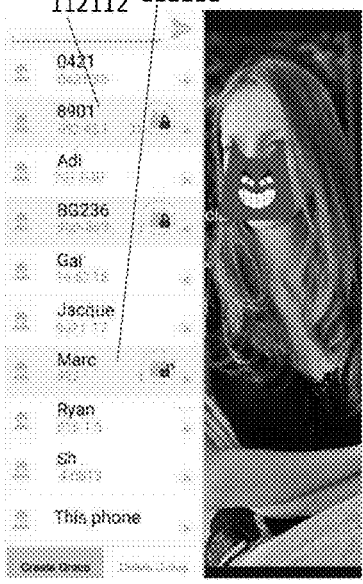
Figure 12F:
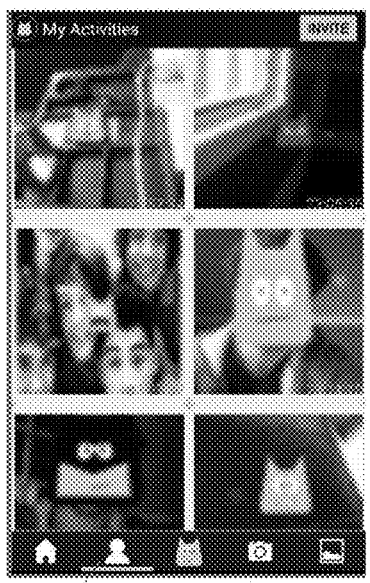
Figure 12G:
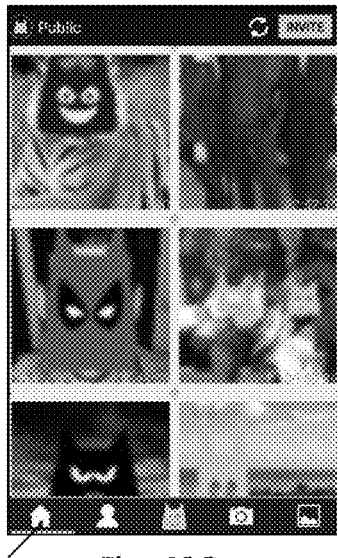
Figure 12H:
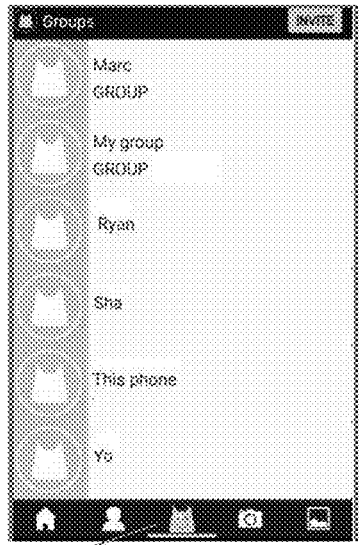
Figure 12I:
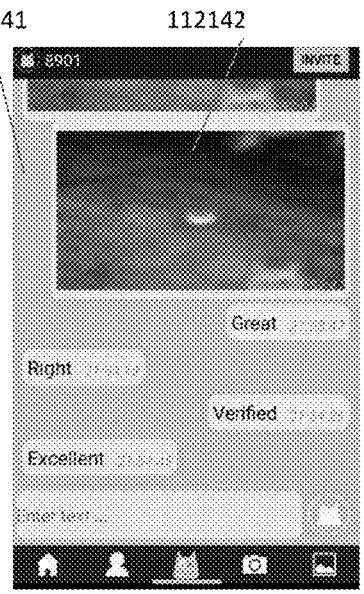
Figure 12J:
Figure 12K:
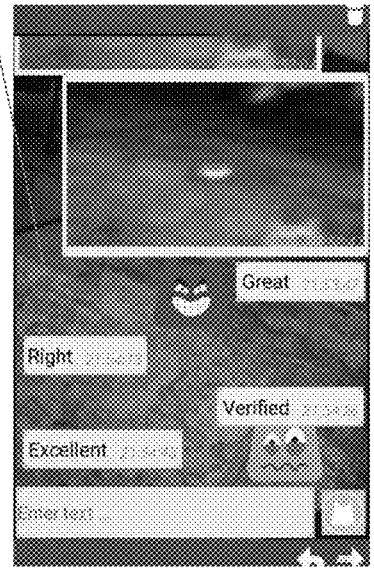
Figure 12L:
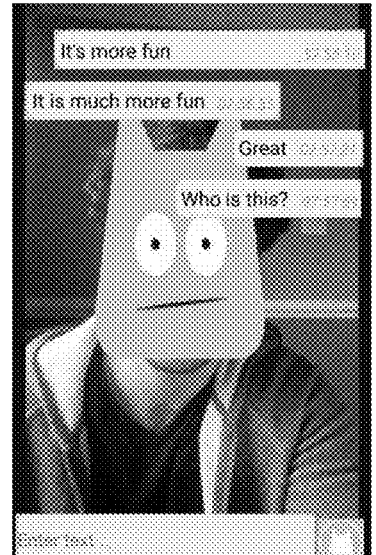
Figure 12M:
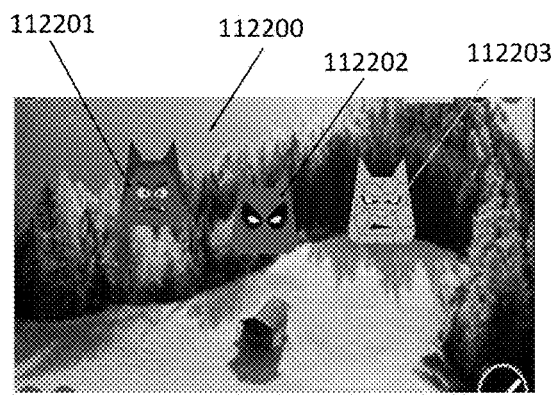
Figure 12N:
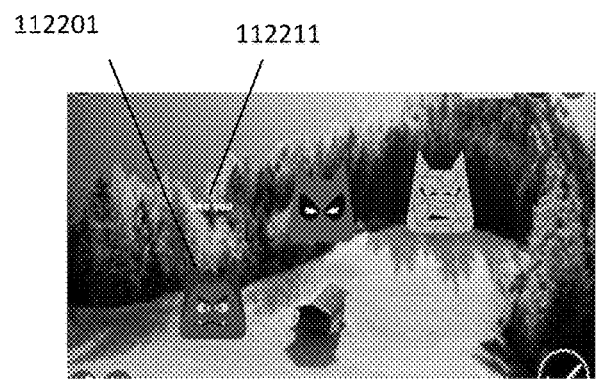
Figure 12O:
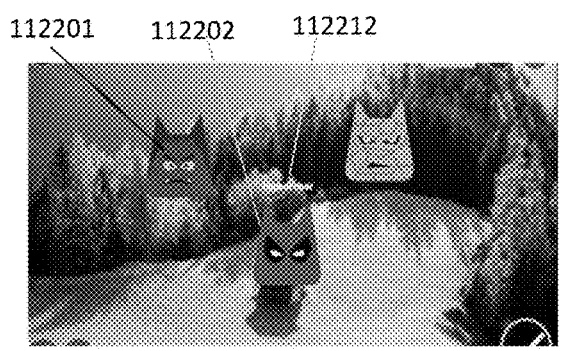
Figure 12P:
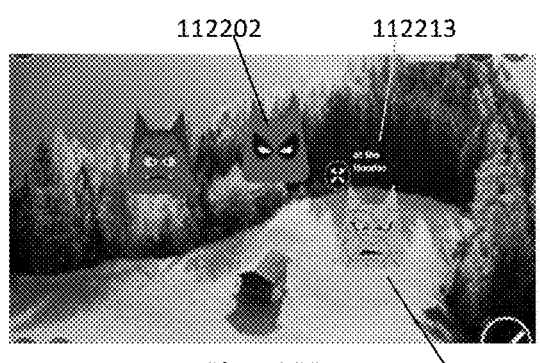
Figure 12Q:
Figure 12R:
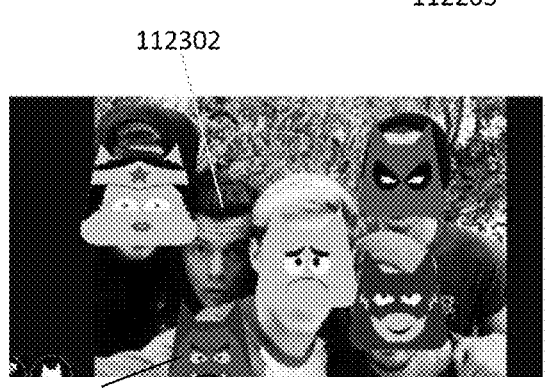
Figure 12S:
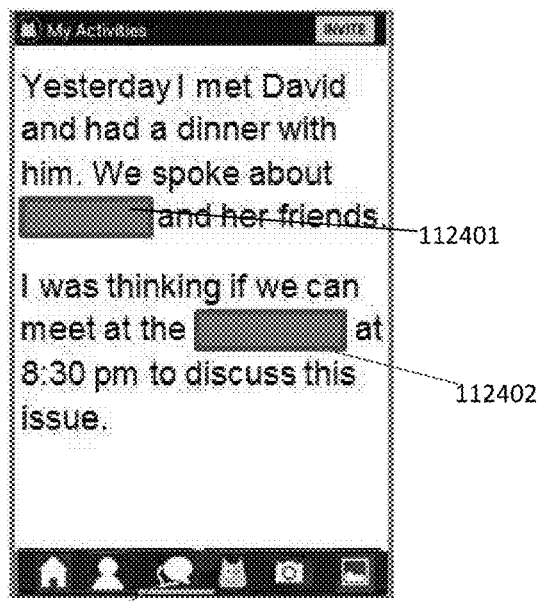
Figure 12T:
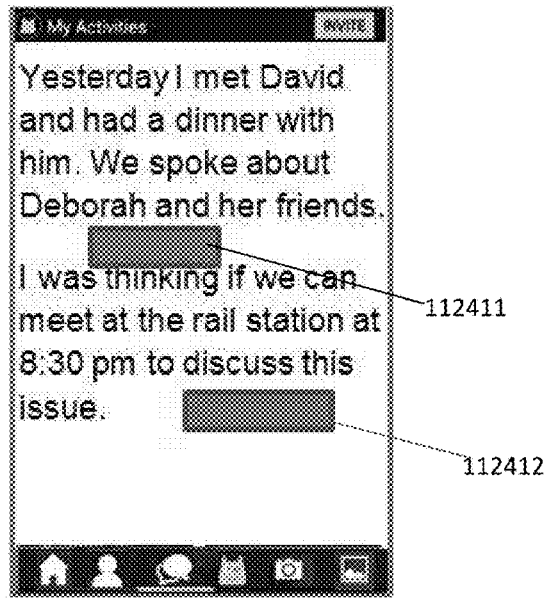

The data entry system of the invention generally refers to using a predefined or dynamically defined number of zone (e.g. which in this application may also be referred to as keys) to enter text/data. The letters/characters of a language are distributed on at least some of said number of zones such that to at least one of the zones (e.g. hereafter may be referred to as an "ambiguous letter zone" or "ambiguous zone"), preferably all of the zones, more than one letter/character is assigned.

According to one embodiment of the invention the/a keyboard may preferably have a few number (e.g. 4 to 8) of zones wherein at least one said zones ambiguously representing more than one character/letter. According to one method, said a few number of zones together substantially represent all of the letters of a language.

Preferably, said zones and their layout may represent a traditional keyboard (e.g. QWERTY) form factor. Preferably, said zones (e.g. which herein may be referred to as small zones) are horizontal zones, each having a number of characters of a row of letters of a keyboard. FIG. 101 shows, as an example, a keyboard 101000 wherein the letter(s) are represented by six (e.g. horizontal) zones/keys 101001-101006, and wherein each of said zones represents a few characters/letters. Note that in this example assignment of the letters to the small zones is defined/designed in a manner to augment the accuracy of a/the word prediction system using said zones. The principles of such word prediction system is commonly known (e.g. T9, etc.). Upon interaction(s) (e.g. tapping action(s)) with the one or more said keys/zones, the system may predict a (e.g. one or more) word/s from the database and preferably propose it/them to a user. In this example, the keyboard includes more keys, including a Space key 101007 and a Backspace key 101008. Preferably the zones are separated from each other such that to be easily distinguished from each other. In case of a virtual (e.g. on screen, on a touchpad) keyboard the border between the keys may be marked by separating delimiters (e.g. lines (e.g. 101011) and/or gaps). Said keyboard may be of any kind such as a physical keyboard, a virtual keyboard located on a touch sensitive surface (e.g. an on-screen keyboard), etc.

The letters of a keyboard may be divided into any number of zones/keys. As an example, FIGS. 101-101A show the letters of a keyboard divided into six groups and represented by six zones/keys 101001-101006 each having a plurality of the letters. The division of the letters into said zones is provided such that to extremely enhance the accuracy of the word prediction system using said keys/zones. For example, the letters R and T are assigned to different keys/zones. The same may be regarding the letters F and G, and/or to the letters C and V which are also assigned to different keys/zones. Note that in the example of FIG. 101B, the letters O and L are swapped for still more accuracy of prediction.

Note that some groups of letters assigned to a zone may also include one or more special characters (e.g. apostrophe).

Note that preferably the zones of at least one side of a keyboard may have the same number of characters/letters. In the example of FIG. 101, the left zones of the keyboard have each four letters. This may permit to have a split keyboard (e.g. explained herein) wherein at least one of the portions having a rectangular form factor.

According to one aspect, a dynamic division of a row of letters of a keyboard may preferably dynamically be defined based on the location of an interaction impact on said row of letters. In this method, preferably, a horizontal zone including one or more letters from each side of the interaction impact (e.g. on and/or close to the impact) is dynamically defined.

Each of said zones may be considered as an ambiguous (e.g. small) key/zone. A word prediction system as described herein may be used to predict words upon interactions with said zones. The letters may be divided in any manner, preferably, such that to augment the accuracy of the prediction.

When a zone is interacted, the system may relate the interaction to (e.g. both) an ambiguous input signal (e.g. corresponding to any letter of the group of letters assigned to the interacted zone) and/or to a unambiguous input signal preferably corresponding to an identified letter on or near which said interaction is provided.

According to one embodiment of the invention, when a location on a zone is interacted by a user, the system may first consider the characters within said zone on which the interaction impact is provided, to predict a word. Preferably, the priority for consideration may be given to the characters based on their distance from said impact (e.g. respectively from the closest to the farthest). According to one method, in addition (e.g. preferably considering with less priority) the system may also consider the characters (e.g. close to said impact) from a neighboring zone (e.g. horizontally and/or vertically (e.g. preferably by giving higher priority to the characters from the horizontal neighboring zone)) relative to the interacted zone and/or (e.g. preferably considering with still less priority) from other zones.

According to one method, the system relates an interaction with a zone to any of the characters of said zone and to the characters that are near (e.g. around) the interaction impact from neighboring one or more zones.

Note that, according to one aspect, (e.g. in case of a horizontal (e.g. small) zone), a character of an interacted zone may be farther than a character of another zone relating to said interaction impact (e.g. preferably said another character not being adjacent to/around the interaction impact), wherein the system preferably gives priority to said character from said interacted zone over said another character from said another zone. According to another aspect, the system may preferably give priority to said letter from said interacted zone and not to another character from another zone even if said character from said another zone is adjacent/around the interaction impact.

Note that the small zones may have any shape, (e.g. horizontal shape including characters of a row of keyboard, square/rectangular shape including characters of two or more rows of a keyboard, (e.g. dynamically defined) circular shape including the characters around an interaction impact with the keyboard, (e.g. dynamically defined) special shape including the characters near and/or far from said interaction impact of a row of letters on which an impact is provided and a number of characters around said interaction impact from one or more other rows of letters of the keyboard, etc.

Based on the principles described herein, upon providing the input information corresponding to entering a word, different methods of presentation of the corresponding words may be considered such as:

a) according to one method, the priority (e.g. of presentation) may be given to the word based on some criteria such as for example to the word having the highest frequency of use among other corresponding words. Said word will be preferably entered (e.g. in the corresponding text field) upon a providing predefined interaction such as pressing the space key. Such The other words may be presented in a word list to be selected by a user if needed.

b) according to one method, the priority (e.g. of presentation) may be given to the word having the highest frequency of use among other corresponding words that all of their letters correspond to the interacted (e.g. horizontal) zones. The other words may be presented in a word list to be selected by a user if needed.

An example of word list 104956 is shown in FIG. 104F.

A zone of a keyboard may include one or more special characters following the same rules of a letter (e.g. considered ambiguous and/or unambiguous). For example, an apostrophe (e.g. 101009) may be assigned to one of the zones (e.g. 101006).

Note that, the word to the highest priority is given by the system may herein be referred to as current predicted word, or simply current word.

According to one embodiment, swiping actions in different directions on or from a word list may be related to different function. As an example, swiping actions, leftward or downward may respectively be related by the system to deleting one or more word/s which is/are located before a cursor within a text, or opening/expanding the word list (e.g. see expanded word list 104958 of FIG. 104S). Also as example, a swiping action, rightward, from a word in a word list may be related to presenting more long words that their beginning characters is similar to said word, and a swiping action, upward, from a word in a word list may be related to assigning a higher frequency of use to said word, preferably automatically by the system.

FIG. 101A shows a QWERTY keyboard divided into six zones. In this example, in order to keep the look of a traditional keyboard, instead of a the delimiter in form of a line, a gap 101103 between the between the left zones 101101 and right zones 1010102 is provided. Note that this is an example, any other preferably slight modification to the letter arrangements may be provided.

It must be noted that the division of virtual keyboards into small and/or large zones as shown herein are exemplary divisions. Other types of division of a virtual keyboard based on these principles may be considered (e.g. the keyboard/zones may be divided/defined differently). Dividing a keyboard may be a predefined division (e.g. by the creator/manufacturer of the keyboard) or a dynamic division (e.g. by the creator/manufacturer of the keyboard, by a/the user (e.g. interaction), etc.). As an example, the division of (e.g. preferably the letter keys of) a keyboard may be determined by the user, for example, by providing gestures to define delimiters of (e.g. arbitrary) zones of said keyboard. Optionally the delimiters may be visible lines. Optionally, zones of a keyboard may be delimited by (e.g. slightly) distancing the zones from each other.

Note that the principles of division of a virtual keyboard described herein may also be applied to the keyboards having hard/mechanical keys. In this case, interacting with a key within a zone, may precisely be related by a processor to interacted key (e.g. or a key near said key) and/or ambiguously correspond to any of the keys of the zone in which the interacted keys is located. The hard keys of a zone may have a different characteristics (e.g. different color) so that to be easily distinguishable from the keys of another zone.

According to one embodiment, the keyboard may be split into two or more portions. Said portions may be attached to each other or they may have a (e.g. significant) gap between them. In the exemplary FIG. 101B shows a keyboard of the invention being split in two portions 101201 and 101202. The zones/keys 101001, 101003, 101005, form a first column (e.g. vertical row) of letters, and the zone/keys 101002, 101004, 101006 form a second column (e.g. vertical row) of letters. The space key is also is split and have two portions 1010071 and 1010072. The split portions may automatically by the system and/or manually by a user, be (e.g. dragged and) positioned on any location of a touch sensitive and have any relationship/distance relating to each other. Preferably, the split portion may be located on opposite sides/edges of a touch sensitive surface (e.g. touch screen).

According one embodiment, the function keys may be located on the side of the columns of letters. FIG. 101C, shows as an example, two vertical rows (e.g. columns) 101311, 101312 of letters each having three zones/keys of letters respectively, 101301, 101303, 101305, and 101301, 101303, 101305, and wherein a vertical row (e.g. column) 101313 of special characters and functions (e.g. herein may be referred to as (e.g. vertical) function bar) also having three keys/zones 10307-101309 is located on the a side of said columns of letters. In this example, the keys/zones are forming a matrix of three horizontal rows by three vertical rows of keys/zones. According to one aspect, a first type of interaction such as a tapping action on a function key may preferably correspond to entering/activating the character/function corresponding to the icon positioned on the center of the key. A second type of interaction such as a gliding action provided from a function key, in parallel to an imaginary line between the center of the key and an icon on said key, may correspond to activating/entering a function/character corresponding to said icon. A vertical row of letters may herein be referred to as a large (e.g. ambiguous) zone, and each of the horizontal zones may herein be referred to as a small (e.g. ambiguous) zone. This matter will be described in detail herein.

The keyboard of the current embodiment has many advantages. As an example, the size of the keyboard may vary to touch screens with different size, from the smallest (e.g. a smartwatch), to the midst (e.g. a smartphone) and to the largest (e.g. Tablet) most probably without affecting the user's experience (e.g. speed, accuracy, easiness) with the keyboard.

According to one aspect, the keyboard may be switched from a large size to a reduced/miniaturized size and/or vise versa. Preferably, a switching means may be used to switch the keyboard from large size mode to reduced size mode and/or vise versa. In the example of FIG. 101C, a gliding a action 101314 may enter the keyboard in a reduced size as shown in FIG. 101D. Note that a/said function bar may be horizontal. As an example, in keyboard of FIG. 101A, sliding in different directions from at least one, preferably all, of the function keys of the keyboard in different (e.g. 3 to 8) directions (e.g. see gliding directions on/from the key 101104) may correspond to entering different (e.g. special) characters and/or functions, etc.

In the example of FIG. 101, in order to enter the word "why" the user may provide input information corresponding (e.g. ambiguous and/or precise input signals corresponding to entering a word by the (e.g. word predictive) system may herein be referred to as input information) to entering said word by for example interactions (e.g. pressing/tapping actions) on ambiguous key 101001, the zone 101004, and the key 101002. (e.g. by relating each of said interaction to any of the characters of the interacted small zones, the system may propose/predict the word "why" which corresponds to said key/zone interactions and has the highest priority among the words of the database corresponding to said interactions. If the predicted word is the desired word, the user may confirm it by providing an end-of-the-word signal such as tapping on the space key. As such, according to one method, in addition to entering the predicted word, the system may provide a space character after the entered word. Such a system to predict a word may herein be referred to as (e.g. fully) ambiguous/predictive system).

Preferably, the system may (e.g. simultaneously) propose more than one word corresponding to the input information provided by the user. The proposed words may form a wordlist. The word which defined by the system as most probably to be the desired word may be entered by entering a character such as the space character (e.g. by pressing on the space key) or a special character (e.g. "?"). Such a word may herein be referred to as current (e.g. predicted) word. If a desired word is not in the word list, upon providing a predefined interaction (e.g. a gliding action on/from the wordlist, tapping on an icon, etc.) the system may propose additional corresponding words.

According to one method, the system may also consider the letters on which said interactions are provided as a chain of identified letters and propose it to the user. Relating user's interaction to ambiguous and/or precise/identified characters by the system is known by people skilled in the art.

The input information corresponding to a current word may be related to an entire word or it may be related to a portion, preferably to the beginning portion, of a word. Accordingly, the system may look for words (e.g. in the entries of a database of words) that their entire characters correspond to the (combined) input information (e.g. herein may be referred to as short search or short word/s) or the words that a (e.g. preferably, beginning) portion of them correspond to the (combined) input information (e.g. herein may be referred to as long search or long word/s).

Optionally, the user may be enabled to enter at least one of the characters of the desired word precisely so that to assist the system to enhance the quality of prediction by the system. By receiving and combining said at least one precise/identified character and one or more key interactions/presses ambiguously corresponding to at least one of the remaining characters of the desired word, the system may more accurately predict a desired word. As an example, if the user taps (e.g. anywhere) on the zone 101006, long presses on the letter 'u', and taps (e.g. anywhere) on the zone 101003, the system relates the interactions with the zones/keys 101006 and 101003 as ambiguous interactions and relates the long pressing action on the letter 'u' to the identified character 'u'. By considering such input information, the system may predict the words, 'bus', 'mud', 'bud', and a longer word 'must', etc. Note that in this example, the word 'bit' corresponding to the small zones being interacted is excluded by the system because, its second letter is not the identified letter 'u'.

For better prediction results, in addition to the received input information (e.g. provided by key/zone interaction) corresponding to a word (e.g. 'school') being entered, the system may also consider one or more words (e.g. 'going to') preceding (e.g. already entered) the word being entered (e.g. herein may be referred to as prefix) in a text to predict the/a current word (e.g. being entered). For that, according to one method, the entries of the database used by the system may include one word (e.g. herein may be referred to as N-gram wherein N=1) and/or more words (e.g. herein, may be referred to as N-gram wherein N>1 or may be referred to as more that 1-gram entry). By considering said prefix and said/the received input information (e.g. herein may be referred to as combined input information) the system may predict a (e.g. one or more) word/s from the corresponding more that 1-gram (e.g. 3-5 gram) entries of the database. It is understood that in some cases, such as when there is no prefix and/or the system does not find a word in more than 1-gram entries that corresponds to the combined input information, etc., the system may compare said input information to the 1-gram entries of the database to predict a word. Preferably, for prediction purpose, the system first searches in (e.g. gives priority to) the database wherein its entries have the highest number (e.g. N) (e.g. 5), of grams, then the system searches in (e.g. gives priority to) the database wherein its entries have the highest number of gram minus one (e.g. N−1), and so on. As an example. In the current example, in the N-gram entries, the system looks for the entries that their last word correspond to the input information provided by the user and wherein their two previous words correspond to/are the prefix/words "going to".

According to a preferred embodiment, as shown in the exemplary FIG. 101E, the (e.g. miniaturized) keyboard of the invention may preferably have a three by three matrix of keys/zones 101001 to 101009. This may permit to have a very compact keyboard that is preferably much suited for very small screens such as the screen of a smartwatch. Note that in this example, two columns of the keyboard each have three keys/zones to which mainly all of the letters of a language are assigned. To the third column of keys/zones some special characters and functions are assigned. Note that the size and/or the number of keys/zones of a column may vary. For example, the third column of keys/zones may include 1, 2, 3, 4, or more keys/zones. Also for example, the space key/zone may be bigger/larger (e.g. taller and/or wider) than other keys/zones of said column of keys/zones. In the exemplary FIG. 108E, the function keys 108407 to 108409 have substantially the same size, while in some embodiments such as that of FIG. 108E, the space key (e.g. 108419) may be wider than the other function keys, (e.g. 108417 and 108418 of FIG. 108E), so that to permit easier/faster access (e.g. to said wider key).

Note that the function key may be located anywhere and in any orientation relating to the letter keys/zone. As an example, the function keys may form a horizontal row of keys.

According to a one method, as shown in the exemplary FIG. 101G preferably when the keyboard is in split and/or reduced (e.g. or another) from factor, the function row 101401 of the keyboard does not change the size and/or the location (e.g. on the screen).

In the example of FIG. 101H, a keyboard of the invention having a vertical function bar is shown in split mode. Note that a (e.g. same/similar) function bar with preferably having same similarities may be arranged/disposed horizontally within the/a (e.g. enlarged or reduced and/or split) keyboard.

According to one embodiment, at least the letter keys of the keyboard may be hard/physical keys (e.g. and/or touch sensitive keys/pad/screen separate to the touch sensitive screen/surface) preferably liberating the screen of the corresponding device from a cumbersome on-screen keyboard at least most of the times. FIG. 102 shows as an example, a device having six hard letter keys 102001-102006, a space key 102008 and a backspace key 102007. Said device may also have a touchscreen/touch sensitive surface such as 102009. By using a word prediction system using a database of words, the system can predict the corresponding right/correct words from the database. According to one embodiment, in some cases (e.g. for a word which is not in the database) upon an interaction such as by using a switching means (e.g. by the user) the system may pop up/provide a full/traditional/alternative keyboard on the screen so that the user can enter his/her desired word and/or one or more identified characters, character by character, precisely by interacting with the on-screen keyboard. Same may be applied for providing/popping up a keyboard with special characters on the screen. As an example, a long pressing action respectively on the key 102008 and 102007 may respectively correspond to providing/popping up an on-screen keyboard in precise letter mode and precise special character mode.

The arrangement of letters on few (e.g. six) keys/zones may be applied to some of the keys of a remote control (e.g. TV remote control, etc.). Preferably the letter keys are used with a word predictive systems for entering text as described herein. Additional characters such as special characters and some functions may be assigned to the remaining buttons of the number keys or other numbers of the remote control.

The manner of division of the letters into six zones may differ according to the corresponding language to improve the accuracy of the word predictive system. For example, by assigning the letters V and N to different zones/keys in a French (e.g. AZERTY) keyboard, the common words such VOUS and NOUS will correspond to different input information (e.g. different sequences of key interaction).

The data entry system of the invention may be used with any type of language such as alphabetical language, phonetic based language, etc. As an example, the system may be used with Pinyin Chinese language. For example, in Chinese language each letter/character is presented by a Pinyin. A pinyin is represented by one or more Roman/English letters. A word of the Chinese language may be constituted of one or more Chinese characters. The database of words used by the system preferably includes Pinyin-based entries (e.g. hereon may be referred to as Pinyin words). By using the (e.g. word predictive) data entry system of the invention and preferably its English keyboard, the user may enter the input information corresponding to a desired Pinyin word. The system may propose one or more such Pinyin words (e.g. preferably having the highest priorities among the words corresponding to the input information provided by the user) to the user. The system may also propose the Chinese characters/words corresponding to the proposed and/or a selected Pinyin (e.g. if a user selects a proposed Pinyin word). Preferably, upon providing an end-of-a-word signal such as a space character, the system enters the Chinese word having the highest priority (e.g. automatically). The user may also have the option to choose any of the proposed words.

The data entry system of the invention may be used with a numeric keypad such as a numeric keypad having a alphabetical order.

A sequence of interactions with the keys of a keyboard may be provided by tapping actions on said keys and/or providing gliding actions on/over one or more than one key(s). The swiping actions described throughout this and the previous patent application may preferably be applied to any of the keyboards of the invention or any other keyboard.

As mentioned before, the location of the letters on the keyboard of the invention may preferably be similar to a standard (e.g. QWERTY) keyboard and/or with (e.g. slight) modification(s). For better accuracy of prediction, a character such as a letter may be relocated from a first zone to a second zone preferably to a neighboring zone. Preferably, the new location of said character/letter in a (neighboring) zone may be very close to said character's/letter's original location. Preferably, the relocated character is a vowel letter such that the main vowels (e.g. A, E, I, O) are assigned to different (e.g. small) zones.

According to one embodiment, when a caret/cursor is placed in a predefined relationship to a word in a text field, such as on or immediately after a word (e.g. herein may be referred to as grabbed word), the system may present (e.g. in a words list) several other words (e.g. and said word) corresponding to the input information corresponding to the said word.

According to one embodiment, each one of at least the commonly used special characters and/or functions may be assigned to providing a gesture in a corresponding direction departing from a predefined key of the letter portion of the keyboard of the invention (e.g. a letter key and/or the space or backspace key). As an example, upon providing a long pressing action by a finger on a small letter zone a number of special character icons and/or function icons may be presented (e.g. around the interaction point on the screen, the user may slide his finger towards any of said icons to enter/activate the corresponding character/function.

The function bar described herein may be used with any type of arrangement of letter keys. As an example, a such function bar (e.g. also including space key and the backspace key) may be used with any type of input method such as for example an expanded letter-keys keyboard, a speech recognition system, etc.

Note that according to one method, upon providing a gesture on a location on the screen, a keyboard may pop up at said location. The orientation of the keyboard may be based on/similar to the orientation of said gesture.

As mentioned, the function bar and the letter portion of the keyboard may be considered as two separate portions wherein different functions may be applied to them. As mentioned before for example, the function bar may be a fixed portion of the keyboard and be preferably located on an edge of the/a screen of the corresponding device. On the other hand as an example, the letter portion of the keyboard may be resizable, movable on the screen, being visible or invisible (e.g. by switching back and forth), etc.

Note that the letter portion of the keyboard may also include a function and/or a special character key.

As mentioned, at least at least the letter portion of the keyboard may become/be invisible. As an example a switching means may be used to switch said portion from visible to invisible (e.g. and vise versa).

Note that according to one method, the function bar may be resized and/or moved on the screen, etc.

Note that preferably any portion preferably other than the functions portion (e.g. special characters portion) may be considered as a separate portion from the functions (bar) portion and all the functionalities (e.g. moving, resizing, etc.) described regarding the letter keys portion may also be applied to said separate portion.

According to one embodiment, the system may be defined to consider interactions with a first portion of a zone/key of the keyboard as to be ambiguously corresponding to any of at least some, preferably all, of the letters assigned to said zone/key. An interaction with a second portion of said key/zone (e.g. a portion near or adjacent to the extremities of the keyboard) may preferably correspond to the letter located at or near the interaction (e.g. tapping) impact on said key/zone. According to a preferred method, said second portion is preferably a portion of a zone which is near or adjacent to the extremities of the keyboard, and said first portion is preferably a portion of a zone other than said second portion of a/said zone. According to one aspect, said first and second portions may be a predefined portions or dynamically be defined based on the users interactions with keyboard.

As an example, FIG. 103 shows the letter portion of a keyboard of the invention having six zone/keys as described throughout this application. In this example, the said first portion of a key/zone is a portion located inside the (e.g. virtual) small area 103001 (e.g. or according to another example inside the (e.g. virtual) larger area 103002), and said second portion of a key/zone 103003 is a portion located outside the said small area 103001 (e.g. or according to another example outside the area larger area 103002). As an example, in order to enter the word "shapes", if for all of the letters the user taps inside said area on the corresponding keys/zone, the system may propose the word "shaped" as a having the highest priority. On the other hand, for all of the letters except the last letter the user taps inside the area and for the last letter he/she taps outside the area (e.g. on or near the letter "s") on the corresponding keys/zones the system may propose the word "shapes".

Note that according to one aspect, during the entry of a word, at least a number (e.g. one, two, etc.) of interactions (e.g. tapping actions) outside (e.g. or inside) the area may be necessary so that the system consider/activate the current embodiment. According to another embodiment, if the user provides at least a predefined number (e.g. one, two, etc.) of interactions (e.g. tapping actions) outside (e.g. or inside) said area, all of his/her tapping actions may be related to the characters on or near the tapping impacts preferably in the corresponding zones.

According to one embodiment, when a user interacts (e.g. taps) on a first (e.g. horizontal) zone, in addition to the characters ambiguously assigned to said zone, the system may also (e.g. first) consider at least one (e.g. preferably the first) character from a/the neighboring zone (e.g. preferably from the same horizontal row of zones) preferably near the corresponding user's (e.g. finger) interaction impact provided on said first zone. For example, by considering the keyboard of FIG. 101, if a user interacts (e.g. taps) on zone 101002 on a location near the zone 101001, in addition to ambiguously considering the letters assigned to the zone 101002 the system also considers at least one of the nearest characters (e.g. 'R') from the zone 101001. Note that the system may also consider (e.g. ambiguously) (e.g. additional) character's (e.g. any of the characters 'G, F, H") from the vertical row of zone/s (e.g. preferably at first from the adjacent zone (e.g. in this example, the zones 101003 and 101004), and the system (e.g. with less priority) may consider (e.g. ambiguously) (e.g. additional) character's from any other zone of the keyboard.

Note that as mentioned, according to one embodiment when the user interacts with a (e.g. preferably linear, such as a horizontal) zone, the system may preferably first consider the characters near (e.g. on and/or on left and/or right side of) the user's finger impact of an interaction (e.g. a tapping action) provided anywhere on a row of zones regardless of the zone on which said tapping action is provided. (e.g. If needed,) The system may (e.g. also) consider (e.g. additional) character/s preferably respectively from the zone on which the interaction (e.g. tapping action) is provided, the other horizontal zones, the other zones of the same side of the keyboard on which the interaction (e.g. tapping action) is provided and (e.g. finally) from other zones. In this embodiment, preferably at least a number of zones, optionally all of the (e.g. small) zones, are linear zones such as horizontal zones.

Note that according to one embodiment, according to one method, each row of the keyboard may be considered as one (e.g. small) zone.

According to one embodiment, instead of separating the (e.g. two) large ambiguous zones of the keyboard by a line, the characters within each (e.g. line/row) of the large zones may be (re)arranged (e.g. squeezed, shifted, etc., preferably without reducing the size of a (large) zone) within each of the large zones such that to provide a gap between the characters of a first large zone and the characters of a second large zone. This may avoid or at least reduce mistyping on the large ambiguous zones. FIG. 101E shows as an example, a keyboard of the invention having two large ambiguous zones 101101 and 101102. In this example the characters of each line of the large zones (e.g. the characters of each of the small zones 101001 to 101006) are squeezed such that to form the gap 101018 between the characters of said large zones 101101 and 101102. Note that as shown in the exemplary FIG. 101F, preferably, a virtual/invisible delimiting line 101009 traversing vertically preferably the middle of the gap 101018 defines the border line between the large zones (e.g. 101101 and 101102). In this case, as an example, typing errors of a user (e.g. a novice user who is used to typing on letters instead of typing on the small/large zones) may be reduced or eliminated. For example, when a user types fast and intends to tap on the letter 'T', he/she may not precisely tap on said letter and rather may tap on a location (e.g. 101111) near said letter (e.g. but still in the corresponding zone 101102). By having a security gap between each two neighboring (e.g. large/small) zones (e.g. preferably, half of the gap (e.g. 101018) belonging to each of the zones) mistyping errors on a corresponding zone can be reduced or eliminated.

Note that in any the embodiments described herein, according to one method, in order for the system to enter into a mode relating to a predefined orientation of a corresponding device/components, said corresponding device/components may be required to stay in said orientation for at least a predefined laps of time (e.g. so that to activate said mode). This will reduce or eliminate the unintentional movement/rotation actions.

In order to augment the accuracy of the system also permitting sloppy typing or some mistyping (e.g. typing on a wrong zone), the system may consider that a keyboard used by the system has one or more broadly ambiguous zones (herein, may be referred to as large zone/s) and one or more narrowly ambiguous zones (e.g. for/within each of the broadly ambiguous zones) (e.g. herein may be referred to as small zone/s). According to a preferred embodiment, the keyboard of the system may be considered to, preferably, have two broadly ambiguous zones each, preferably, having three narrowly ambiguous (e.g. preferably, horizontal) zones. As an example, FIG. 104A shows the keyboard of the invention having six small zones 104001 to 104006 (e.g. herein, may be referred to as to the (small) zones 1 to 6) each, preferably, having a few letters. Each of said zones may be considered as a narrowly ambiguous zone. The keyboard may also be considered to be divided into two broadly ambiguous zones 104011 and 104012 (e.g. respectively, herein may be referred to as to large zones interaction values 1 and 2) each having a larger (e.g. more letters than are on a small zone) number of letters. Note that the left broadly ambiguous zone 104011 preferably ambiguously includes (e.g. preferably at least) the letters of the left narrowly ambiguous zones 104001, 104003, 104005 (e.g. herein may be referred to as the left column of the small zones), and the right broadly ambiguous zone 104012 preferably ambiguously includes the (e.g. preferably at least) letters of the right narrowly ambiguous zones 104002, 104004, 104006 (e.g. herein may be referred to as the right column of the small zones). To simplify the description, a broadly ambiguous zone may herein be referred to as a large zone, and a narrowly ambiguous zone may herein be referred to as a small zone).

Note that according to one aspect, the left and/or right large zones described herein, may be designed to be arranged as upper and/or lower large zones (e.g. arranged vertically). Accordingly, the left and/or right small zones may be designed to be arranged horizontally, or other arrangement such as diagonally.

A user typing a word generally types on the small zones corresponding to the letters of the word. It may happen that the user does not type on a correct small zone corresponding to a letter because for example he may type fast or sloppy (e.g. he/she may type by mistake on a vertically neighboring small zone) (e.g. herein may be referred to as mistyping), but most probably he/she may generally type on a/the correct large zone corresponding to said letter (e.g. or small zone).

Note that typing on a keyboard having two ambiguous large zones is generally error-free typing because the zones are large. On the other hand, while typing accurately on large zones, a user typing a word may erroneously type on wrong small zones within the corresponding large zones.

By considering these principles, when a user types a word, the system may (e.g. simultaneously) consider, both, on/with which large zones and on/with which small zones the user interacts, to provide a highly accurate prediction (e.g. that may) also permitting some mistyping (e.g. on the small zones) (e.g. preferably, less mistyping for short words and more mistyping for long words).

As an example, FIG. 104B shows an exemplary portion 104100 of a database of words used by the system. In column 104104, a plurality of words are shown. In column 104102, for each of said words (as an example, the word "supports") the corresponding (e.g. required) (e.g. pressing) interactions with the small zones are shown in form of a sequence of digits (e.g. 42224123, corresponding to interacting with the small zones corresponding the word "supports"). Note that interaction with each of the small zones (e.g. see the small zones of FIG. 104A) is represented by its/the last digit of its reference number in the drawing (e.g. herein may be referred to as its small zone interaction value) in the corresponding sequence of digits. For example, the sequence of digits 42224123, represents interacting with the small zones 104004, 104002, 104002, 104002, 104004, 104001, 104002, and 104003.

Note that, each of said words also corresponds to interacting with a same sequence of interactions with the large zones of the keyboard as shown in column 104101. In this example, the sequence of key interactions with the large zones corresponding to said words are demonstrated by the sequence of digits (e.g. large zone interaction values) 12222121 wherein each digit of said sequence of digits represents the last digit of the corresponding large zone of the keyboard of the exemplary keyboard of FIG. 104A.

Column 104103 represents the frequency of use/priority of the corresponding words of column 104104.

According to a preferred method, after interacting with small zones corresponding to (e.g. entering) a word, the system may first relate said interactions to the corresponding large zones and select/consider the corresponding words of a corresponding database of words. The system may preferably sort/consider the order of said words based on the precision (e.g. degree of correct typing) of the corresponding small zones interacted by the user for the entry of a desired word (herein may be referred to as best match degree/value). For this, the system may preferably compare the small zones interactions (e.g. provided by the user) with each of the sequence of interactions with the small zones corresponding/required for the entry of a corresponding word as shown in column 104102. If more than one word has the same number of precise/correct interactions with the small zones, then preferably the system first proposes/considers the word with highest frequency of use among said more than one words.

In the current example, as an example, in order to enter the word "support", if the user types sloppily and instead of providing the sequence of small zone interaction 32224123 the user by mistake (e.g. 2 mispresses) provides the small zone interaction 32222121, the words with lowest number of mistaken small zone interactions among the zones corresponding to the large zone interactions 12222121 are the words "supports" and "simulate". The word "supports" has higher priority than the word "simulate" in a 1-gram database of words, therefore it may be presented as a first choice (e.g. the current predicted word). Note that if the system uses linguistic rules, (e.g. by considering the prefix "we") in some cases, the word "simulate" may be presented (e.g. "we simulate") as the current predicted word. For example, there may be no 2-gram entry for "we supports" or it may have a lower frequency of use).

Note, that according to a preferred method of proposing/predicting words, the system preferably proposes words from entries in a corresponding word database in the order from the greatest number of grams to the least number of grams corresponding to the input information.

The principle of proposing/predicting words just described may be applied to any of the inventions described in this application.

Note that according to the principles described, the system may consider/accept mistyping on small zones in a large zone but preferably/generally does not consider mistyping on large zones (e.g. unless no word or a very few corresponding words are found in the database).

Note that the system may also consider longer words such that their beginning portion (e.g. 1 to N beginning letters) corresponds to the large zones interactions provided by the user. Preferably, the system also considers such words when there is no or when there are a few number of words corresponding to the small zones interactions provided by a user (e.g. with a maximum permitted number of mistyping). As an example, as shown as an example in the table below,

| | | | |
|---|---|---|---|
| 2211112121 | 2631132363 | 15524 | understand |
| 2211112121 | 2633112321 | 2335 | inadequate | the large zone interactions 2211112121 corresponds only to two words in a/the database used by the system. The system may also consider one or more longer words beginning with said large zone (e.g. and best match small zones) interactions (e.g. 'understanding', 'inadequately', etc.).

Note that in some cases, the system may include only one word corresponding to a sequence of large key/zone interactions. This means that in some cases the user can type anywhere on the corresponding large zones and get his/her desired word.

Note that preferably, the system may also consider that the user has/may mistakenly pressed an (e.g. one or more) extra/additional zone interactions (e.g. the number of interaction with zones is greater than the number of characters of a word) during the entry of a word and therefore the system may propose one or more corresponding words by not considering a number (e.g. 1 to 2) of the zone interactions within a sequence of a zone interactions. On the other hand, the system may consider that the user may have omitted one or more zone interactions and therefore may propose longer words that include and/or correspond to the zones interactions provided by the user (e.g. also by considering mistyping errors).

Note that according to one method, the system may first select a number of words of a database that correspond to a sequence of large zone interaction, and among said selected words the system selects the words that best match with the corresponding small zones being interacted. According to another method, the system may first select the words that best match the interacted small zones, and preferably in some cases (e.g. when/where there are not enough corresponding words), the system may look for other words that correspond to the interacted large zones (e.g. by relating one or more of said interactions to interacting with a large zone other than the corresponding interacted large zone).

Note that according to one aspect, a word having a character corresponding to a small zone not neighboring an interacted small zone of a large zone may either not be considered by the system or may be given less priority (e.g. on the fly/dynamically). As an example, in the example of FIG. 104C, if a user interacts with the small zone 104001, the system may not consider the words that in the corresponding letter position have one of the letters of the not neighboring zone 104005 (e.g. the system my consider only the letters that are in the small zones 104001 and 104003 (shown by circle 1040111)). Or vise versa.

According to one aspect, in addition to the large zones and small zones consideration, the system may also consider the letter on/near which an interaction with a zone is provide (e.g. as a precise letter/character). The examples/principles of entry of precise characters (e.g. during the entry of an ambiguous word) have already been described in detail.

Note that according to a preferred method, each time a user interacts with an ambiguous letter zone, the system may (e.g. preferably simultaneously) relate said interaction to, both, the corresponding large ambiguous zone and the corresponding small ambiguous zone. Preferably, the corresponding word database used by the system is arranged (e.g. as shown in FIG. 104B) such that to relate each word (e.g. of an entry) to its corresponding large zones interactions and small zones interactions, also preferably including the priority of each/said word. According to one aspect, the keyboard may have a number of left large zones (e.g. 1040111 and 1040112 of FIG. 104C) and a number of right large zones (e.g. 1040113 and 1040114). Note that preferably in such case, according to one aspect, a small zone (e.g. 104003) may be included in two corresponding large zones.

Note that the keyboard, the large zones, the small zones, the arrangement of letters, the location of small and/or large zones, etc. are shown as examples to describe the principles to enhance the accuracy of the system based on/by considering a human/familiar way of interaction with a/the keyboard (e.g. of the invention). Any other type of keyboard, any number of large zones, any number of small zones, any key/zone and/or letter configuration, etc. may be considered for such purpose and/or based on principles described herein. According to one aspect, all of the words corresponding to a sequence of large zones interactions may be presented/considered by the system. According to another aspect, (e.g. among said words) some (e.g. at most a predefined number) of the words that best match interactions with the small zones (e.g. having least mistyping on small zones) may be presented/considered by the system. According to another method, words with lesser match (e.g. with the small zones) but having higher (e.g. very high) frequency of use may be given higher priority for/of presentation over the words having better/greater match (e.g. with the small zones) but having lower (e.g. very low) frequency of use, or vise versa.

As mentioned before, the system may have a number of (e.g. two) large zones wherein each of the large zones may have/include a number of small zones. According to one aspect said small zones may be/are (e.g. dynamically) defined, preferably, based on location on which the/a user interacts within a large zone. According to one method, a small zone is (e.g. dynamically) defined around and/or near the user's interaction impact with a large zone. Preferably, the small zone defined as such includes the corresponding (e.g. some) characters from the interacted large zone (e.g. only). As an example, FIG. 104D shows a keyboard of the invention having two large zones 104011 and 104012. In this example, the key/zone interaction 104111 is ambiguously related by the system to any of the neighboring characters (e.g. YUIHJK) to/of the interaction impact 104111 with the large zone 104012. Also in this example, the key/zone interaction 104112 is ambiguously related by the system to any of the neighboring characters (e.g. DFCV) to/of the interaction impact 104112 with the large zone 104011. Note that, preferably, the neighboring characters (e.g. BG) that do not belong to the interacted large zone 104011 might not considered by the system belong to another large zone). By considering the principles (e.g. of (e.g. interacting with) large and small zones) described, in this example, the system may propose the word 'if' as an example.

FIG. 104E shows another example of entering a word. In this example, the key/zone interaction 104211 is ambiguously related by the system to any of the neighboring characters (e.g. YUIHJK) to/of the interaction impact 104211 with the large zone 104012. Also in this example, the key/zone interaction 104212 is ambiguously related by the system to any of the neighboring characters (e.g. ERDF) to/of the interaction impact 104212. Note that, preferably, the neighboring characters (e.g. TG) that do not belong to the interacted large zone 104011 are not considered by the system. By considering the principles described, in this example, the system may propose the word 'if' (e.g. and not the word 'it').

Note that according to a none preferred method, all characters around the impact may be considered by the system, even if some of them (e.g. respectively, BG and TG in the examples above) belong to a large zone other than an interacted large zone.

The current aspect wherein the small zones are those near/around (including under) the user's impact on a large zone may be beneficial for languages having many characters (e.g. Russian) and/or languages (e.g. Arabic, Hebrew) that generally exclude some characters such as vowels from the keyboard.

Note that any number of large zones (e.g. 1, 2, more) and any number of small zones within a large zone based on any concept may be considered by people skilled in the art.

Note that according to one aspect, in some cases (e.g. because of the high frequency of a corresponding word) the system may first consider a character from the characters of a (e.g. an interacted) large zone (e.g. preferably but not limited to or corresponding to the interacted impact) other than the characters of the small zone related to the interaction impact.

As mentioned before, the methods of text entry described in this application are mainly/preferably considering typing correctly on large zones by permitting sloppy typing within a large zone. It must be noted that in some cases such as when no word or not enough words are found in a corresponding database for the input information (e.g. typing actions corresponding to a word) provided by a user, the system may also consider that the user may have mistyped on (e.g. not pressed a (e.g. one or more) correct large zone) large zones and therefore may proceed to a correction procedure relating to mistyping on large zones (e.g. too). In this case, the system may consider that one or more of the interactions (e.g. typing/tapping actions) of/corresponding to the input information may have been provided on a wrong large zone and, preferably, relates one, and if needed more, of the interactions/s to a large zone other than the one with which the interaction is provided).

Other methods of may be considered for the purpose of describing a method of text input by interacting with preferably two (e.g. or more or less) large zones and predicting words with high accuracy.

According to one embodiment, during the entry of a word, after considering the user's interactions with the large zones (e.g. and selecting a number (e.g. one or more) of the corresponding words of a database of words used by the system), the system may also consider the/said user's interaction impacts on the large zone(s) to propose the (e.g. one or more words among the) best matched words (e.g. from a/the corresponding selection of words) by the system to the user. Accordingly, one aspect may consist of prioritizing one or more words (e.g. of said corresponding selection of words) based on measuring the distance between the impacts of said user's interactions on a (e.g. large) key/zone and each corresponding character of a word (e.g. each of at least a number of words of the selection) (e.g. presented/displayed on any corresponding large zone) of said selection of words for the corresponding user's impact (e.g. on the touch sensitive keyboard). For this purpose one or more methods of measurement may be considered (e.g. the method of prediction based on the distance as described herein may be referred to as semi-predictive system/mode) such as:

a) 'exact measurement': the distance (e.g. for each character of a word) is preferably measured based on physical (e.g. linear) distance between the location of a desired character to be interacted on the touch sensitive keyboard corresponding to a character of a word and the actual corresponding user's impact location (e.g. on said touch sensitive keyboard). Such a distance may herein be referred to as error distance.

b) 'simplified measurement': the distance (e.g. for each character of a word) may be measured based on the number of characters between the location of a desired character to be interacted on the touch sensitive keyboard corresponding to a character of a word and the character closest to the user's impact location (e.g. on said touch sensitive keyboard). Such a distance may herein be referred to as error distance.

The methods of measuring described above may preferably be applied to each of the characters of a word of said selection of words. The total of distances for the characters of a word may be measured/calculated to provide a parameter that may herein be referred to as the total error distance (e.g. value).

According to a preferred method, the words of a selection of words may be presented/considered in an order from the lowest total error distance to the highest total error distance. Note that preferably, the words (e.g. of a selection) may belong to the entries of the database of words having the same number of grams (e.g. N is the same for all of the corresponding N-grams of the selection). Note that, different/plurality of selections of words corresponding to different value of N may be considered by the system from the corresponding N-gram entries.

In some cases (e.g. depending on the frequency of use of the words of the selection) the order of presentation may vary. For example, if the frequency of use of a word (e.g. of an N-gram entry) in the selection is low and its total error distance is also low, then said word may be given higher priority over a word of the selection that has higher priority and has a higher total error distance.

According to one embodiment, if the desired character is located on a row (e.g. of letters) other than the interacted row, then the total error distance may be augmented by a number (e.g. predefined number, preferably through a coefficient, etc.). For example, the error distance may be multiplied by n1 (e.g. n1=1) coefficient for the letters of the same row (e.g. within a same large zone) as the interaction impact. The coefficient of a neighboring row (e.g. within a same large zone) may be n2 (e.g. n2–6) and the coefficient for a non-neighboring row (e.g. within a same large zone) may be n3 (e.g. n3=12). As an example, if the error distance for typing action corresponding to a letter in a same small zone is 2, and the coefficient is 10, then the error distance value/number is 20. Also as an example, if the impact is erroneously provided in a neighboring small zone, then a first significant (e.g. penalty) number may be added to the total error distance number. Accordingly, as an example, if the impact is erroneously provided in a farther small zone, then a second significant (e.g. much larger penalty) number may be added to the total error distance number.

By considering the exemplary FIG. 104F, an example of the simplified measurement method is described herein. In this example, a virtual AZERTY keyboard is shown wherein a user has tapped twice 104311 and 104312 on the corresponding large zones respectively 104011 and 104012. In this example the impacts 104311 and 104312 of the user's interactions are provided respectively on the areas corresponding to the letter 'z' and 'h'. The error distance of all letters in the interacted row/small zones relating to the interacted impacts 104311 and 104312 within respectively the corresponding large zones 104011 and 104012 are shown in the respective tables 104411 and 104412.

In the example of FIG. 104G, the user's two consecutive impacts 104511 and 104512 are shown on a keyboard. As an example, by considering the simplified measurement method described herein, the system may best correspond two words 'il' and 'tu' to said interactions. The word 'tu' may be presented as the word having the highest priority because its total error distance (=2) is less than the total error distance (=3) of the word Note that in this example, in addition to its distance value from the impact, a penalty value of n1 (e.g. 5) may be added to the total error distance preferably for each of the letters of the neighboring row 104004 and a penalty value of n2 (e.g. 10) may be added to the total error distance preferably for each of the letters of the none neighboring row 104006.

Upon receiving a sequence of interactions (e.g. herein may be referred to as impacts) with a keyboard corresponding to entering a word, based on the principles described herein and by considering different methods/principles of word presentation/prediction, the system may present/predict one or more words. Herein, some more exemplary methods/principles are described. Each of the methods may be used separately or in combination with any of the other methods. Optionally any of the methods may not be used. Upon receiving a sequence of interactions, any one or more of the following methods/principles may be considered/combined:

A plurality of words preferably with higher matching value than a predefined required minimum matching distance value (i.e., words with lower than a predefined or dynamically defined total error distance value) from one or more N-gram (e.g. 0<N<6) database/s of words may be considered by the system (e.g. herein may be referred to as a considered group of words). For (e.g. words of) each N-gram database, the predictive system may consider a (e.g. different) required minimum matching value. Alternatively, a plurality of words preferably within a threshold range of total error distance values (e.g. predefined or dynamically defined values) starting from a lower (e.g. error distance) value (e.g. '0') and ending at a higher (e.g. error distance) value (e.g. '25') (e.g. herein may be referred to as error distance range) from one or more N-gram (e.g. 0<N<6) database/s of words may be considered. For each N-gram database, the predictive system may consider a (e.g. different) required error distance range. Optionally, said lower error distance value of the range may be the total error distance value of a word corresponding to the input information provided by a user that has the lowest error distance value (e.g. '4') of a group of corresponding words, and the higher error distance value may be a value dynamically calculated by adding a (e.g. predefined, or dynamically calculated) value (e.g. '19') to said lower error distance value (e.g. in this example, higher error distance value may be 23 (e.g. 4+19)).

Optionally, each of the groups is preferably sorted in order of matching value and/or frequency of the words, etc.

In a group words of considered from an n-gram database, the system may consider the corresponding word of an entry with highest frequency of use (e.g. for the purpose of simplification, when the frequency of a word is mentioned, it preferably refers to the frequency of the corresponding entry for the given word) as the current predicted word. According to one method, if the frequency of use of said word is lower than a (e.g. predefined or dynamically defined) value, then a word from a (n–1)-gram entry may be considered, and so on if needed (e.g. does not match the condition/s). If a word is found in this manner, then said word may be presented to the user as the current predicted word.

If no such a word is found, then, based on satisfying some condition/s, the system may consider a word from (n–1)-gram group of word. Said condition/s may be a) the matching value of the word to be considered from (n–1)-gram group is preferably required to be above the required matching value for the n-gram word b) and/or, its frequency of use to be above a predefined or a dynamically defined value. If such a word is found, then said word may be presented to the user as the current predicted word, if not found, the system may repeat the same procedure for the (N–2)-gram group and so on.

If at the end of the procedure no such a word is found, then, the system may present a word from an N-gram preferably with highest n value (e.g. with the highest frequency of use) or any other word based on some other criteria.

After a current predictive word is selected, a number of other considered words based on some criteria may be presented (e.g. in a word list) to the user for selection if desired.

According to one method, if a sequence of interactions (e.g. tapping) impacts are provided on the characters/letters of a keyboard and wherein said letters/characters form a word of the database (e.g. preferably, in order of the interaction impacts) and preferably wherein said word has a higher frequency than a predefined fixed or dynamically defined value (e.g. related to a selected current word or based on some other criteria), then said word may be presented as the current predicted word. Preferably, this rule is applied to a word of a 1-gram database of words.

Note that according to one method, the interaction impacts may be related to short words (e.g. words with the corresponding number of characters (e.g. equal to number of impacts) and/or to (e.g. the beginning characters of) longer words. The system may use a word completion system to predict and/or present a longer word.

Note that a correction system used by the system may relates an (e.g. one or more) impact to a character from another large zone. Preferably such correction system may be used if no word or not enough word is found to correspond to the input information provided by the user.

FIG. 104H shows an exemplary keyboard 104000 of the invention used by the system using the principles described herein to predict one or more words. As an example, an interaction impact 104021 with the (e.g. area related to the) letter 'Q' on the keyboard is shown. The error distance value of the letter 'Q' is preferably defined to be the value '0" because the impact is provided in said letter. The letters 'W', 'E', and 'R' are respectively, 1, 2, and 3 letter distance from the impact 104021. In this example, the coefficient used within all of the small zones is '1'. Therefore, the error distance value for the letters 'E', 'W', and 'R' are respectively, 1, 2, and 3.

As first example, the same rules with an added penalty may be applied to the characters of the neighboring small zone 104003. As an example, in addition to the error distance value, a first penalty value of n1 (e.g. n1=4) may be added to the total error distance for each character of a neighboring small zone (e.g. within the corresponding large zone), and a second (e.g. higher) penalty value of n2 (e.g. n1=8) may be added to the total error distance to the error distance of each character of next/farther small zone (e.g. within the corresponding large zone), and so on. Two exemplary scenarios may be considered:

a) The error distance from the impact for each character/letter may be calculated and a penalty (e.g. one or more different) value may be added to the error distance of each letter/character of a zone other than the zone on which the impact 104021 is provided. For example, as shown in FIG. 104H, the respective distance value of the letter W, E, and R, are 1, 2, and 3. The respective distance value of the letter A, S, D, and F in the neighboring small zone 104003 from the impact is 1, 2, 3, and 4. A penalty value (e.g. in this example, '4') is added to each of said letter distances because said letters are in a neighboring small zone related to the impact. By considering the same rule and adding an additional penalty (e.g. in this example, additional '4', total penalty value of '8') is added to each of the letters of the farther small zone 104005. In this example, the error distance values (e.g. including the penalties) for the letters Z, X, C and V are respectively, 10, 11, 12 and 13.

b) The distance from the impact may be calculated in each small zone as if the impact was generated on the vertically corresponding letter in any zone and a penalty may be added. In this example, the system may consider that the impact has been provided on the letter A. In this case, but a preferably higher penalty may be added to each of said letter distances from the imaginary impact. As an example, said penalty value may be '5'. In this case, the error distance value of the letters A, S, D, and F will be 5, 6, 7, and 8. By considering the same rule and adding an additional penalty value of (e.g. '5') to each of the letters of the small zone 104005, the error distance values for the letters Z, X, C and V will respectively be, 10, 11, 12 and 13.

On the right zone, an interaction is provided with the letter "U". The corresponding error distance value including the penalty for each of the letters are shown above each letter. Note that the methods of calculation described herein are exemplary. Other methods may be considered by people skilled in the art.

By considering the principles described and the keyboard of FIG. 104H, as an example, at the beginning of a sentence if a user types on the letters "dddord", the words in Table 1 may be considered from a 1-gram database of words by the system. If the error distance range for the words to be considered is for example between '0' to '20', then the words 'decide' will be excluded from consideration.

Different methods for selecting the presentation of the selected words may be considered. As a first example, the order of presentation of the words may be based on their frequency of the said words. The word with the highest frequency (e.g. of use) may be presented as the current predicted word and the rest may be presented in a word list as alternative words. According to a second example, the order of presentation may be based on ascending order of the each result of dividing the frequency of each of the words by its total error distance value. Other methods of presentation may be considered by people skilled in the art.

In the example of Table 1.1, the word 'afford' may preferably be presented as the current predicted word, and the rest of the words of Table 1 may be presented in a word list according to a method such as one of the methods described herein.

According to another example, if a user types on the letters "dddord" on the keyboard after entering the word 'you', the words in Table 2 may be considered from a 2-gram database of words by the system. In table 2.1, said words are presented according to consideration of their error distance values and the frequencies of their respective entries. As an example, as a result of said consideration, the word 'afford' may preferably be presented as the current predicted word, and the rest of the words of Table 2 may be presented in a word list.

According to another method of prediction, the directions/trajectory of interactions corresponding to input information provided by a user may be considered alone or in combination of any of the other methods described herein. As an example, after the system considers/predicts some words relating to the input information, among said words, the system may give priority to the words that the order of interacting with their consecutive letters on the corresponding letter locations best matches the trajectory of user's interactions (e.g. in X and or Y axis) with the keyboard for entering said input information. As an example, in this embodiment, if the user taps on the letters "fndnunj", by considering the system may consider the system may consider the word 'shaming" as the current predicted word and the word "working" as an alternative word. By considering the direction of interaction, In the current example, the system may give priority to the word "working" over the word "shaming" and preferably proposes the word "working" as the current predicted word. By combining this method with other methods of word prediction, the system may permit more sloppiness to a user typing text.

In the example of FIG. 104H, the letters of the keyboard are presented in a horizontally and/or vertically position relating to each other. According to one method, the distance between two adjacent letters may be considered to be the same regardless of their position relating to each other.

Note that according to one aspect, a keyboard used by the data entry system of the invention may have one or more, preferably two, horizontal large zone/s each having a number of (e.g. horizontal) small zones. As an example, each of the three horizontal rows of letters of a traditional (QWERTY) keyboard may be considered as a large zone (e.g. having 2 small zones).

Note that the phrases 'error distance' and 'distance error' used herein may preferably refer to same meaning.

According to a preferred method, selected/considered words from an N-gram database may be based on some calculation such as for example based on a value (e.g. herein may be referred to as combined value) combining (e.g. by adding, dividing, multiplying, etc.) the total error distance value (e.g. or alternatively, match value) and frequency of use of said words relative to the input information provided by a user. According to a preferred method, in order for a word to be considered/selected, said combined value may preferably be within a range of predefined or dynamically defined (e.g. maximum and minimum) values. According to one method, said predefined or dynamically defined values may vary for words from different N-gram databases (e.g. a 2-gram entry and a 3-gram entry may have/require different predefined or dynamically defined of (e.g. maximum and minimum) values).

According to one method, upon providing a sequence of interaction impacts with a keyboard to enter a word, if the current predicted word and another predicted word have similar characters except the their last letter, then the word that its last letter corresponds to the last impact (e.g. preferably, having a required minimum frequency of use) may be presented as the current predictive word by the system.

Note that the keyboard may have any number of large and/or small zones. As an example, the keyboard may have/constituted of one (e.g. the whole characters may constitute one large zone), two or more dynamic and/or fixed large zone.

Note that a dynamic small zone is defined in a (e.g. horizontal) row of letters on the side/s of an interaction impact, wherein said dynamic small zone includes a few (e.g. one, two, etc.) of characters near/next to the said impact from the corresponding side. Note that the number of assigned characters of each side of the impact may be different/vary.

Note that according to one method, the error distance within a small zone may be multiplied by a (e.g. one or more) first predefined number. A neighboring zone (of the corresponding large zone) may be multiplied by a second predefined number. And a zone which is not a neighboring zone may be multiplied by a $3^{rd}$ predefined number, etc.

As mentioned before, a word prediction system (e.g. of the invention) may have at least two large zones wherein a large zone may have one or more small zones.

Different other methods of predicting words may be considered such as:

a) When a user types (e.g. anywhere) on a large zone, according to one method, the system relates the input information corresponding to a word provided by the user (e.g. and related information such as, for example, letters pressed, large zone pressed, small zone pressed, distance between key presses, location of key presses, etc.) to a number of words of the database used by the system. Among the related words, the system may select one or more words that best match the user's interaction on small zones within the large zones for said input information (e.g. interacting with the large zones).

According to one method, the system may also consider the interaction impact locations within a small zone of said input information to prioritize the presentation of one or more words that best match said interaction impact locations within the small zones.

According to a preferred method, in order to give the user a great degree of freedom of typing sloppily while also permitting the user to enter words rarely used (e.g. a word that does not have the highest priority within the selected words) by typing with relatively high precision (e.g. relatively near and/or on desired characters as compared to undesired characters), a method of text entry is described herein:

According to one embodiment, if a word not having highest priority/frequency of use best matches (e.g. has the best matching value) the user's interactions impact locations (e.g. best matches based on the total error distance calculation) (e.g. note that a word may have one character only, therefore one impact location) within the small zones but said best match value is less than a predefined minimum match value/percentage, the system may preferably present a word having the highest priority among the words corresponding received input information as the current word. In this case said best matched word may be presented in a word list as an option (e.g. for a user to select). Said method may (e.g. or may not) be activated for a given predefined or dynamically defined minimum and/or maximum frequency of use values (e.g. word frequency), and/or upon some other condition.

Preferably, said/the required minimum match value may vary depending on the length of the word being entered (e.g. the number of characters of a word being entered is equal to the number of interacting impacts provided until then or the number of characters corresponding to a user's interaction). For example, for the words having 2, 3, and >3 characters, the required minimum matching value may respectively be 50%, 66% and 75%. As another example, depending on the number of characters corresponding to a word, the system may calculate (e.g. pre-calculated and/or dynamically on-the-fly) the required minimum matching value.

According to one method, the match value may be calculated based on the correct characters interacted during providing the input information corresponding to entering a desired word. As an example, FIG. 104I shows a keyboard of the invention wherein a user has interacted with the (e.g. areas corresponding to the) letters 'ljus' within the large zones 104011 and 104012. In this example, there is no minimum matching value required. In this example the corresponding precise (e.g. letters interacted by the user) word/chain of characters 104411 is shown in a word list. Accordingly, a number of selected words based on interacting with the large and/or small zones have been considered by the system wherein, among said selected words, those having the best match (e.g. based on the distances as described earlier) are presented to the user. In this example, those words are the words 'thus' (e.g. 50% match value) 104415, 'loud' (e.g. 50% match value) 104412, 'lois' (e.g. 50% match value) 104413 and 'this' (e.g. 25% match value) 104414. In this example, the word 'thus' has the highest priority/frequency of use among the selected words having the same best (e.g. highest) matching value, therefore it is proposed as the current predicted word.

In the example just described, by considering the principles of minimum matching number as described herein, as shown in FIG. 104J, the system may preferably present the word 'this' as the current predicted word, because the matching number of all of the (e.g. other) corresponding (e g presented) words are below the corresponding minimum matching number (e.g. they are below 75%), and the word 'this' has the highest priority/frequency of use. In this case the system may preferably present the word having the highest priority/frequency of use (e.g. by considering the user's interactions with the large and/or small zones (e.g. herein may be referred to as "fully predictive system"), regardless of a word's corresponding matching number (e.g. herein may be referred to as "semi-predictive system")) among the words corresponding to said input information, in this example the word 'this'. Other related words may preferably be shown in the word (options) list.

By providing such a predictive data entry system, to enter words used commonly/frequently, a user can generally type anywhere/sloppily on the corresponding large/small zones and most of the times get the desired word, and for the words that are not commonly used, the user may type on and/or near the corresponding letters of the desired word on the keyboard and most of the time get the desired word.

It must be noted that in the current embodiment, the words corresponding to user's interaction with the keyboard may preferably be considered from the same N-gram entries. The rules of predicting words from N-gram entries have also been described throughout this patent application.

Also it must be noted that according to one method, a word corresponding to an (e.g. shorter) N-gram (e.g. N=1) entry may be given higher priority of presentation over a corresponding word from a larger N-gram (e.g. N=2) entry even if said word of said shorter N-gram has higher frequency of use over said word of the larger N-gram, even if the word from shorter N-gram entry has lower matching result related to the word from the larger N-gram entry.

Also it must be noted that according to a second method, a word corresponding to an (e.g. larger) N-gram (e.g. N=2) entry may be given higher priority of presentation over a corresponding word from a shorter N-gram (e.g. N=1) if said word of said larger N-gram has higher frequency of use over said word of the shorter N-gram entry, even if the word from larger N-gram entry has lower matching result.

Also it must be noted that according to a third method, a first word corresponding to an N-gram entry may be given higher priority of presentation over a second word of any other N-gram entry of same number of grams (e.g. same N) if said first word has (e.g. significantly) higher frequency of use over said second word, even if the said first word has lower matching result than said second word.

According to one embodiment of the invention, the current (e.g. a first) word may be presented based on considering the user's interaction with a zone regardless of the impact of the user's interactions within said zone (e.g. based on the fully predictive system) and, preferably, at least some of the words of the wordlist are presented by (e.g. also) considering the distance of the impact from the characters/ letters within the corresponding small and/or large zones as described above/herein (e.g. based on the semi-predictive system).

In the example of FIG. 104J, after the user interacts with the (e.g. areas near the) letters "ljus" on the keyboard 104500 (e.g. the result is presented as a word 104510 in the wordlist 104515), the system proposes the word "this" having the highest priority among the words corresponding to the fully ambiguous (e.g. fully predictive) system, and the words "thus", "loud", and "lois" shown in the word list 104515 are predicted/presented based on the semi-predictive (e.g. semi ambiguous) system as described herein.

According to another embodiment, the current word may be a word related/based on the semi-predictive system, and at least one of the words of the wordlist may be predicted/ presented based on the fully predictive system.

According to a preferred embodiment, during the entry of a word (e.g. by a user), the system may (e.g. dynamically) decide if the current word should be presented based on the fully predictive system or based on the semi-predictive system (e.g. and similarly any other words in the word list). As an example, if the user's interactions with the zones is in an harmonious manner (e.g. the user types: approximately on a small zone, approximately on a same vertical axis on the large zones, etc.), the system may preferably present the currently predicted word based on the fully ambiguous/ predictive system, otherwise the currently predicted word may be presented based on the semi-predictive system.

In all embodiments described herein, according to one embodiment, at least one of the words of the wordlist may be presented based on the fully predictive system and/or based on the semi-predictive system.

Note that any of one or more features (e.g. fully predictive system, semi-predictive system, minimum matching number, etc.) may be used separately or in combination with each other and/or with others features described herein to predict/ present one or more words.

Note that, the keyboard may have any number and or configurations of large and/or small zones. For example, a large zone of the keyboard may be an entire horizontal line of the keyboard.

Also, as an example, the semi-predictive system (e.g. regarding error distance of an impact from the letters/ characters) may also consider the characters/letters of (e.g. small zones) of other (e.g. a neighboring) large zones.

b) Usually a user using the data entry system of the invention may type far from the horizontal edges of the corresponding large/small zones. According to one embodiment, if a user types on a character located on (e.g. or close to) the left or right edge of a horizontal zone (e.g. preferably, the character on the left edge of a left zone and the character on the right edge of a right zone), then the system may consider said character as being entered precisely (e.g. an identified character). By considering/combining the interactions that are provided far from (e.g. not close to) said edges within the small/large zones (e.g. ambiguous input signals) and the interactions provided on (e.g. close to) at least one of said edges within the small/large zones (e.g. precise input signals/characters) the system may predict one or more corresponding words from a database of words used by the system. According to one aspect (e.g. when the keyboard is in split mode), interacting with a/any of the characters on any edge of a small zone may be considered to be entered precisely.

According to one embodiment, during the entry (e.g. providing input information corresponding to a word) of a word, if a user types/interacts harmoniously (e.g. in substantially/approximately a same (e.g. vertical axis) on each of the (e.g. left and right) large zones of the keyboard (e.g. meaning that the user uses a single axis on the first large zone and a another single axis on the second large zone in order to enter a word), the system may preferably predict corresponding words based on the fully-predictive system/mode, otherwise the system preferably predicts corresponding words based on the semi-predictive system/mode.

Preferably, said (e.g. vertical) axis may be dynamically defined by the user and/or by the system during the entry of a word. For example, for entering a first word, the user may interact on a first axis on each of the large zones and for entering a second word or again the same word the user may interact on a second axis on each of the large zones.

Note that, during the interactions with the keyboard for entering a word, preferably the system highlights the locations of user's finger impacts on the keyboard (e.g. by showing spots. See FIG. 18F). Alternatively, the system may show an axis by other means such as printing a line. This may help the user to type more harmoniously if desired. After entering the word (e.g. by pressing the space key), the highlighted impacts preferably disappear.

In the exemplary FIG. 104K, shows the user's typing/tapping impacts 104631-104634 on a keyboard for entering a word. In this example, the system considers that the user has typed harmoniously and predicts the word "time" (e.g. by using the fully predictive system) because the user has typed the corresponding (e.g. some of the) characters of the word (e.g. approximately) on a first vertical axis (e.g. herein demonstrated by a line) 104611 on the corresponding side/large zone of the keyboard. In the exemplary FIG. 104L, the system also considers that the user has typed harmoniously and predicts the word "time" (e.g. by using the fully predictive system) because the user has typed the corresponding (e.g. some of the) characters of the word (e.g. approximately) on a second vertical axis (e.g. herein demonstrated by a line) 104612 on the corresponding side/large zone of the keyboard although the vertical axis 416611 and 104612 are on different locations of the keyboard.

In FIG. 104M, the system considers the user has not typed harmoniously because typing actions on a corresponding side/large zone of the keyboard are not provided on a same vertical axis. In this example, the system preferably relates the interactions to the word "line" (e.g. by using the semi predictive system) because the word 'line' has the highest frequency of use among the words that (e.g. most of) their characters are near the user's interaction impacts.

In the examples above, the user has typed one time on the left large zone, therefore, the corresponding touching point may preferably define and/or being considered as being on the axis of the left zone.

In the exemplary FIG. 104N, shows the tapping impacts 104831-104836) provided by a user to enter a word. The user has typed approximately on a same axis 104811 on the left large zone 104021 and approximately on a same axis 104812 on the right large zone 104822 of the keyboard 104800. In this example, the system preferably considers that the tapping actions for entering a word are provided harmoniously and as an example predicts (e.g. by using the fully predictive system) the word "harley". In the example of FIG. 104O, the first five tapping actions are provided in the same locations as of the FIG. 104N and the last tapping action 104836 which is provided far from the corresponding axis 104812. In this case, according to one method, the system may preferably consider that the tapping actions for entering a word are provided non-harmoniously and as an example predicts a word based on semi-predictive system, which in this case may be the word "hariri".

Different methods may be used to define if typing a word being entered is harmonious or not (e.g. herein may be referred to as inharmonious, unharmonious, none harmonious, non-harmonious). According to a first example, during the entry of a word, upon detecting a single inharmonious typing action (e.g. detecting one tapping action far from the (e.g. dynamic) vertical axis) the system may relate the whole typing action for entering a word to non-harmonious typing actions, while according to a second method the system preferably calculates the average of non-harmonious typing actions (e.g. calculating average mistyping distance) during the entry of a word to define if a user is typing a word harmoniously or none-harmoniously. As an example, if the result of calculation (e.g. herein may be referred to as the average of mistyping distance) is above a threshold, the system considers that the user's typing actions for entering the word are non-harmonious.

According to one embodiment, the average of mistyping distance corresponding/relating to the input information (e.g. key presses) provided during the entry of a word is calculated based on interactions (e.g. tapping actions) provided on all or (e.g. alternatively) any of the large zones separately. According to one method, if any of said averages exceeds said threshold, then the system preferably considers the whole corresponding interactions for entering a word as being provided inharmoniously (e.g. none harmonious manner). Preferably, depending on some parameters the threshold may vary. For example, said threshold may be smaller when entering a short word, and said threshold may be larger when entering a long word. Also, the threshold for consecutive interactions on a large zone may be smaller than the threshold for none consecutive interactions on a large zone, etc.

If a word is being entered harmoniously, then preferably the system preferably uses the fully predictive system (e.g. by relating each of the tapping actions to any of the characters the corresponding small and/or large zone) to predict a (e.g. one or more) word otherwise the system preferably uses the semi-predictive system (e.g. by considering the (e.g. error) distance's of the tapping/interaction impact/s from the corresponding/intended letter's of a word (e.g./i.e. average mistyping distance) to predict a (e.g. one or more) word. These matters have already been described in detail herein. According to one method, if the average of errors distance are beyond a predefined number/threshold, then the system may consider that the tapping actions are provided non-harmoniously, otherwise the system may consider the tapping actions as being provided harmoniously. Alternatively, if the distance between a first impact and a second impact on a/any large zone is beyond a predefined number/threshold the system may consider that the tapping actions are provided non-harmoniously, otherwise the system may consider the tapping actions as being provided harmoniously.

In a preferred embodiment of the invention, according to one method, a sequence of tapping actions may be considered as being none-harmonious (e.g. inharmonious) if two tapping actions on a large zone of a/the keyboard are provided on two different vertical axis (e.g. Y axis) that are distanced horizontally (e.g. on X axis) more than a predefined value from each other (e.g. Herein, the distance between any such two vertical axis may be referred to as X distance, and such predefined value may herein be referred to as maximum X distance permitted). Note that the maximum X distance permitted may vary based on conditions such as the length of the word (e.g. number of characters/ interactions/taps, etc.) being entered.

As mentioned before, different methods may be used to consider if a sequence of interaction with a keyboard to enter a word is provided harmoniously or inharmoniously. According to a first method, such a sequence may be considered as being inharmonious if any pair of interactions provided on a large zone of the keyboard has an X distance between them which is higher than the corresponding predefined maximum X distance permitted. According to a second method, such a sequence may be considered as being inharmonious if the average of X distances between (e.g. all of) said sequence of interactions (e.g. all pairs of interactions in said sequence) (e.g. herein may be referred to as X distance average) (e.g. corresponding to a word being entered) within one and/or more large zone/s is more than a predefined value (e.g. such a predefined average value may herein be referred to as maximum X distance average permitted). Note that the maximum X distance average permitted may vary based on one or more conditions such as the length of the word (e.g. number of characters/interactions/taps) being entered. Note that other methods for defining harmonious and inharmonious typing may be considered by people skilled in the art. Note that any of such methods can be applied separately or in combination with other method/s.

An X distance can be measured based on any measurement method/unit such as a precise distance measurement (e.g. millimeter, pixels) or any other (e.g. approximate unit) measurement (e.g. distance between letters). As an example, if the maximum X distance permitted is equal to 1 (one) letter distance (e.g. vertical typing axis permitted 104911 in FIG. 104P may include up to two adjacent letters), then as shown in the exemplary FIG. 104P, the typing actions provided on the large zone 104812 are considered to be harmonious by considering/based on the first method (e.g. the longest X distance between any of a pair of tapping impacts on said large zone is equal to 1). Accordingly, in FIG. 104O, the typing actions provided on the large zone 104022 are considered to be inharmonious by considering the first method (e.g. here the X distance value between two impacts is equal to 3).

With continuous description of current examples, in FIGS. 104N and 104P, the typing actions are preferably considered as being harmonious based on both methods just described. In FIGS. 104O and 104Q, the typing actions are preferably considered as inharmonious if the first method is applied, while it can be considered as harmonious if the second method is applied (e.g. the average X distance value is probably very low (e.g. lower than a predefined X distance average permitted) because most of the typing actions on each of the large zone are provided on approximately a narrow vertical axis).

Note that the calculation of any type of distances (e.g. X distance, X distance average, etc.) to define if a sequence of interactions (e.g. tapping action) on a keyboard to enter a word is harmonious or not may be based on the whole sequence of interactions (e.g. on more than one large zone), or a portion of said sequence, for example, those interactions which are provided on one/any of the large zones (e.g. preferably, the one with the highest value). Preferably, said portion comprises sequential interactions.

According to a preferred embodiment, if typing a word is detected as being harmonious, the current predicted word may be selected/presented based on the fully predictive system. Otherwise the system may propose the current word preferably based on the semi-predictive system. Accordingly, one or more additional words may be selected and presented in the/a wordlist, preferably, based on the semi-predictive system. According to one method, such word/s may be selected/predicted upon accomplishment of a condition such as if their error distance average (e.g. total error distance divided by the corresponding number of characters/ impacts on the keyboard) is smaller than a predefined value (e.g. herein such a predefined value may be referred to as maximum permitted error distance value). Optionally (e.g. additional) one or more other conditions such as the frequency of use (e.g. of a word) may also be required/ considered for selecting such words. Said maximum permitted error distance value may be different for words/chain of characters with different lengths (e.g. different number of characters). For some reasons, such as if there are not enough words that correspond to the condition just described, the system may select one or more words based on the fully predictive system.

According to one embodiment, the selected/proposed words may preferably have a frequency of use higher than a predefined value. Such value may vary based on parameters such as the length of the word to select and/or to which N-gram the word belongs (e.g. in which N-gram is being searched), etc.

According to one embodiment, a word belonging to a 1-gram entry (e.g. N=1) may be given a higher priority over a word from a poly gram entry (e.g. N>1). As an example, if a word from an N-gram entry has a very low error distance average (e.g. less than 2%, preferably 0) and has a frequency of use which is high (e.g. higher than a predefined value), said word will be given a higher priority over a word that belongs to a poly-gram entry with low frequency of use.

In the exemplary FIG. 104R, the user has provided a sequence of tapping action 104957 on the letters "iji". In this example, the system considers that the typing action is harmonious because the user has typed in an almost vertical axis on the large zone 104962. As described, in this case, the system preferably proposes a corresponding word (e.g. with the highest frequency of use) based on the fully ambiguous/ predictive system which in this case may be the word "you" 104950. The system preferably also selects one or more words based on the semi-predictive system wherein the corresponding error distance average of each of said words is below/less than (e.g. or equal to) a/the predefined maximum permitted error distance value. In this example, the system has found two words "phi" 104951 and "lol" 104952. In this example, the wordlist has still one available field 104953 (e.g. the other field 104955 is dedicated to the exact characters that have been typed). As described before, the system may select/propose another/a word based on the fully predictive system which in this example is the word "top". Note that the system may propose additional short and long words based on any of the fully and/or semi predictive systems and present them in an additional word list that can be presented to the user upon request (e.g. see wordlist 104958 of FIG. 104S).

It must be noted that any other method for providing the features of this invention (e.g. different methods of calculation to decide if a sequence of typing action is provided harmoniously or not, different methods of word prediction, etc,) described herein based on the principles of the invention may be considered by people skilled in the art.

Swiping methods of the invention for example by combining tapping actions and/or swiping actions (e.g. simple or complex gestures) have been described before in different patent application filed by this inventor. Said swiping methods may be used with any of the keyboards (e.g. the keyboard having six small letter-zones and/or two large letter zones) of the invention. According to one method, a short gliding action provided from a zone upwards or downwards may preferably correspond to interacting with said zone and the neighboring zone in the corresponding gliding direction. Accordingly, a long gliding action provided from a zone upwards or downwards may preferably correspond to interacting with said zone and the zone after the neighboring zone in the corresponding gliding direction. A gliding action ending outside the keyboard may preferably be resulted in adding a predefined character (e.g. space character) after a previous character or may result in providing a function.

As mentioned swiping actions over the (zones) of a keyboard may emulate other type of interactions such as tapping actions on a keyboard. Optionally, more than one swiping action may be used for entering a word. Preferably, each of said swiping actions may correspond to providing the input information (e.g. input signals) corresponding to a (e.g. different) portion of a desired word. Preferably at the end of the providing one or more swiping actions corresponding to a word, an end-of-the-word signal such as pressing on a space key, entering a special character or a function may inform the system that the input information corresponding to entering a word is ended. Preferably, in addition to providing one or more swiping action, one or more tapping actions corresponding to one or more characters of the desired word may be provided on a/the keyboard. By considering the combined input information (e.g. at least one swiping action and/or at least one tapping action) the system may predict a word. Note that, preferably, at least some of the input signals provided as such may ambiguously correspond to a plurality of characters.

Preferably, the beginning point and the ending point of a swiping action correspond to a tapping action provided on their respective points (on the keyboard). Preferably, a change at any point in the trajectory of a swiping action, and any other change such as a pause or change in speed of the gliding action may correspond to an additional tapping action provided on the respective point (on the keyboard).

As an example, in FIG. 105A of these principles:

The swiping action/trajectory 105011 may preferably correspond to two times interaction (e.g. two tapping actions) with the zone 105001.

The swiping action/trajectory 105012 may preferably correspond to interaction with the zones 105002 and 105003.

The swiping action/trajectory 105013 may preferably correspond to interaction with the zones 105005, 105003 and 105006.

The swiping action/trajectory 105014 may preferably correspond to interaction with the zones 105002, 105004 and 105006.

The swiping action/trajectory 105015 may preferably correspond to interaction with the zones 105002 and 105006. Alternatively, the swiping action/trajectory 105015 may correspond to interaction with the zones 105002, 105004 and 105006.

According to one method, each of two similar swiping actions provided in different/opposite directions may preferably correspond to different chain of characters. They preferably correspond to the order of characters printed on the keyboard or on corresponding zone(s). As an example, in FIG. 105B, the swiping action 105016 may correspond to the word "it" and the swiping action 105017 may correspond to the word "up".

As mentioned, a swiping system described here is preferably used to emulate/correspond to providing corresponding tapping actions on a keyboard. A swiping system may be used with any of the embodiment, principles, methods, examples, etc., of the invention.

As an example, the correction procedure of the invention correcting a word which is mistyped may be applied to the swiping method of the invention wherein at least some of the swiping actions provided to correspond to the input information corresponding to a desired word may be erroneously provided. As an example, in FIG. 105C swiping actions 105111 to 105115 respectively correspond to interacting with the keys 105005, 105004 and 105006-105003 and 105002-105004 and 105002-105001 and 105003-105002 and 105002-105004 and 105006. This input information corresponds rightfully (e.g. with no mistakes/mistyping) to all of the letters of the word 'configuration" and the system may preferably propose said word.

The data entry system of the invention permits a large percentage (e.g. from more than 34 percent for short words to up to 100% for long words) of sloppy/mis-tapping and/or erroneous interactions (e.g. swiping actions) corresponding to a word and still predicts the right word in most of the times. Note that preferably the tapping and/or swiping actions are rightfully provided on/between the corresponding large zones.

As an example, in FIG. 105D swiping actions 105211 to 105215 respectively correspond to interacting with the keys 105005, 105004 and 105006-105003 and 105004 (erroneous)-105004 and 105002-105001 and 105001 (erroneous)-105002 and 105002-105004 and 105004 (erroneous). By considering the principles of the two large zones and six small zones as described herein, the word that best matches this input information is the word 'configuration" and the system preferably proposes said word.

Note that the accuracy of the prediction may be augmented by considering language rules (e.g. by considering the one or more words preceding the current word being entered).

In the exemplary FIG. 105E a combination of swiping and tapping actions are rightfully provided to enter the word "configuration". Note that in this example, the tapping actions 105315/1 and 105315/2 replace the gliding action 105215 of FIG. 105D. The rest of the gliding actions of FIG. 105E are respectively similar to the gliding actions of FIG. 105D.

According to one method, each back and forth or circle based swiping action in a zone may preferably correspond to an additional interaction with said zone.

Note that the terms "gliding action" and "swiping action" used in this patent application have similar interpretation.

As mentioned before, swiping over the keys/zones on of a keyboard (e.g. of the invention) may simulate/emulate tapping actions on said keys/zones. As an example, according to one method, the beginning point and the ending point of a swiping action on a keyboard may emulate a tapping action on said points. Accordingly, a change of behavior such as a change of direction in a swiping trajectory at a point on a keyboard may also emulate a tapping action at said point. As such, all of the principles (e.g. fully predictive, semi-predictive, large zone, small zone, etc.) used by the word predictive system of the invention may be applied upon receiving input information/signals from one or more swiping and/or tapping actions (e.g. and/or combination of said swiping and said tapping actions) provided by a user to enter a word. As an example, in FIG. 105F, two consecutive short swiping actions 105971 and 105972 are provided on the keyboard having two large zones, 105981 and 105982, each having three small zones. In this example, the gliding actions correspond to/simulate the tapping actions on the letters "eamf". According to one method, as shown in the current figure, all of the predicted/proposed words may be based on the semi-predictive system. According to another method, at least some of the predicted/proposed words may be based on the fully-predictive system. As an example, in FIG. 105G, the gliding action 105973 also corresponds to tapping on the letters "eamf", but in this example, the current predicted word 105974 is proposed based on the fully predictive system and the other words in a word list 105975 are proposed based on the semi-predictive system.

Note that other methods of prediction and/or proposing words may be considered by people skilled in the art.

Note that swiping method described herein may be applied to any type of keyboard with any key arrangement, letter arrangement, etc. As an example, the swiping method of the invention may be included within a current swiping methods requiring a single swiping action for a word. Optionally, the swiping method of the invention may replace said current swiping methods.

According to one embodiment, instead of considering the swiping trajectory under the user's finger sliding over the letters/keys on a keyboard, the processor may relate the swiping trajectory to trajectory of a cursor sliding above the user's finger while the user slides his/finger on a keyboard. As an example, when the user starts a swiping action, a pointer may be located in a predefined location relative to, preferably above, his/her finger while sliding the finger on the keyboard. The system may relate the trajectory of said pointer sliding on the screen (e.g. instead of the trajectory the user's finger sliding on the screen) to a swiping input for entering data such as text/words as described here in this application or as known in the art. This may permit an open view of the characters being slided/swiped over, greatly reducing mistakes and/or frustration.

Note that the inventions, features, principles described herein may be combined, or replace each other in different applications/systems described herein.

According to one embodiment, (e.g. upon) a predefined interaction such as a gesture from or a long pressing on a character such as a letter on a (e.g. an ambiguous) key, said letter may be selected/entered by the system precisely (e.g. herein may be referred to as an identified character). During the entry of the input information (e.g. key presses on the corresponding ambiguous keys) the user may enter one or more identified characters of the word. By considering/combining the one or more ambiguous input signals (e.g. by tapping on ambiguous keys) and at least one or more identified characters (e.g. by long pressing on ambiguous keys) corresponding to a word the system may faster/more accurately predict a desired word.

As mentioned before, a keyboard of the invention may be divided into several zones (e.g. fixedly or dynamically). As an example, when a user interacts near an edge of a (e.g. fixed) zone with said zone, the system may relate said interaction with at least one of the characters of the neighboring (e.g. fixed) zone, preferably in addition to any of the characters of the interacted zone providing a dynamic zone interaction. As an example, when a user interacts within a horizontal zone of a keyboard near another horizontal zone of said keyboard, the system may relate said interaction to the characters of the interacted zone and preferably one or more characters (e.g. preferably those near/closed to the touching impact) of the/said neighboring zone. According to one embodiment, such an interaction may correspond to all of the characters of the corresponding (horizontal) row of zones. Note that according to one method, in addition, (e.g. with less priority) one or more characters from another neighboring zone preferably the characters that are close to the touching impact or (e.g. with still less priority) any other character of the keyboard may also be considered by the system. Based on the principles described, upon receiving a sequence of key/zone interaction the system may permit/propose a corresponding word.

Note the zones of the keyboard of the invention are generally horizontal long zones covering a large number (e.g. 4 to 6) characters of a row of (e/g/ a traditional) a keyboard. By tapping on a zone the system may relate said tapping action to any of the characters assigned to said zone. Note that as mentioned, upon interaction with a zone/key the number of characters considered by the system may vary/augment if the user provides an interaction with a zone near another zone.

Usually a user typing (e.g. a long word) types with more precision the beginning and/or the ending characters of a word. By considering this fact, a method of auto-correction may be provided to correct mistyping or misspelling of a word (being) typed. According to one embodiment, when a word is being entered, the system may scan the words corresponding to the input information provided by the user (e.g. starting from the first character towards the last character, and/or starting from the last character towards the first character). The words that their beginning portion and/or the ending portion best match the corresponding input information provided by the user may be presented to the user. Note that the input information may include ambiguous input information (e.g. by tapping on ambiguous keys) and/or precise input information (e.g. by entering identified/precise character/s). Preferably, the length of the words being scanned are close to the number of characters corresponding to the input information provided by the user (e.g. same length, or shorter or larger words having for example less or more N characters wherein N is preferably 1 or 2).

Note that for better accuracy of prediction, words that are selected/presented are those that the rest of their characters best match the corresponding input information.

Note that preferably the zones of the keyboard are horizontal each corresponding to a number of characters of a row of a (e.g. traditional) keyboard.

According to one embodiment, a traditional (e.g. QWERTY) keyboard may be considered by the word predictive the system as having three zones (e.g. each zone corresponds/covers/comprises a different horizontal row of the keyboard.

Note that a word being selected based on the input information provided by a user is preferably selected based on a combination of parameters such as frequency of use, the best match interacted narrow and/or large zones, direction of taps on in a corresponding sequence of taps on the large zones described in this application, the corresponding word/s being from a 1-gram or being a (the last) word of a N-gram entry wherein N>1, etc.

As an example, for a word having a higher frequency of use may be given a higher priority over another word that has less frequency of use even if it (e.g. said another word) better matches the (e.g. narrow/large) zones being interacted by the user in the corresponding input information (or vise versa).

A keyboard of the invention in a small form factor (e.g. the keyboard of FIG. 106A) may be used with a wearable device such as a Smartwatch. In FIG. 106A a such keyboard in an on-screen version is implemented in a wrist-mounted Smartwatch 106000. In this example, the on-screen keyboard is in its visible version. FIG. 106B shows the same keyboard in its invisible mode.

As mentioned before, the keyboard of the invention may also have hard keys version wherein each of the hard keys represent one of the zones on the on-screen keyboard of the invention. At least substantially all of the principles of the data entry system of the invention (e.g. (6) small zones, (2) large zones, correction of mistyping, etc.) may preferably be applied to the virtual/on-screen keyboards of the invention may be applied to the hard keys version.

In FIG. 106C, the hard keys version 106201 of the keyboard of the invention is implemented on a bracelet of and wirelessly and/or by wires is connected to a wearable/small device (e.g. such as a Smartwatch) and/or to another device. The assignment of characters to the keys may be based on principles described herein such as that of FIG. 101B.

Note that the corresponding device may also include a soft/virtual version of the keyboard (e.g. for entering identified characters (e.g. letters and/or special characters).

Note that the hard keys version of the system can be implemented and/or used with any type of device such as a pendent electronic device, a wrist mounted device, etc.

It must be noted that the hard/physical keys may be of any kind According to one aspect, said keys may have a touch sensitive surface so that gliding actions in different directions (e.g. to permit entering precise character and/or function as described for on-screen zone/keys).

According to one embodiment, during the entry of a word, the word which is being shown/entered in a corresponding text (field) may be duplicated (e.g. along with surrounding text, e.g. in the same sentence/paragraph) and shown in another location on the screen of the corresponding device. As an example, said word may be shown in preferably a none-interactable window preferably used for presentation purpose. Preferably, said window is located on or near the corresponding keyboard and/or the corresponding word list on the screen. Alternatively, said window is an independent and/or interactable window. This may be beneficial for many reasons such as a) if the word being entered in a text is located under the keyboard or under any other window on the screen the user may see the duplicated word, b) the duplicated word is close to or on the keyboard close to the other predicted/proposed words in the word list, etc. As an example, a keyboard on the screen of a smartwatch may occupy a substantial portion of the screen. A user typing a word may not be able to see what he/she is typing because the word being typed may be covered the keyboard. In this case a/said duplicated word may preferably be displayed in an inactive window (e.g. to not disrupt interacting with the keyboard) on the screen. Said duplicated word may preferably be shown in a large font (e.g. distinguished/highlighted in some manner). The principles described may be applied to any word on/near (e.g. after) which a cursor/caret is positioned.

FIG. 106D shows as an example, a user entering text using a very small device such as a smartwatch. In this example, the word 'the' 106301 is predicted by the system as the best choice for the input information provided by the user. In this example, the keyboard 106308 is covering a substantial portion of the screen of the device and the word 'the' may be entered in the/a text field (e.g. that may be situated) under the keyboard or not being shown for a reason such as the presence of the keyboard on screen. A copy 106301 of said word is also shown on the keyboard and preferably is not (e.g. user or touch) interactive. In this example, said copied word is displayed near an interactive word list 106302.

FIG. 107A shows, as an example, a close view of an exemplary function keys/bar of a keyboard (e.g. of the invention). In this example, an interaction such as a pressing action provided on each of the keys 107601, 107602 and 107603, may respectively correspond to entering a dot, pressing/providing the backspace key/function once and pressing/providing the space key/function once. Accordingly, providing a gliding action from anywhere on a key (e.g. 107602) in a different predefined direction (e.g. 107607) may correspond to a predefined character and/or function (e.g. keyboard settings). Note that according to an aspect of the invention, each time a user touches a key to provide a gliding action the system considers that said touching action is provided on the center of said key. The predefined direction (e.g. towards upper-left) of a gesture is calculated/defined from said touching point. In this example, providing a gliding action from anywhere on a key 107601 towards upper left may preferably correspond to entering a character or a function represented by the icon (e.g. '?') printed on the upper left of the key 107601. Note that in this example, preferably up to eight different directions for gliding actions provided from a key may be considered. Note that the assignments of characters/functions to the function keys may vary.

In this example, a gesture provided (e.g. from anywhere) on/from the key 107603 towards the icon '123' or the icon 'abc' may respectively correspond to switching the system to precise special character mode or to precise letter mode.

According to one embodiment a predefined interaction such as a gliding action provided from a window/key towards a predefined direction may switch back the system to the ambiguous mode. In the example of FIG. 107A, a gesture provided (e.g. from anywhere) on/from the key 107603 towards lower-right may correspond to switching the system to ambiguous mode.

A color picker and/or a theme picker can be used with the keyboard to change the color and/or the (e.g. background) theme of the keyboard based on the user's desire. Preferably, tapping and/or sliding on a color picker window including a number of color and/or on a theme picker window having samples of themes may select said color and/or theme on the fly such that the user can see the color and/or theme of the keyboard changing. Preferably, upon an interaction with a key, such as a tapping action and/or a gliding action from a key towards a predefined direction, a color and/or theme picker may be presented/accessed. Note that, preferably, the keyboard wholly or partially may not be covered by the color/theme picker so that the user can see the color and/or theme of the keyboard changing upon sliding over a color/theme picker and/or selecting a color/theme. This method may be used for other tasks such as selecting other elements (e.g. pictures, videos, music, etc.) to use over/with the keyboard. In FIG. 107B color picker window 107702 is presented on the screen upon providing a gesture 107701 from the space key towards the color picker icon on said key, the user then, has selected the pink color from the color picker and the keyboard color has changed to pink.

Note that some special characters are usually used during the entry of a word or immediately after that. As an example, the symbol ";" is usually used at the end of a word. By considering this, more special characters may become available to a user without the necessity of switching the keyboard into special character mode. According to one embodiment, a function key of the system may be used to enter/activate a first group of special character and/or functions while not entering letters/words, and the same function key may be used to enter/activate a second group of characters and/or functions. As an example, FIG. 107C shows the status of the function keys 107711 to 107713 during the entry of the word (e.g. 'what") or when a/the caret/cursor 107708 is attached (e.g. positioned at the end of) a/said word. As shown in this example, the function key 107713 is related to entering the a first group of characters and/or functions. After providing a predefined action such as pressing the space key, at least one of the functions keys may become related to entering a second group of character. The exemplary FIG. 107D shows the status of the/said function keys after pressing the space key or when a/the caret/cursor 107718 if not attached to a word. In this example, the function key 107713 (e.g. has changed its status and) is related to entering a second/another group of characters and/or functions. This permits to entering special characters/functions without switching the system/keyboard to special character mode most of the time. In this example, the other functions keys 107711 and 107712 have not changed their status and remained unchanged.

Note that according to a first method, the functions of a function key may change after entering a predefined command such pressing the space key, activating the "Enter" function, etc. According to a second method, the functions of a function key may (e.g. also) change after entering a special character at the end of a word/character.

In order to still more reduce the necessity of switching the keyboard to special character mode, a row of digits 0-9 may be added to the first layer (e.g. letter layer) of the keyboard. In exemplary FIG. 107E, the row of digit keys 107721 is added to the keyboard. FIG. 107F shows another example of adding the digit keys row to the keyboard. In this example, the row of digit keys occupy less space that may permit to also add (an) additional function key 107714 to the keyboard.

Note that the number of special characters and/or functions, their nature, etc., may vary. Those used in these Figures are used as examples to describe the invention only.

For some reasons such as because the functions keys may be small and the sliding actions towards right from a function key may be difficult to recognize by the system, according to one embodiment, providing sliding actions from a letter zone towards right (e.g. right, upper-right, lower-right) and exiting the letter zones/keyboard may be related to duplicating a gliding action provided on/from the corresponding function key (e.g. the function key located in the same row of keys of the keyboard). As an example, as shown in FIG. 107F, a gliding action 107731 provided from the letter zone 107004 towards right and ending outside the letter zones may be related to entering the character ")". Accordingly, the exemplary gliding action 107732 may be related to entering the character ":".

According to the principles described, according to one method, a gliding action provided from a letter zone towards up and end ending outside the letter zones/keyboard may be related to the "shift" function (e.g. capitalizing a corresponding character).

Note that the principle of the function keys described herein may be used with any type of keyboard having any type of key configuration Note that the keyboards described in this patent application, specifically, the one with the vertical function bar (e.g. 101C) may be used with and/or integrated within any type of device with any size of the screen such as a Smartwatch, a Smartphone, a tablet, a large screen of or related to a (e.g. wearable) computing device, etc., while keeping the user's typing experience at a very high level (fast, accurate, comfortable, etc.). Also, any one or components of an input interface (e.g. a keyboard, etc.) described herein may be integrated with any type of keyboard (e.g. of the invention).

Note that according to one method, a first portion of the precise keyboard may include the letters corresponding to the letters of a first large (e.g. left side) ambiguous zone of the keyboard in ambiguous mode, and a second portion of the precise keyboard may include the letters corresponding to the letters of a second large (e.g. right side) ambiguous zone of the keyboard in ambiguous mode.

According to one method, each interaction with the backspace key deletes a single character or a number of characters, respectively corresponding a tapping action or to a gliding action, that was provided before the cursor in a text.

Note that all of the principles of the (e.g. word predictive) data entry system of the invention may be used with any of the keyboards of the invention.

Note that tapping actions and gliding actions described throughout this application may be provided in the air on/related-to a virtual/imaginary keyboard.

Note that slight changes to a standard letter arrangement of a traditional (e.g. on-screen) keyboard may be permitted and used by the data entry system of the invention. As an example, in a Chinese language, the letters I and L may be assigned (e.g. swapped) to different zones for better prediction.

Battery consumption is a key issue in small devices such as smartwatches. According to a first embodiment, a device such as, for example, a smartwatch may have a sensing means to recognize/measure the orientation and/or position of at least a component, such as the screen (e.g. relative to the ground/earth), of the device. According to one aspect, preferably when the device is not in use (e.g. active use by a user), when the component, such as the screen, of the device is in a predefined (e.g. approximate) position (e.g. within a (e.g. predefined) attribute such as range) such as facing a user's face, the component, such as the screen, of the device may activate (e.g. turns on and/or carries out some function). Preferably, in such condition/situation, according to one aspect, the smartwatch may show the time. According to another aspect, the smartwatch may show a content regarding the latest notification alert. According to one method, the component, such as the screen, turns on after a predefined lapse of time when the component, such as the screen, is in said predefined (e.g. approximate) position. Accordingly, when the component, such as the screen, changes said position/orientation and/or after another predefined lapse of time, the component, such as the screen, turns off.

According to a second embodiment, upon providing a predefined moving (e.g. rotating, shaking, etc.) action such as a (e.g. quick (e.g. within a predefined short laps of time)) back-and-forth rotating action (e.g. to a device) the processor of a corresponding device may relate said moving action to a preferably predefined action. Preferably said back and forth moving action is provided within a predefined lapse of time to activate said predefined action. Preferably, during said back-and-forth moving action the orientation (e.g. relative to the ground/earth and/or gravitational field) of a component (e.g. display) of the device is significantly changed (e.g. the orientation goes outside a predefined threshold range) and is brought back to an orientation substantially similar to the original orientation (e.g. orientation gets back within said threshold range).

As an example, after/upon providing a back-and-forth rotating action to/with an (e.g. a wrist-mounted) electronic device such as a smartwatch (e.g. by rotating the wrist wearing a smartwatch), an action may be activated (e.g. preferably within said electronic device). According to one example, said action may be at least one of the following examples:

a) turning on and/or off the display of the device. b) displaying time. c) activating (e.g. by making the focus on) an application such as a messaging application. d) activating a function within an application. etc.

According to one embodiment, back and forth moving/rotating actions may switch the system/device between a first mode such as a power saving mode and a second mode such as a none power saving mode (e.g. or vice versa). As an example, when the system is in a power saving mode, a back-and-forth rotating action of the device may enter the system into a none power saving mode. Optionally, this embodiment may be combined with the embodiment wherein a predefined orientation of the device may be related to a predefined action. As an example, if the device is in a predefined orientation relating to turning off the screen of the device, a back-and-forth rotating action of the device may turn on the screen. Also as an example, if the device is in a predefined orientation relating to turning on the screen of the device, a back-and-forth rotating action of the device may turn off the screen.

According to one concept/example, when the screen of the device enters into a predefined orientation such substantially horizontal orientation (e.g. from another orientation), the system may enter into a first predefined mode (e.g. the screen of the device turns on from a turn-off mode) (e.g. the system shows a watch face/time). According to one concept, a first back and forth movement (e.g. rotation. Herein may be referred to as a flicking action) may enter the system into a second mode (e.g. shows the interface of an application such as a messaging app). In this case, according to one method, a second back and forth movement (e.g. rotation) enters the system into a third mode (e.g. the system turns off the screen). In this case, according to one example, upon an additional back and forth action the system may enter in a loop by entering into said first predefined mode (e.g. shows the watch face/time), and so on.

With the continuous description of the current embodiment, according to one concept/example, when the screen of the device enters into a predefined orientation such as an orientation out of the ranges of said substantially horizontal orientation (e.g. from said substantially horizontal orientation) the system may enter into a first predefined mode (e.g. turns off the screen). According to one concept, a first back and forth movement (e.g. rotation) may enter the system into a second mode (e.g. the system shows a watch face/time). In this case, according to one method, a second back and forth movement (e.g. rotation) enters the system into a third mode (e.g. shows the interface of an application such as a messaging app). In this case, according to one example, upon an additional back and forth action the system enters in a loop by entering into said first predefined mode (e.g. turning off the screen), and so on.

According to a first embodiment, each of a (e.g. predefined) number of said predefined back-and-forth movements preferably activates a different action. As an example, upon each of said movements a next upcoming event/task (e.g. calendar item) may be presented to a user. According to another example, upon each of said movements, the system scrolls within the items of a menu.

According to a second embodiment, a first and a second such a predefined back-and-forth movements switch the system back-and-forth between two different actions (e.g. activates back and forth two different applications).

According to one example of the principles described, while wearing a smartwatch on his/her wrist and using a first application such as a browser on the screen of a smartwatch, a quick (e.g. less than 200 milliseconds) back-and-forth twisting/rotating action (e.g. such that to exit the screen of the device outside the boundaries of a predefined threshold range and bringing the orientation of the screen back inside the boundaries of a threshold range) (e.g. preferably within a predefined laps of time) of the user's wrist wearing the smartwatch may result in the system to enter into a messaging application (e.g. showing a (e.g. last) received message, opening a draft page of a messaging app to type a message and preferably send it, etc.). According to a preferred aspect, an additional a similar back-and-forth twisting/rotating action may result in entering the system back into the browsing application.

According to one embodiment, a different position/orientation of a component (e.g. screen) of a device (e.g. Smartwatch) may be related by the processor of the device to a different function (e.g. activating a different application).

According to one embodiment, preferably within a predefined lapse of time, after receiving a notification alert, positioning/orienting a component (e.g. display) of a device (e.g. Smartwatch) within a threshold range may result/cause the system to activate an action such as to show a content (e.g. a received message, an interface of a corresponding messaging application, etc.) corresponding to said notification alert.

According to one method, a first back-and-forth moving action such as (e.g. rotating the arm wearing a wrist-mounted electronic device) applied to an electronic device may activate a predefined application such as a predefined messaging application. A next back-and-forth (rotating) action may activate another application such as the application that was activated before providing said first (e.g. rotating) action, or it may be related to a new application. According to one method, said predefined lapse of time may vary and may be defined by a user, manufacturer, or upon completion of a condition (e.g. by the system).

According to one embodiment, when a keyboard is displayed on a screen, at least a (e.g. a duplication of a) portion of the text near/around the/a cursor (e.g. caret) within a text field (e.g. herein may be referred to as main text field) on the screen (e.g. wherein said portion of text may be visible or it may not be visible for example because the keyboards covers said portion) may be presented within a window (e.g. herein may be referred to as history window) visible to the user. Preferably said history window is located on and/or near the keyboard so that when the user interacts with the keyboard he/she sees the output without moving the eyes far from the keyboard. This matter has already been described in detail in a previously in detail in previous (e.g. PCT) patent applications filed by this inventor, which are entirely included herein by reference.

FIG. 106E shows as an example, a keyboard of the invention having a history window 106305 is located on a portion of the keyboard. In FIG. 106F, a history window 106507 is located outside the keyboard in a window next to the word list. According to one aspect, the word list window and the history window are separate windows. According to another aspect, the word list and the history window are included in a single/same window.

Note that when a cursor is moved (e.g. by typing or by interacting with a corresponding text) within the text in the main text field, the corresponding cursor is preferably also moved accordingly within the text in the history window, or vise versa.

Note that if the location of a cursor within the text in the main text field is changed, then preferably, the text within the history window may be updated/changed to reflect/show the text near/around the cursor in the main text field, or vise versa.

Note that when a word is selected, a number of corresponding alternative words (e.g. said word and said alternative words may preferably correspond to a same input information) is preferably presented in the word list.

According to a first aspect the history window and/or the word list may not be interactive while according to a second aspect the history window and/or the word list may be interactive. In this case, as an example, selecting a word from the text within the history window may correspond to selecting the corresponding word within the main text field. Also as an example, preferably if the word list is not interactive, according to one method, proving a gliding action traversing a word (e.g. or in the direction of a word) within/of a word list may correspond to entering/selecting said word. In this case, according to one method, said gliding action may begin from at least one of, the keyboard surface, said word, the outside/edge of the screen towards the inside of the screen, etc.

FIG. 106F shows as an example, a keyboard of the invention having a 3 by 3 matrix rows of keys 106509. In this example, the history window 106507 and the word list 106508 are located outside the keys of the keyboard (e.g. both in a same window or each having its own window). As mentioned, none, one or all of said the history window 106507 and the word list 106508 may be none interactive. According to one method, providing a (e.g. vertical) gliding action 106501 from outside the screen towards inside the screen traversing a first word (e.g. "meetings") may correspond to selecting/entering said first word, and providing a (e.g. vertical) gliding action 106502 from outside the screen towards inside the screen traversing a second word (e.g. "beating") may correspond to selecting/entering said second word. Also/alternatively, providing a (e.g. vertical) gliding action 106503 from inside the screen towards outside the screen traversing a word (e.g. "keeping") may correspond to selecting/entering said word.

In a preferred embodiment, the word list and the history window are both none-interactive. This may permit have a very thin history window and a very thin word list, permitting to enlarge the (e.g. letter) keys/zones (e.g. vertically) (e.g. on a small display) of the keyboard. FIG. 106G shows an as example, a very thin history line/window 106517 and a very thin word list 106518 presented on a row of keys 106519 of a keyboard of the invention. In this example, preferably, both, the history line/window and the word list are not interactive. This preferably means that a tapping action on the wordlist and/or the history window is related by the processor to interacting with the corresponding interacted key. In this example, the keyboard of the invention substantially occupies the whole surface of the corresponding device (e.g. smartwatch) permitting the keyboard 106500 to have very large keys/zones permitting comfortable interaction with the keyboard.

Different methods for capturing an event and relating to selecting a word of the word list may be considered. As an example, a visible/invisible (e/g/ narrow) window/bar (e.g. not shown) may be implemented on an edge (e.g. 106510 of FIG. 106F) of the screen corresponding to the word list such that a gliding action (e.g. 106501) provided from outside/edge of the screen towards the inside the screen at first interacts with said bar. Upon such interaction, the system may preferably relate said gliding action (e.g. 106501) to a function/symbol such as, for example, entering/selecting a corresponding word (e.g. "meetings") of the wordlist. Implementation of a narrow window for capturing an event and the use of it have already been described in detail by this inventor.

According to another method, a corresponding external (e.g. upper) row of keys (e.g. 106519) of the keyboard may preferably be adjacent (e.g. without any gap) to the corresponding edge 106520 of the corresponding screen of the device such that a gliding action (e.g. 106527) provided from (e.g. outside of) said edge 106520 of the screen towards the inside the screen at first interacts with a key of said row of keys 106519 of the keyboard and wherein upon detecting said gliding action, the system relates said gliding action to a function/symbol such as, for example, entering/selecting a corresponding word (e.g. "meetings") of the wordlist.

According to one method, the history (e.g. window) is printed anywhere on the input interface (e.g. on (e.g. at least the letter) keys/zones, or on the window corresponding to the word list, or etc. According to another method, the history window is printed outside the input interface.

If the history window (e.g. 106507) is interactive, then according to one method, it may preferably include a cursor/caret that can be relocated in the text of the history window upon a user's (e.g. finger) interaction with the history window. Also, preferably, the content of the history window may be scrolled in a desired direction upon a swiping action (e.g. leftwards 106504, rightwards 106505, upwards, downwards, etc.) provided in a corresponding direction.

Note that other methods for selecting a word of the word list and/or interacting with the history window may be considered by people skilled in the art. For example, a gliding action provided from inside of the screen (e.g. from the keyboard) towards upper-left, upwards and towards upper-right may respectively correspond a left word, a center word and a right word of the word list.

It must be noted that the screen of the device may have any shape such as square, rectangular, round, etc. In case of a round screen, the word list and/or history window may be adjacent and/or parallel on/to the edge of the screen. Preferably/alternatively, the keyboard may be configured such that to be conform to the shape of the screen.

Note that a selected word is preferably highlighted within the history window. Note that preferably a/the current word is considered by the system as a selected word. Therefore, at least some, preferably all, of the principles, aspects, etc., related to a selected word is preferably applied to a current word (e.g. and vice versa).

According to one embodiment, a number of predefined interactions, such as gliding actions provided in different predefined directions, may move the cursor in corresponding directions within the text in the main text field and/or in the text within the a/the corresponding history window, or vise versa. Preferably, different types of gliding actions provided in a same direction may correspond to differently moving the cursor in a same direction. As an example, a first type of gliding action such as a slow or a long gliding action in a predefined direction may correspond to moving the cursor over several characters (e.g. moving the cursor word by word), and a second type of gliding action such as a fast or a short gliding action in the same predefined direction may correspond to moving the cursor one character (e.g. moving the cursor character by character), or vice versa. In the example of FIG. 106G providing gliding actions in different predefined directions from the key 106528 may be related by the system to moving a cursor in corresponding directions within a corresponding main text field and the corresponding history window.

According to one embodiment, when a keyboard is displayed on the screen a predefined interaction, such as a tapping action or a gliding action provided in a direction from a key/window presented on the screen, may remove the keyboard and replace it by a small window/icon. Said small window is preferably displayed on a location on the screen that is not used or is not often used. A predefined interaction such as a tapping action on said small window may preferably bring back the keyboard on the screen. In this case, the small window may be removed from the screen. According to one method, the small window may always be present on the screen. In this case, according to one aspect, interactions preferably with the small window may switch back and forth the keyboard in two states: displaying the keyboard on the screen and removing it from the screen, or vise versa. Removing the keyboard and replacing it by a small icon has already been described in detail in previous (e.g. PCT) patent applications filed by this inventor, which are entirely included herein by reference. The exemplary FIG. 106H, shows such a small window 106002 displayed on the screen 106009 of the device 106500 after the keyboard is removed from the screen of said device after for example providing a gliding action downwards on/from the space key 106528. After removing said keyboard, the user has (e.g. full) access to the content/text on the screen. In this example, the user has relocated the cursor from its previous location 106103 to a new location 101003 upon touching the end of the text.

Note that the/a keyboard (e.g. of the invention may have different shapes and/or configuration. For example, in FIG. 106I, a keyboard is designed to fit to a round-shape screen. In this example, the letter keys 106601 form a square located on the center of the screen. The functions keys 106602-106604 are place on the sides. The text/word being typed 106605 is printed above the keyboard. The function bars may use gestures as described for entering other symbols and/or functions. FIG. 106J shows another configuration of a keyboard (e.g. of the invention).

Note that the flicking actions described herein may be provided regardless of the orientation of the device and provide the results such as those described herein (e.g. regardless of the orientation of the device) (e.g. they (e.g. any of the flicking actions) may be provided in any device orientation). Note that in this case, generally, the user decides at any moment to activate any or a number (e.g. three) of predefined functions by a flicking action. Note that according to one embodiment, some (e.g. two) conditions may be required to be fulfilled in order to activate a function. As an example, a) a flicking (e.g. back and forth rotating) should be provided between a minimum and maximum laps of time and/or b) the flicking/rotating action should have a minimum rotating angle from the departing point of the flicking/rotating movement to the beginning point of the rotating backwards movement.

According to one embodiment, one of the flicking actions may correspond to activating an application and/or giving the focus to (e.g. giving the user control to interact with) a window corresponding to an application According to one aspect, preferably at least a large portion of the screen is occupied by a focused window. Preferably, said focused window is displayed on the screen upon a flicking action as described (e.g. such an application and such a window may herein respectively be referred to as main application and main window). According to one aspect, each of a number of gestures provided in different (e.g. two to eight) predefined directions on a focused window is related to activating a different event. Said event may be related to an action corresponding to an (e.g. a predefined different) application. function, etc. Said event is preferably related to displaying an interface of said corresponding application on the screen, Preferably, two separate gestures provided in substantially parallel trajectories but each starting from a different location on the window/screen are related to activating a same event. According to one aspect, said gestures are provided on any location on the said window, According to another aspect, said gestures are provided anywhere on a predefined portion of the screen.

As an example, FIG. 109A shows a focused window 109009 displayed on the screen of a device (e.g. smartwatch) as described earlier. In this example, the gestures 109001 and 109002 provided in substantially parallel directions from different locations on the window are related by the processor to preferably a same function. The gesture 109003 provided in a different direction is related to a different function. As shown in FIG. 109B, each of the gestures (e.g. gliding actions) 109101 to 109108 provided in eight different directions is related to focusing the system to a different application/function. As an example, the gestures 109101 to 109105 are respectively related to Facebook, Twitter, a browser, a dialer and an email application.

By using such a system, as an example, a user may open/activate/put the focus on a desired application by a providing simple gesture. In this example, an interaction such as a swiping action upwards 109108 may correspond to exiting from the current window/application and entering/focusing into/on another application such as preferably, the last/previous/an application that was focused/running previously and/or focused/running in the back ground.

According to one embodiment, a first portion of such a window (e.g. 109211 of FIG. 109C) may be assigned a first number of gestures as described above, and a second portion of such a window (e.g. 109212 of FIG. 109C) may be assigned a second number of gestures as described above. In the example of FIG. 109C, the first portion 109211 of the window 109009 is assigned to the gestures 109001 to 109008 as described above, and the second portion 109212 of the window 109009 is assigned to another group of gestures (e.g. 109201, 109202) preferably following the same principles as described above.

According to a preferred embodiment, the gestures provided on a first portion of the window are related to a first group of functions and the gestures provided on a second portion of the window are related to a second group of functions.

According to a preferred embodiment of the invention demonstrated by exemplary FIG. 109D, if the corresponding device is a wearable computer such as a Smartwatch, when a clock application is activated and/or focused (e.g. preferably through a flicking action) and preferably, the screen/window of the said application shows a watch face, gliding actions/gestures (e.g. 109301) provided on a first portion 109311 of the screen/clock-face may preferably be related to the clock interface (e.g. scrolling in a number of each faces to select one), and the gliding actions/gestures (e.g. as shown and described earlier) provided on a second portion 109312 of the screen/clock-face may preferably be related to activating and/or giving the focus to a number of predefined (e.g. desired) applications as described above.

Preferably, upon providing a predefined action such as a gliding (e.g. or long pressing) action in a (e.g. predefined) direction in a corresponding portion of the window, the system may preferably show all of the choices of the applications to be activated to the user. As an example, after the user begins to provide a gesture (not shown) on the second portion 109312 on the screen, then as shown in FIG. 109E, preferably (e.g. the clock face may be removed) a number of predefined applications icons/choices may be presented on the screen. By directing a/said gesture 109401 towards an icon/choice, the corresponding application may be activated/focused.

Note that according to one aspect, a tapping action in a corresponding portion of the window may correspond to another different action.

According to one aspect, to each watch face a different group of functions (e.g. a different groups of applications) may be assigned.

Note that in the examples above, a clock application was mentioned/used to describe the principles of gliding actions provided in different directions. The interface of any other application may be used for said gliding actions.

Note that the predefined actions corresponding to the gestures as described herein may be defined in advance or they may be defined at any moment by a user (e.g. by using a menu).

According to one embodiment, a predefined interaction such as a long pressing action (e.g. preferably anywhere on the screen) may correspond to switching the interface/system to a next layer/mode where the system may propose more (e.g. eight more) choices/options (e.g. in a similar manner) to the user. In this case, upon providing a gliding action (e.g. with or without removing the finger from the screen) in a desired direction (e.g. in the direction of a desired icon), the system may activate/focus-on the corresponding function/application.

According to a first method, after removing the finger from the screen without providing a gesture, the system may remain in said layer/mode. According to a second method, after removing the finger from the screen without providing a gesture, the system may switch back to the main layer. Note that any number of next layers may be considered (e.g. and accessed) by people skilled in the art.

According to one embodiment, upon touching (e.g. preferably, anywhere on the screen) the system may show a number of icons/symbols corresponding to optional directions of gestures in order to access the corresponding applications/functions that may be presented (e.g. around the touched point) on the screen.

According to one method, one of the options may correspond to switching the system to the main (e.g. desktop) interface of the corresponding device.

According to one method, one of the options may correspond to switching the system to the interface corresponding to the received notifications.

According to one embodiment, the user may assign an application/function to a gesture to be provided in a predefined direction. As an example, a user may provide a gesture in a predefined direction and pause for a predefined lapse of time. At this time, the system may show/present a number of choices a (e.g. in form of symbol/icon/name, etc.) of applications/functions. Upon selecting one of the choices/options, the system may assign said choice/option to a similar gesture (e.g. a gesture in a same direction) provided anywhere on the screen.

According to one aspect, preferably when the device is not in sleep/hibernate mode, a flicking action may preferably turn on the device. In this case, preferably the system enters into the state described above (e.g. activates the main application and/or displays the main window) and from there a user may access any application/function. According to one aspect, preferably when the device is in use, a flicking action may preferably turn off the screen or switch the device into sleep/hibernate mode.

According to one embodiment, a dialing system based on the principles of providing gestures just described may be invented. By considering a telephone keypad keys arrangement, according to one aspect, in a dialing interface, when a user touches anywhere on the screen the system may consider that the touching impact corresponds to touching the key '5' of virtual (e.g. visible or invisible) telephone keypad. Now, if the user removes his finger from the screen, the system considers that the key '5' was pressed, otherwise, the user may provide a gliding action from the touching point (e.g. corresponding to the key '5') towards a desired key of the imaginary keypad. As an example, (e.g. (e.g. see FIG. 110A as an example) from a touching point, provided by touching anywhere on the screen, gliding action towards upper-left, up. Upper-right, left, right, lower-left, down and lower-right may respectively correspond to entering the digits. 1, 2, 3, 4, 6, 7, 8 and 9. According to one method, a short gliding action downwards may correspond to the digit 8, and a long gliding action downwards may correspond to the digit 0. According to a preferred aspect, a gliding action (e.g. 110003) provided from an edge of the screen towards a first direction may correspond to dialing an entered number. A short gliding action (e.g. 110001) provided from an edge of the screen towards a second direction may correspond to deleting the last digit and a long gliding action (e.g. 110002) provided from an edge of the screen towards said second direction may correspond to deleting the whole number (e.g. being) entered.

Alternatively, according to one method, a predefined interaction such as a long pressing action (e.g. preferably anywhere on the screen and removing the finger from the screen without providing a gesture) may correspond to entering the character '+' (e.g. or optionally to dial a selected/entered number).

Optionally, according to one method, a predefined interaction such as a multi-touch action (e.g. tapping with two fingers preferably anywhere on the screen) may correspond to dialing a (e.g. an entered or selected) number.

Preferably, a predefined interaction such as gesture provided from an (e.g. left) edge of the screen towards inside the screen may correspond to exiting the dialing application.

According to a preferred embodiment, during the entry of a plurality of digits of a desired (e.g. phone) number, the system may search for numbers within a database (e.g. the/a contact database), corresponding to the entered digits until then, and present a selection of one or more candidate (phone) numbers to the user. Preferably, the corresponding candidate numbers may be selected regardless of the order of the entered digits. This way a user may enter only some of the digits that he remembers of a telephone number and most probably the system may find and propose the entire number to the user.

Preferably, a predefined interaction such as gesture provided from an (e.g. top) edge of the screen towards inside the screen may correspond to scrolling in a first direction (e.g. downwards) within the corresponding candidate numbers. Preferably, a predefined interaction such as gesture provided from an (e.g. bottom) edge of the screen towards inside the screen may correspond to scrolling in a second direction (e.g. upwards) within the corresponding candidate numbers.

After selecting a (phone) number, the use may provide a predefined interaction such as a multi-touch action as described above to preferably dial the selected number. According to another embodiment, the selected number may be dialed automatically.

Note that according to a preferred method, the presented selection is not interactive so that to permit the user to enter more digits of the desired number by interacting (e.g. providing gestures/tapings) anywhere on the screen. According to another method, the presented candidates selection (e.g. list) may be interactive.

It must be noted that the system of finding numbers described above is preferably not limited to phone numbers. This system can be applied to find numbers for any other purpose, or alternatively it may be used to find any other chain of characters such as passwords, etc. For that, the system (e.g. the corresponding database, the gestures direction, etc.) may not be limited to digits only. It may include any characters and/or symbols (e.g. icons, commands, menus, etc.).

According to one embodiment, during the system focus on an application such as when displaying a watch face on a smartwatch, when notification are arrived, it (e.g. the notification, a portion of the notification, or some other type of means of alerting the user to the notification) may be shown in a portion on the screen, and wherein upon providing a tapping action (e.g. anywhere on the screen), the system may present the content (e.g. an incoming message) corresponding to said notification.

According to one embodiment of the invention, providing an interaction such as a gliding action provided from a key/zone or from another location such as from an edge of the screen, in a predefined direction, may enter the system into a mouse functions mode. In this case many scenarios may be considered, such as any of the single scenarios described below or a combination of the scenarios described below:

the system may provide a (e.g. preferably (substantially) transparent/invisible) window above at least a portion (e.g. of the content) of the touch screen of the device (e.g. above the keyboard) such that when the user interacts with said portion of the screen said interaction is provided on/captured by said (e.g. transparent) window.

A gesture from anywhere on the screen in a predefined direction moves the cursor/carret accordingly (e.g. proportionally to the length of the gesture) in said direction within the text. Note that the length of the gesture may preferably define the number of characters the cursor will be moved in the corresponding text.

A long gesture (e.g. more than a predefined length) from anywhere on the screen in a predefined direction moves the cursor/caret to a predefined location relating to (e.g. the end of) a next word/chain of characters in the text.

A long gesture (e.g. more than a predefined length) from anywhere on the screen in a predefined direction moves the cursor/caret to a predefined location relating to (e.g. the end of) a next word/chain of characters (e.g. preferably in the direction of the gesture) in the text.

A short gesture (e.g. less than a predefined length) from anywhere on the screen in a predefined direction moves the cursor/caret to a predefined location (e.g. next character) in a text such as a word/chain of characters (e.g. preferably in the direction of the gesture).

A tapping action anywhere on the screen exits the system from the mouse mode, and preferably switches the system back to the previous mode (e.g. that the system was in prior to being in the mouse functions mode).

A gesture, including a long/hard pressing action, provided in a first predefined direction may correspond to a mouse function such as selecting one or more words (e.g. depending on the length of the gesture), preferably in said direction within a text.

A gesture, including a long/hard pressing action, provided in a second predefined direction may correspond to a mouse function such as Select All function.

A gesture, including a long/hard pressing action, provided in a third predefined direction may correspond to a mouse function such as copy. And so on for other functions such as the mouse functions, paste, cut, etc.

A long pressing action on anywhere on the screen may correspond to selecting a word corresponding to the cursor position within a text/word.

According to one aspect, when the user provides a gesture from a key/zone or from another location on the screen to enter the system into the mouse mode, in addition to entering the system into the mouse mode, the system may also provide/activate any one or more of the corresponding scenarios described above for said gesture (e.g. the scenario(s) that corresponds to the length and/or direction of said gesture).

An example, describing some of the principles described above is shown in FIGS. 108A to 108C. FIG. 108A, shows a keyboard of the invention 108000 during the entry of a text. In this example, a history window shows the words being typed. A cursor 108011 is located after the last word being entered. In this example, a user has provided the gliding action/gesture 108012 corresponding to entering the system into the mouse functions mode. Upon such gliding action the system is entered into the mouse function mode, as shown in FIG. 108B, and preferably an invisible/transparent window may cover at least the keyboard surface/area. In addition, the system moves said cursor immediately after the previous word 108021 (e.g. according to the direction of the gliding action). If a user provides a short gliding action 108022 the system moves, as shown in FIG. 108C, said cursor one character further 108031 in the direction of the short gliding action. While the system is in the mouse mode, at any time, as an example, if the user taps on the transparent window, the system exits the mouse mode. According to one aspect, in addition to exiting the mouse mode, the system relates said tapping action to a corresponding tapping action on the keyboard and provides the corresponding action. As an example, if the user taps on a location on the (e.g. transparent) window that corresponds to a key/zone of the keyboard, in addition to exiting the system from the mouse mode (e.g. and removing the transparent window), the system considers said tapping action as if it is provided on the keyboard and provides the corresponding result. For example, if said tapping action is provided on the zone/key 108002, the system (e.g also) enters the letter 'I'.

Note that the gestures described may be provided in different predefined directions. As an example, the principles described for the gestures towards left may be applied to the gestures provided towards right and/or to provide the same results in the opposite direction. Also as an example, a gesture upward may move the cursor in a corresponding location one line higher in a text and a gesture downwards may move the cursor in a corresponding location one line lower in a text, etc.

It must be noted that although a first type of gesture (e.g. long gesture) and a second type of gesture (e.g. short gesture) are being used to describe the principles of using mouse functions, any type of a first and a second (e.g. or more) gestures may be used for the same purpose. As an example, the first type of gesture may be a fast gesture to move the cursor word by word (e.g. at a predefined location (e.g. immediately at the end of the corresponding word) related to the corresponding word) and a second type of gesture may be a slow gesture to move the cursor character by character (e.g. the length of the gesture defines the number of characters the cursor is moved) within a corresponding text/word (e.g. or vice versa), etc.

Note that although entering the system into a mouse function mode is herein been described to be related to a predefined interaction such as a gesture, any other mode may be related to such a gesture.

Note that a gesture corresponding to entering the system into the mouse mode may be of any kind and in any direction. For example, a short gesture provided leftward from a predefined key may switch the system into the mouse mode and preferably move the cursor one character leftward in the corresponding text, and a long gesture provided leftward from a predefined key may switch the system into the mouse mode and preferably move the cursor one word leftward to in the corresponding text (e.g. places the cursor at the end of the previous word/chain of characters).

According to one aspect, a predefined interaction such a predefined type of gliding action may move the cursor/caret to a predefined position in (e.g. at the end/beginning of) a corresponding text. According to one aspect, an interaction such as a gliding/gesture, including a long pressing action, in a first predefined direction (e.g. towards left) may correspond to (e.g. relocating) locating the cursor at the beginning of a text. According to one aspect, an interaction such as a gliding/gesture, including a long pressing action, in a second predefined direction (e.g. towards right) may correspond to (e.g. relocating) locating the cursor at the end of a text. Preferably, the long pressing action is provided at the beginning of the gliding action.

According to one aspect, a predefined interaction such a predefined type of gliding action may repeat moving the cursor over the words in a text. As an example, providing a gesture and pausing at the end of the gesture without removing the finger from the screen may first move the cursor form to (e.g. the end of) a next word and repeats the moving action over a number of following words until the user removes his/her finger from the screen. Preferably, if the length of a such gliding action is more than a predefined length then said moving actions are provided word by word within a text, and if the length of a such gliding action is less than a predefined length then said moving actions are provided character by character within the text.

According to another method, an interaction with, such as a long pressing action preferably (e.g. on a word) in the history window may position a/the cursor/caret in the interacted location in the history window. If the cursor is located within/attached to a word, preferably said word may be selected. Optionally, upon providing such interaction, the (e.g. semi-transparent) window as described herein may be located above at least a portion of the keyboard (e.g. above the letter keys/zones). All cursor and/or mouse functions (e.g. described herein) may become available and/or be applied/using to said window.

According to one embodiment, if a cursor/cart is within or adjacent to a word in a text, then a long pressing action on the wordlist may correspond to deleting said word, preferably, upon authorization by a/the user. On the other hand, if a cursor/cart is not within or adjacent to a word in a text, then a long pressing action on the wordlist may correspond to switching the system to a/the mouse function mode.

According to one embodiment, upon providing a gesture downwards from anywhere in the word list, the system may expand the word list to show/present more words. According to one method, a gliding action in a predefine direction on/from a function key may corresponding to providing proposing words beginning with the current predicted word. According to one method, a gliding action in a predefine direction on/from a function key may corresponding to entering the system into a spell-help mode (e.g. of the invention) or exiting the system from the spell help mode. Different methods of an spell help have been described in different patent application filed by this inventor. The can be used with the data entry system of the invention described herein.

When the space key/zone is positioned adjacent to a linear letter zone in the linear axis of the linear letter zone, a user typing fast may inadvertently touch the extremity (e.g. on/near one or two of the letters of the letter zone closest to said extremity) of the linear letter zone instead of tapping/touching on the space key. For example, by considering FIG. 108D, the user may erroneously type on the letter 'O' instead of typing on the space key. (e.g. By considering such a possibility,) in addition to considering/predicting one or more words corresponding to the letter zones interactions, the system may also consider that at least one of the user's finger's impacts on a letter/character (e.g. 'O') located in the extremity of the letter zone next to the space key was meant to be made on the space key. By considering such possibility, the system may propose corresponding two or more (e.g. or other) words from one or more N-gram entries. As an example, by considering the keyboard of FIG. 108D, if the user types on the letter/character zones 108403, 108404, 108404 (by tapping on the letter 'O'), 108402, 108404, 108402 the system may propose the word 'dollop' (e.g. the only word that corresponds to the input information provided by the user without considering any mistyping). The system may also consider that the input information provided by the user may correspond to entering two words by considering that the user interaction on the character 'O' (e.g. key interaction 108404) may have been intended to be on the space key 108408. In this case, the system may relate the same input information (e.g. the same user's interactions) to 108403, 108404, 108408, 108402, 108404, and 108402. One of the choices/options corresponding to said interaction may be the chain of words 'do you' (e.g. corresponding to a 2-gram entry of a database used by the system). The system may also propose said chain of words.

During the entry of input information corresponding to a word, the system may propose a current word corresponding to said input information. According to one embodiment, upon receiving a backspace signal, the system may remove a corresponding character from the current word and considers the rest of the current word as having fixed characters (e.g. does not change the remaining characters). Upon receiving a further input information corresponding to a user's interaction (e.g. a key pressing action on a letter zone), the system may combine (e.g. append) the character located on said zone closest to the user's interaction with said rest of the current word to form a chain of characters. If such a word (e.g. or a word beginning with or including said chain of characters) exists in a database of words used by the system, then the system may propose said chain of characters as the (e.g. new) current word. If said chain of characters does not exist in said database of words, then the system may considers the input information provided until then, (e.g. as preferably being ambiguous input information) and predicts corresponding words.

A method of entering a word in a desired letter case is described herein. According to one embodiment, a word being entered is similar to an existing word in a database but with a different letter case (e.g. the case of at least one of the letters of the word being entered is different than the case of the corresponding letter's in said existing word). In this case, according to one method, the system may replace said existing word by the word being entered with the corresponding letter case/s. Preferably, the system may ask for authorization for performing the replacement task. For this purpose, preferably, the word being entered is (also) presented in the word list so that preferably the user can select said word for entering it and the system may ask for the authorization for said replacement action upon said selecting action by the user. It is understood that according to another embodiment, said word being entered can be added in a corresponding database without replacing an/said existing word.

A method of capitalizing and saving a word with one or more capita; letters is described herein. During the entry of a word, if a user capitalizes one or more letters of a word (e.g. by using the shift and/or capslock function), the system may check if such a word with such characters cases (e.g. uppercase and lowercase) exists in the corresponding database used by the system. If a same word with different character cases exists in the dictionary, the system may replace it by the new word preferably after receiving authorization (e.g. from the user.)

According to one embodiment, interacting with (e.g. tapping on or ending a swipe in) the gap between the left and right large zones may (e.g. also) correspond to entering a space character. In this case, the system may relate said interaction to both, the corresponding character and a space character, and may propose/predict words accordingly. Relating an interaction to both, a letter and or to a space character and proposing words accordingly has already been described in detail.

According to one embodiment, a space key may be located between the (e.g. left and large) zones. The space key may be an independent key or it may share an area with a (e.g. one or more) character such as the letter F and/or the letter G. The word predictive system of the invention may analyze a sequence of interactions with the keyboard, including the interaction's with the shared zone and decide what was the intention of the user when he/she interacted with the shared zone and accordingly predicts a number of one or more words accordingly.

According to one embodiment, words may be typed (e.g. sequentially) on a keyboard (e.g. of the invention) without using the space key. In the preferred embodiment the keyboard used may be the one with two large zones each having three small zones. Because the current invention can use/uses two ambiguous large zone, a large number of interactions with the keyboard corresponding to entering several words without providing a space character, at some point may not refer to any single word. In this case, the system may refer the input information N gram entries (e.g. by not considering the space(s) between words of the entries) of a database of words used by the system and predict one or more sequences of corresponding word. Note that, a correction procedure may also be used to permit some degree of mistyping to predict sequence/s of words having the best match with the corresponding provided input information. Same principle may also apply to the embodiment previously mentioned (e.g. using a shared zone for a character/letter and the space character).

In the embodiments above, according to one method, every time the system does not find a word corresponding to a sequence of user's interaction with the (e.g. letter zones/keys) of the keyboard, the system will try to match at least a beginning/first portion of the interactions to N-gram entries (e.g. 2 and/or 3 gram) of the database used by the system and presents one or more corresponding words. If there are remaining interactions (e.g. the last/second portion of said interactions) that are not used to predict said words, then the system preferably waits until more interactions are provided by the user to repeat the procedure just described to predict/present more words.

FIGS. 111A to 111C demonstrate an example of typing several words without providing the space key. In FIG. 111A, a user has provided a input information upon providing a sequence of interactions with the keyboard until the keyboard does not find any corresponding word. In this example, the interactions respectively have been provided on the characters "ijididkjjdcee" 111001 in the word list which are shown as a chain of characters to the user. Because there is no single word that match the user's input information, the system may try to match at least a (e.g. the beginning) portion the input information to at least one N-gram (N>1) entry of the database of words used by the system. In this example, the system could match a first portion (e.g. corresponding to the characters "ijididkjjd") of the input information to the chain of words "this is good" 111102. Either the user manually or the system automatically may enter said words 111004 as shown in FIG. 111B. Now, the remaining interactions (e.g. corresponding to the characters "cee" 111005) may be related to several different (e.g. single) words and the system may present said words accordingly (not shown). In the current example, the user continues to provide additional input information by providing additional keyboard interactions (e.g. continues to type). By considering/combining said remaining input information and said additional input information, as shown in FIG. 111C, as some point, the system again may not be able to match the combined input information (e.g. corresponding to touched letters 111006 on the keyboard) to any single word of the database. The system repeats the procedure of finding N-gram (N>1) word/s. In this example, the system could match the combined input information to the beginning characters of a 2-gram entry "very interesting" 111007. And so on.

Note that at any moment during the entry of input information, the system may present one or more matched single words. Words predicted can be long and/or short.

According to one method, the system may also include a correction procedure to permit certain degree of mistyping.

Note that at any moment, the space key may be used to enter a current predicted word that can be a single or a chain of several words as described.

According to one embodiment, rotating a device/screen may be related to zooming in or zooming out a content on the screen preferably without changing the orientation of said content. This feature may be very useful for devices with round screen (e.g. smartwatch) and some applications such as a camera application wherein the user can zoom in or zoom out the image he/she is seeing on the screen before taking a picture.

As an example, rotating the device/screen in the direction of watch or in the opposite direction of watch may respectively correspond to zooming in or zooming out (e.g. or vise versa).

As mentioned before, in a semi predictive (e.g. semi ambiguous) mode/system (e.g. while typing slowly) the system may preferably predict words based on the calculation of the distance of the letters from an interaction impact on a location (e.g. a small zone) of the keyboard. As such, letters that are closer to the impact may preferably be given more priority. As an example, the system preferably relates an interaction, such as a tapping action, with a location (e.g. a zone) of a keyboard to any of the characters on and/or near (e.g. within the corresponding small (e.g. horizontal) zone or within corresponding large zone (e.g. around the impact)) the interaction's impact. According to one method, the system preferably gives priority to (e.g. first considers) the letters in the corresponding small zone. According to one embodiment, such principle may be applied to predict a portion of a word.

Also, as mentioned before, in a fully predictive/ambiguous mode/system (e.g. while typing fast) the system may preferably relate an interaction, such as a tapping action, with a small zone of a keyboard (e.g. with highest priority) to any of the characters of said small zone or (e.g. with less priority) to any of the characters of the corresponding large zone, or (e.g. with still lower priority) to any of the other characters of the keyboard. According to one embodiment, such principle may be applied to predict a portion of a word.

While a user types quickly or slowly, he usually, types more sloppily and less sloppily, respectively.

According to one embodiment, the speed of typing may define the degree of ambiguity (e.g. typing precisely, semi ambiguous (e.g. semi predictive), fully ambiguous/predictive, etc., as described herein). As an example, slow typing may be related by a processor of the system to the semi-ambiguous (e.g. semi-predictive) mode or precise typing mode/method, and fast typing may be related to fully ambiguous/predictive mode/method as described herein. By considering these principles the system may propose one or more words accordingly.

Various methods of measurement of speed of typing may be used to define the speed of a sequence of interactions such as tapping actions as being fast or slow. As an example of a first method, if the time interval between two tapping actions on (e.g. a zone of) a keyboard is less than a predefined value, then said (e.g. sequence of) tapping action may be related to fast typing. Accordingly, if the time interval between two tapping actions on (e.g. a zone of) the keyboard is more than a predefined value, then said (e.g. sequence of) tapping actions may be related to slow typing. According to another exemplary method, if the average time of a sequence of tapping actions is less than a predefined value, then said (e.g. sequence of) tapping action may be related to fast typing. Accordingly, if the average time of a sequence of tapping actions is more than a predefined value, then said (e.g. sequence of) tapping actions may be related to slow typing.

Other methods of measurement for defining the speed of typing may be considered by people skilled in the art.

Note than according to a preferred aspect, a pause may be made between the providing two sequences of fast (e.g. and/or slow) interactions (e.g. tapping actions). Preferably, if a sequence of tapping actions/interaction includes only one tapping action/interaction, then, according to a method, said tapping action/interaction may preferably be related to a slow typing action.

The principles described herein may be applied to any type of keyboard such as a regular keyboard. As an example, when typing slowly, the system may relate an interaction to the letters near the interaction impact (e.g. regardless of a zone) and when typing fast the system may relate an interaction to preferably any of a group of characters of a horizontal row of the keyboard on which the interaction (e.g. impact) is provided. By considering a sequence of interactions (e.g. can be mixed (fast and slow)) the system may predict one or more words from a database of words.

According to one aspect, by considering the principles described herein, an entire word may be typed fast or slowly and the system may predict words respectively based on fully predictive system and semi-predictive system. As an example, by considering the keyboard of FIG. 111A, typing fast on the letters "yesy" may be related by the (e.g. processor of the) system to the word "what" and typing slowly on said letters may be related to the word "test".

According to a preferred method, during the entry of a word, one or more portions of a word may be typed fast and one or more portions of said word may be typed slowly (e.g. herein may be referred to as mixed typing). The system may predict said portions based on, respectively, semi-ambiguous (e.g. semi predictive) mode/system and fully ambiguous/predictive mode/system and predict one or more words accordingly (e.g. the system relates an impact of a fast interaction to any of the characters of a small and/or large zone, and relates an impact of a slow interaction to any of the characters based on their distance from the interaction impact (e.g. preferably to one of the characters near the interaction impact as described herein)). As an example, by considering the keyboard of FIG. 111A, typing slowly the sequence of letters "sv", then typing fast the sequence of "hhfhhh" may be related by the system to the words "actually", "activity", "activities", and to a longer word "schizophrenia". On the other hand, typing fast all of chain of characters (e.g. second sequence immediately after the first sequence, or each sequence separately with a pause between them) may also correspond to the words "campaign", "removing", and more.

According to another aspect, typing slowly may be related by the system to entering precise/identified characters and tying fast may be related to fully predictive system. As example, by considering the keyboard of FIG. 111A, typing fast the sequence of letters "fy", then typing slowly the "r" then typing fast the sequence of "dy" may be related/predicted by the system to the words "first", "viral", "rural", etc. in which the third letter of all of said word include the identified character 'r' which was entered slowly (e.g. by pausing before and after interacting with said letter). In this example, fst typin on the same letters may be related by the system to the letters "first", "alert", Steel", the longer word "always", etc.

The principles just described may be applied independently or in combination with other principles defining the degree of ambiguity as described in this application for predicting words.

The principles described may also be applied to swiping principles to type words as described herein. As an example, fast swiping actions may be related to fully ambiguous/predictive mode and slow swiping actions may be related to semi-ambiguous (e.g. semi predictive) mode.

According to one aspect, by using a keyboard of the invention having large and/or small zones, the speed of typing may be measured in each zone independently and/or regardless of the zones.

According to one aspect, measuring the speed of typing and relating it to slow and/or fast and predicting words typing may be applied to any type of keyboard such as traditional keyboard (e.g. QWERTY).

Note that in the embodiments described above, a correcting system may be used with the system so that to relate an impact to any of the characters of the keyboard by relating it to a mistyping action.

Systems and methods of controlling the hiding and/or unhiding of at least a portion of a content have been described previously by this inventor in detail in previous (e.g. PCT) patent applications filed by this inventor, which are entirely included herein by reference.

In this application more details are being described. For simplicity of description, in this application, the terms hiding a content or unhiding a content is used to preferably describe hiding or unhiding at least a portion of a content.

Different method of a procedure of hiding or unhiding of at least a portion of a content may be considered. As an example, the hiding and unhiding of a content may be done (e.g. automatically by the system) by for example displaying or not displaying at least a portion of a content under one or more conditions. According to another method, the hiding and unhiding of a content (e.g. herein may be referred to as the main content) may be done by using another content (e.g. herein may be referred to as a mask) to hide/cover or unhide/uncover a/the main content. Said main content may be of any kind such as a picture, video, a text (box), etc. Said another/covering content (e.g. masking content) may also be of any kind such as a picture, video, a text (box), etc. Said main content may herein be also referred as an artwork, etc.

According to one aspect, a user of an electronic device such as a smartphone (e.g. herein may be referred to as an owner) may hide at least a portion of a content (e.g. a photo, video, etc.) and share said content that a portion of it is hidden (e.g. herein may be referred to as edited content) with other users (e.g. herein may be referred to as receiving parties) over a network. Said owner may enable some (e.g. one or more) of said receiving parties (e.g. herein may be referred to as authorized party/ies) to unhide said hidden portion upon satisfying one or more conditions. For example:

a) The owner may select who among said receiving parties can unhide said hidden portion with or without a condition, and/or; b) The owner may permit to unhide said portion manually and/or automatically at a predefine date and/or time and/or arbitrarily, and/or c) The owner may permit one or more of the receiving parties to unhide said portion for a predefined laps of time or for unlimited time (e.g. on his/her device) or on the devices of (e.g. authorized) the receiving parties, and/or d) The owner may permit the system to unhide said portion automatically at a predefined time and/or for a predefined laps time on a receiving device.

Note that the principles described may also be used for (e.g. remotely) unhiding hidden portion's of a content. Similar/other methods may be applied to hiding an unhidden portion content. As an example, a owner may (e.g. remotely) hide a portion of a content that he/she has already shared with others.

Based on the principles described herein, a content control (and sharing) application/system using the hiding/unhiding means such as mask may be created. Said application/system may use a network for transmitting information/messages between users using said application/system (e.g. on their devices). An example of such application is described herein. FIG. 112A shows an instance of such application/system after a picture being selected/snapped. In this example, some buttons are presented to the user for editing the picture. Preferably, an interaction such as tapping on the picture may hide said buttons so that the user can see the whole image (see FIG. 112B). Another interaction such as another tapping action on the picture may bring back the buttons, and so on.

In the current example, as shown in FIG. 112C, one of the buttons 112101 is related to popping up a text box on the picture so that a user can write on the picture. Another button 112102 is related to presenting a selection of masks 112103 so that the user can select one or more of said masks Preferably, after selecting a mask, a mask may be presented on the picture. The user then may resize said mask and/or drag it over or to a desired location on the picture (see FIG. 112D). A content such as a picture and (e.g. all) other information such as the mask (e.g. or information relating to picture/content, the text on the picture, or all other information relating to the picture may herein be referred to as edited content).

The user may share (e.g. send/transmit) the edited picture/content with one or more other users. As an example, after pressing the button 112104 as shown in FIG. 112E, the system may present a list of contacts/people so that the user can select one or more people with whom to share the picture. As shown in FIG. 112E, the user can select one or more of the presented contacts/people from a list to share the picture with. As described before and shown as an example here, a user may select who among the selected people/contacts that can remove the mask and that cannot once they receive the edited picture. In this example, the user 112111 will be able to move/remove the mask but the user 112112 will not be able to move/remove the mask.

The application may have a (e.g. main) menu having several options. As an example, some or all contents being shared may be stored, and as shown in the example of FIG. 112F, upon request such as by pressing a menu button 112105 such content(s) may be presented to the user.

Note that according to one aspect of the invention, the user can share an edited content with a targeted community (e.g. a football club supporters) of the users of the application (e.g. other than those available in the user's contact list) or all of the users of the application around the world. As an example, as shown in FIG. 112D, after editing a picture, the user may press the button 112107 to upload an edited picture to the/a cloud (e.g. a remote server). Preferably, upon accomplishment of a condition such as after verifying the nature and/or the quality of the edited content by an inspecting organization, the edited content may become available to the targeted users. According to one method it may be pushed (e.g. automatically) to the destination devices and according to a second method, it may be pulled to a destination device upon a request by the owner/user of the device. FIG. 112G, shows a number of such edited contents being shown on a receiving device. According to one embodiment, each time a user presses a button 112121 the application pulls/downloads a new number of such edited contents from the cloud. Note that the user may authorize the destination user s to remove/move a mask positioned on the content (e.g. the picture).

As mentioned before, the receiving party may edit a received (e.g. edited) content by editing it too as described herein (e.g. by adding a mask, a text, a drawing, etc.) and share it with others (e.g. forward) or by replying back to the sender, and so on. According to one aspect, a forward button and a reply button may be available to the user for such purpose.

According to one embodiment, the application may include chat rooms (e.g. chat interface) where two users or a group of users can share edited or non-edited contents or other types of messages (e.g. text message) and see/access what they send and receive to each other (e.g. the chatroom preferably includes the corresponding history of the interactions). As shown in FIG. 112H, by providing an interaction such as pressing a dedicated button 112131, the system may show a list of chat rooms that the user is using to chat with his/her targeted parties (e.g. targeted friends). Upon selecting a chat room, as shown in FIG. 112H, the system may show the chat interface and preferably the history of the corresponding chat room. In addition to chat means (e.g. a text box, different menus/buttons, etc.) said chatroom may include history shared contents (e.g. pictures, videos), text messages, etc., which are preferably sorted by date and time.

According to one embodiment, the chat room may include a background content which may be related to a chat taking place. As an example, a user may provide an (e.g. a predefined) interaction such as a long-pressing action or a sliding action on a content to make that content the background of a chat room/history and/or a chat taking place or to take place. As an example, in FIG. 112I, a first type of interaction such as a tapping action on the (e.g. edited) content in the chat history (e.g. in this example a copy of a received or sent picture) 112142 may open/enlarge (e.g. the original version of) said content (e.g. see FIG. 112J) (e.g. so that the user can move the mask (e.g. if authorized), re-edit it, forward it, reply, etc.) and a second type of interaction such as a long pressing/swiping action on said content 112142 may display a (e.g. an enlarged) (e.g. copy of) said (e.g. edited) content as/in the background of the chat room (see background 112151 in FIG. 112K). By doing so, a user may chat with other party/parties about said content which may be displayed in the background while seeing and/or manipulating said content. Preferably, the other parties may be enabled to see/view and/or manipulate the same content in the background and/or foreground of the chat interface (e.g. as just described) preferably while chatting. The methods of enabling other party/parties to access a same content is described later herein.

According to one aspect, a content (e.g. an image) itself or a reference to a content (e.g. located on a (e.g. party's device, on a remote server, etc.) may be sent by a user to said other party/parties.

Note that according to one method, when a content (e.g. a picture) is presented to a user, a tapping action on said content may pop-up at least some of the menus of the application or vise versa (e.g. remove said at least a portion of the menus of the application if they are already popped-up.

According to one aspect, a predefined interaction such as a tapping action on the screen (e.g. preferably on said background) may bring said background to the foreground (e.g. by placing the said (e.g. edited) content in the foreground and hiding at least a portion of, preferably all of, the chat history/room. Preferably a predefined interaction such as a long pressing/swiping action on said edited content pushes again said edited content to the background and makes the chat room/history available again, and so on.

According to one aspect of the invention, if an edited content (e.g. picture) is selected from a location/source other than a chat room, the user may provide a predefined interaction as described above on the content and the system may present a list of chat rooms (e.g. other users) to the user. Upon selecting a chat room, said chatroom may be opened and said (edited) content or a copy of it may become the background of said chat room. The user then may use/interact with said background content as described herein/above.

Note that according to one aspect, instead of becoming the background of a chat room/history, said content may become the background of a chat instance/session (e.g. see FIG. 112L) preferably mainly relating to said content. In this case, preferably, all chats relating to (e.g. all instances of) said background content may be stored. Upon request, said stored chats may become available to one or more users. According to one embodiment all of the chat interactions in different chat sessions relating to a content as described, may be stored and be accessed upon request (e.g. in for of a history of chat preferably in/through a chat interface/room).

According to one aspect, upon selecting a (e.g. a shared picture, a video stream, a TV stream, an internet page) content (e.g. by providing a long pressing/swiping action as described herein) by a first party to chat on/about it (e.g. as described herein) with another party/ies, a message preferably including a link or a reference to said content may manually by a first party or may automatically by the system be sent to the other party/parties (e.g. within the chat room). Upon receiving said message, a receiving party manually (e.g. by tapping on the link, or by long pressing on the previously shared picture, etc.) or the system automatically may make said content available on the other party device/application (e.g. in the background of a chat instance/room). If a chat instance is not open between the parties, the system may preferably open a chat instance including said content (e.g. in the background) on the receiving device chat room. The parties may chat while seeing the and/or manipulating the content as described.

Note that although a picture is used as an example of a content to describe the principles described herein, other content such as a video, a TV stream, a text box, a webpage, (live) internet, etc. may be used as a content. For example, the edited content (e.g. on which a mask is positioned) may be a video or TV streaming window/control/view, etc.

It must be noted that an content described herein may be of any kind such as an edited (e.g. including a mask, text box) or a non-edited content (e.g. just the picture). As an example, a picture or video may not be edited and shred with others. Also in addition to a content the chat application/system (e.g. interface) may also include a text messaging system. The history of a chat may include shared contents, text messages, other information, etc. (See FIG. 112I).

According to one aspect, (e.g. while in the background) the background content may be interactable. For example, changes to the background such as moving/placing a mask, interacting with a link on the background, etc., may be possible.

According to one aspect, while a content as described is in the background or while is in the foreground, an interaction such as pressing on a button may remove said (e.g. edited) content from the screen.

According to one embodiment, a predefined interaction (e.g. a long pressing action) provided on a content (e.g. a picture, a video, a TV stream, a web page, etc.) on (e.g. the screen of) the device of a first user may open a chat session/instance (e.g. by bringing/opening a chat interface on said content and placing said content as the background of said chat interface. (e.g. See exemplary FIG. 112L)) (e.g. relating) between said user and another user. Said another user may preferably be notified about said chat session by receiving a notification sent automatically from the chatting system or manually by said first user. As an example, if a picture has been shared previously between two users, a long pressing action on the picture in the first user's device may open a chat instance/session relating to/above said shared picture on the device of the first user as described. A notification may be send to the second user either manually by the first user or automatically by the system. Preferably, upon/by interacting with the received notification, a chat session/interface may preferably be opened on the device of the second user with the same content (e.g. preferably at first) being in the background of said chat instance/interface on the second user's device.

According to one method, said chat session/interface (above said content/picture) may automatically be opened on the device of the second user without a notification.

According to one aspect, a chat instance between two or more parties created as such may use a content provided from a third party. As an example, a first user may open a content from a third party source (e.g. a TV stream, a video, a webpage, etc.) on the screen of his/her device, provide a predefined interaction such as described herein to open a chat instance/session related to/above said content. A notification as described above may be sent to a second user. Said notification may include a link/reference to said content of the third party source. Upon accomplishment of a condition such as by interacting with said notification, said content may be accesses by the device of the second user and a chatting session/instance related to/above said content with the first user may be opened (e.g. with said content preferably being in the background of the chat session/interface. Note that as described herein, said content may be switched from background to foreground and vise versa, manipulated, etc., as described herein.

According to one aspect, if a first user provides a predefined interaction with/related to (e.g. a long pressing action on) a content such as an image, a list of users may be presented to said first user. By selecting one or more users in the list, a chat instance may be opened between said first user and the selected users. Preferably, the background of the chat interface (on the users' devices) related to said chat instance may be said image.

Note that the method of selecting a content and chatting as described may be applied to any chatting application/system. Also note that the method of switching a content between background and foreground can be applied to any other application. For example, by selecting a content as described, a user may type in a text box/field located above the content while viewing/switching the content between background and foreground.

According to one embodiment, an advertising system may be implemented with the masking method. As an example, upon removing/relocating a mask of a received artwork, an advertisement may be shown to the user. Said advertisement may be located on the mask and/or it may cover at least a substantial portion of the screen. Preferably, the content under the mask may be shown after viewing at least a portion of the advertisement. The advertisement may be of any kind such as a photo, a movie/video, an audio, etc. and/or a combination of some/all of them. According to one embodiment, the mask may have a link to an advertisement. By interacting with the mask such as moving, tapping on, etc. the mask the advertisement may be activated.

Preferably, a mask by itself may be or may include an advertisement. According to one method, a user using such a mask to cover a portion of his/her artwork may be rewarded (e.g. points, money, prizes, etc.) by the supplier of the advertisement (e.g. the party/firm that the advertisement is related to. Herein may be referred to as advertiser). This may be very beneficial for both, advertising companies and users. As an example, the user may get more points if he/she uses/shares more advertising masks (e g on contents) with more people. The advertiser may reward the user for the number of points, the number of times that the receiver of content activates an advertisement, etc.

Note that all of the features, methods, systems, etc., described in this application may be applied to any type of content and preferably not only to the content editing system of the invention.

According to one method, a first type of interaction such as a sliding action with/on the mask may correspond to relocating/moving the mask and a second type of interaction such as a tapping action with/on the mask may correspond to the/an advertisement functionality (e.g. viewing and/or enlarging a/the corresponding advertisement).

A person (e.g. a receiving party) authorized to remove a (e.g. received) mask (e g to see/view/consume what is hidden) may able to take a screenshot after moving/removing/deleting the mask (e.g. moving, removing, deleting a mask, or any other action/method, actively or passively, used to view a hidden content to a user may herein be referred to as removing a mask) and may divulge it to others. In order to hinder such activity, herein some security methods are described.

According to one aspect, a user may use more than one mask each mask hiding a portion of a content to be protected (e.g. such a content herein may be referred to as a related content or a protected content). Based on these principles, a user may visibly or imaginarily divide a content into more than one portion, hide each of the portions preferably by covering it by one or more masks Such a content may herein be referred to as related content, segmented content, etc. Said content may be a text message, a picture, an image on another image, a video, etc. For example, a text message may visibly be segmented by typing it in several portions each portion on a different text box wherein each text box being located on a different location on the screen. Each of said portions may be covered by a mask. Also as an example, a text message may be imaginarily segmented by typing it in one piece/text-box and using preferably two or more masks each covering a portion of said text message. Note that a segmented content may preferably be located on a background (e.g. a photo) wherein said background is preferably controlled by an application related to the content such as the application of the invention. Note that method of segmenting content may be applied to any content such as a text, an image, audio, video, etc.

As an example, if said content is a text message, a user desires to send/share a message to/with one or more other users, he can divide said message into different portions or write said message in different portions and hide each of said portions with a different mask (e g a (e.g. two or more) masks as such may herein be referred to a related masks). After sending/sharing said/the protected content, a receiver may be limited to remove one mask at a time meaning that while a mask is removed preferably other related masks cannot be removed. After removing a mask (e g by dragging it) that covers a portion of the related content and seeing what is underneath and upon providing a predefined interaction such as releasing said mask (e.g. by lifting the finger from the screen), said mask may preferably automatically be placed back at its original location and may cover again said portion of the protected content. Thereafter, the user can remove a second mask which masks a second portion of the protected content and see what is underneath (and so on). Note that if said mask is removed by deleting it (e.g. the removed mask is not under the user's finger on the screen), a predefined interaction such as touching a second mask (e g to remove said second mask) the system may bring back the deleted mask and position it on its original location on the content.

Note that, preferably, while any of the (e.g. related) masks is removed at least some of, preferably all of, the other (e.g. related) masks not be removed.

According to a preferred aspect, if a screenshot is taken by a receiver (e.g. herein may be referred to as infringer) while a mask is removed, said mask (e.g. preferably, immediately) is located/put back (e.g. automatically) at its original location and at least some, preferably all, of the related masks can no more be removed (e.g. herein may be referred to as fixed, frozen, blocked, etc.). In addition, if said protected content has also been sent to/shared with other users, preferably at least some (e.g. preferably, all) of the related masks on said protected content on their devices will be frozen. In such case, according to one aspect, preferably, an alerting notification which may include the identity of the infringer may be sent to the owner of the mask/content and/or to other users with which the (e.g. edited) content is shared. According to one aspect, upon a special request sent (e.g. by a receiver) to the owner of the related masks (e.g. the person who puts the mask/s on a content) the owner may enable (e.g. again) a receiver to remove said blocked masks, as described herein.

By using the principles described herein, any attempt to take screenshot/s of the protected content can only divulge a/one portion of the protected content and the entire (e.g. uncovered) content cannot be shared/forwarded/sent to others by a/the receiver.

Note that if an authorized user receiving a protected content forwards said content to a third user, preferably at least some, preferably all, of the masks become fixed and may not be moved/removed by said third party.

According to one aspect, if a mask is removed by an authorized user for more than a predefined laps of time (e.g. said laps of time may be a predefined amount of time or it may be (e.g. dynamically) defined by the owner of a mask for said mask and/or for any other (e.g. related) mask that the owner puts on a (e.g. protected) content), preferably said mask will return/forced back to its original location on the corresponding (e.g. protected) content. As such, according to a first embodiment preferably all other (e.g. related) masks become fixed on said user's device and the user will not be able to remove them anymore, while according to second embodiment (e.g. said mask becomes fixed and) the user can proceed to remove another (e.g. related) mask.

Several exemplary degrees of security may be considered and/or applied to protect a content:

a) Low Protection: an authorized receiver may be permitted/enabled to remove a (e.g. related) mask, may take a screenshot of the screen and (e.g. then) may remove one or more other related masks. Note that in this example, the receiver may preferably be permitted to remove (e.g. by dragging) a same mask several times from a content. Preferably, after the/a mask is released by the receiver (e.g. by lifting his/her finger from the screen) the mask goes back to its original location on the content (e.g. by using the rubber concept/effect). Alternatively, the receiver may manually put/move back the mask at/to its original location.

b) Medium Protection: an authorized receiver may be permitted/enabled to remove a (e.g. related) mask but may not be permitted to take a screenshot of the screen. Note that in this example, the receiver may preferably be permitted to remove (e.g. by dragging) a same mask (e g several times) from a (e.g. protected) content. Preferably each time a mask is released, it may go back at its original location on the content as described herein. In this example, according to a preferred method, if the receiver takes a screenshot while a mask is removed, at least some, preferably all, of the related masks on his device and preferably on all other devices with which said content has been shared may become fixed (e.g. at their original location) (e.g. can no more be removed) preferably so as to hide the (e.g. keep the confidentiality of the (e.g. protected)) content and/by not letting users take screenshots of other portions of the protected content. This method permits to show a protected content to others but may hinder the spreading/delivering of the entire protected content to others, by not letting users take screenshots of the entire protected content.

c) High Protection: an authorized receiver may be permitted/enabled to remove (e.g. by dragging) a (e.g. related) mask only one time and preferably may not have permission to take a screenshot while a mask is removed. In this example, according to a preferred method, if the receiver takes a screenshot while a mask is removed, at least some, preferably all, of the related masks on the receiver's device and preferably on all other devices with which said content has been shared may become fixed (e.g. at their original location) and may no longer be removed so as to hide (e.g. keep the confidentiality of the (e.g. protected)) content and/by not letting users take screenshots of other portions of the protected content. This method does not permit to view the protected content for a second time therefore the protected content is highly protected against showing it to a third party by a receiver. In addition, this method hinders the divulgement and spread of the protected content to others by not letting users take screenshots of the entire protected content.

d) Super Protection: In addition to any of the methods of protection such as those described herein, if a mask is removed by a receiver more than a predefined laps of time from a protected content, said mask may be forced back/go back (e.g. automatically) to its original location and preferably at least some, preferably all, of the related masks on the receiver's device and preferably on all other devices with which said content has been shared may become fixed (e.g. at their original location) so that to keep the confidentiality of the (e.g. protected) content and/by not letting to take screenshots of other portions of the protected content.

e) Extreme protection: The receiver is not authorized to move any of the (e.g. related) masks.

According to one embodiment, if a user/owner desires to share a protected content having one or more (e.g. related) masks with others/receivers and authorize them to remove at least one preferably all of said masks as described herein, the owner of the content/masks may have a choice of levels of securities such as those described herein/above (e.g. preferably presented to the user in a list). According to a preferred aspect, the owner may select one of said choices for all of the receivers and share the content. According to another aspect, for each of the receivers the user may select (e.g. a different) one of said levels of security.

It must be noted that examples of protection described herein are exemplary and all other measures of protection may be used based on principles described. As an example, any of the methods of protection described herein may be combined with another method of protection such as those described herein.

Segmenting a content may be applied to any content, such as a text, at least part of an image (e.g. picture, video) etc., wherein at least some of the segments/portions of a segmented content may be covered by a (e.g. one or more) mask Note that the segments may preferably be ordered in some sequence. For example, typing a text may be made in several pieces in a sequence or it may be a one-piece text, wherein in either case several portions/segments of said text may respectively be covered by a (e.g. different) mask.

Some of the principles of protecting a content described herein are shown through exemplary FIGS. 112M to 112R. FIG. 112M, shows the screen 112200 of receiving party's device after receiving a content including a hidden message from a sender. In this example, the owner of the masks (e.g. the sender) has typed a phrase in three portions (e.g. hidden by masks) and put three masks 112201-112203 to cover them. The owner has authorized the receiving party to remove said masks one at a time. In FIG. 112N, the receiving party has removed/relocated (e.g. by dragging) the mask 112201 to see that underneath is written "see you" 112211. In this example, if the user moving the mask lifts the finger from the screen, the mask (e.g. automatically) goes back (e.g. by using a rubber effect animation) to its original location on the content and hides back the corresponding portion. In FIG. 112O, the mask 112201 is back on its original location and the user then was able to move another mask 112202 to see what is underneath of it (e.g. "tomorrow" 112212). In FIG. 112P, the mask 112202 is back on its original location and the user then was able to move another mask 112203 to see what is underneath of it (e.g. "at the theater" 112213). Preferably, at any moment while a mask is removed, if a user takes a screenshot, the system preferably fixes/freezes at least some, preferably all, of the masks at their original location and preferably will not allow to remove them anymore. By using this system of security/protection, a user can take the screenshot of only a portion of the protected content and therefore the entire content will be protected.

The principles described herein may be applied to any type of content. As an example, in FIG. 112Q, a receiver has received a picture of a group of users wherein their faces are being masked by the sender. In this example, the receiver of the content is permitted to move the masks as described in the previous example. As shown in the exemplary FIG. 112R, the user can move only one mask at a time, therefore protecting the content so that if the receiver takes a screenshot and shares it with other people, said other people cannot see the identity (e.g. face) of other people's faces in the picture.

Note that, any number of portions of a content may be masked by any number of masks. Also, any number of masks may be permitted to be removed at a time.

The solutions regarding the security of a shared content against screenshot described herein may be applied to hinder a content to be divulged using a camera (e.g. of another device) to take a picture of a/the screen (e.g. of a receiver's device) on which a protected content is displayed. As an example, upon removing a (e.g. related) mask and/or while a mask related to a portion of a protected content is removed (e.g. by an authorized receiver), a/the (e.g. front) camera (e.g. the camera which is located on the same surface as the screen) of the receiver's device on which the content is displayed may take one or more snapshots (e.g. or a video). Said Snapshots may be analyzed locally or remotely by a verifying system. Based on the results of the analysis of the snapshots (e.g. determining if presence of a suspicious device/image (e.g. in form of a camera, a smartphone, etc., (e.g. in front of the screen of the receiver device) is detected) and/or one or more other parameters (e.g. if an image other than (e.g. only) a face of a receiver/human (e.g. preferably close to the camera) is detected) the system may fix at least some preferably all of the masks related to the protected content on said receiver's device and preferably also on at least one, preferably all, of the receiving devices with which said protected content have been shared. Optionally, said snapshots may be transmitted to the owner of the mask to be viewed by the owner. If the owner detects/sees the presence of a suspicious device/image (e.g. in form of a camera, a smartphone, etc., in a received snapshot, said owner may remotely fix (e.g. freeze) at least some preferably all of the masks related to the protected content on said receiver's device and preferably also on all of the receiving devices with which said protected content have been shared.

Preferably, the main goal of the analysis of the snapshot/s is to determine if a camera (e.g. of another device) is being/may-be used to capture (e.g. the image of) the screen of a receiver's device via a snapshot while a (e.g. related) mask is removed from a portion of a protected content. If the answer is yes, the system may preferably force back the removed mask to its original location and preferably fix/freeze at least some, preferably all of the (e.g. related) masks on the receiver's device and preferably on at least one/some, preferably, all other devices with which said protected content is shared. In order to prevent a person/receiver to take a clear (e.g. not blurry) snapshot from the screen of a user's/receiver's device (e.g. while a mask is removed), one solution is to require the user/receiver to keep the screen of his/her device near (e.g. preferably, in front) of his/her face, otherwise a (related) mask cannot be removed (e.g. even if said user/receiver is an authorized receiver). In this case, if the user/receiver wants to use a camera (e.g. of another device) to take a snapshot of the screen of the screen of the receiver's device, either said camera (e.g. of another device) may be detected by the camera of the receiver's device or it may be in a position relating the screen of the receiver's device so that a snapshot of the screen of the receiver's device taken as such may not be clear (e.g. is most probably, blurry).

Preferably, upon and/or while a mask is removed and until said analysis is complete, all related masks on the receiver's device, and preferably on all other devices that received said content, are fixed/frozen. Preferably, all related masks may not be released until the results of the analysis is completed and/or received. Optionally, all related masks on the receiver's device, and preferably on all other devices that received said content, are fixed/frozen until said mask is returned back to its original location on the content.

The principles of protecting a content against access to the content by using a camera may preferably apply to, combined with (etc.), all of the principles (e.g. segmenting, using related masks, etc.), embodiments, security levels, etc., described herein.

Note that according to a preferred aspect, the sender/system may require that a user/receiver hold the screen of his/or her device in front of his/her (e.g. the receiver's) face preferably in and/or distance to enable the camera of the receiver's device to view the necessary elements such as fore example, the user's face, a suspicious device as described herein, etc. (e.g. a close position (e.g. at less than a predefined distance) or far position (e.g. more than a predefined distance)) upon or while a mask is removed (e.g. by the receiver), otherwise, preferably, the mask cannot be removed or may (e.g. immediately) go back to its original location (e.g. and optionally, become frozen). According to a preferred aspect, if a verifying system does not detect a human face (e.g. by using a face recognition/identification system), or preferably, more precisely, the user's/receiver's face (e.g. by using a face recognition/identification system), and/or the system detects a suspicious image such as an image resembling to a device such as a camera, a smartphone, etc. the system may preferably fix/freeze (e.g. preferably, at their original location) at least some (e.g. including the removed mask), preferably all, of the masks related to the protected content on said user's/receiver's device and preferably also on at least some, preferably all, of the receiving devices with which said protected content has been shared.

Note that fixing a mask described herein may preferably mean to (e.g. immediately) freeze a mask at its original location on a content (e.g. to hide the corresponding content) wherein said mask can no more be removed (e.g. unless upon a specific (re) authorization by the owner of the mask).

Note that in some embodiments of this application, the principles of hiding and/or unhiding and/or controlling at least a portion of a content have been described by using a means such as a mask (e g in form of emoji/s or in form of any other content). It is understood that such principles may use other means or no means to hide and/or to unhide said at least a portion of a content. As an example, a portion a content may be hidden or unhidden by respectively becoming invisible or visible to a user or vise versa (e.g. on a time basis). As an example, in the examples of FIG. 112M to 112P, instead of masking the chain of characters (e.g. the protected content) "see you", "tomorrow", and "at the theater", said chain of characters may be presented to a user preferably one at a time. As an example, when a receiver opens a shared protected content, at the beginning the words "see you" may become visible on the screen", then upon meeting a condition, such as after a predefined laps of time or upon a user's interaction, said words may disappear (e.g. become hidden) from the screen and the next portion (e.g. the word "tomorrow") may become visible on the screen, and so on for the next portion "at the theater". According to one method, at any moment while any of said chain of characters is visible on the screen, if a receiver takes a screenshot (e.g. or in the presence of a suspicious device such as a camera in front of the screen of the receiver's device), the rest of the chain of characters will no more be displayed on the screen of the receiver and preferably also at least some, preferably all, of said chain of characters will not become visible on the screen of any other user with which said content has been shared.

The principles of hiding and unhiding at least a portion of a content described herein may be applied to any content in any application. As an example, a content (e.g. a portion of a text) of an email application may be hidden or unhidden to a user (e.g. upon meeting one or more conditions).

According to one embodiment, a (e.g. frozen/fixed) mask may be defined (e.g. by an owner) to be removed automatically by the system or manually by a receiver at a predefined date and/or time (e.g. preferably for a predefined laps of time, after which the mask may preferably become frozen again). As an example, an owner of a content may hide (a portion) of a content and authorize one, more, or all users to remove the mask, upon accomplishment of a condition such as at a predefined date and time, for a predefined laps of time or for always. According to one method said mask may be removed automatically by the system upon accomplishment of a/said condition.

Note that the principles of protecting a (e.g. segmented) content, such as those described herein, may not be restricted to a receiving device. Such methods may be used to protect a content on any device such the/an owner's device.

According to one aspect, as mentioned before, at each different instance/time (e.g. only) a portion of a protected content may be displayed to a user. As an example, a scrolling method may (e.g. automatically) display a text on a the screen of the receiving device such that at any instance only a portion of said text is visible to the receiver. Note that the same method may be applied to view any content such as an image.

According to one embodiment, a user may provide a gliding action in a desired direction on a content and start typing. The corresponding text may preferably be positioned/shown in said direction on said content. Each such action may be considered as a portion/segment of a larger text.

By providing a sequence of such gliding actions and the corresponding typing actions, a segmented larger text (e.g. herein may be referred to as segmented text) may be created on a content. Said content may be shared with others in a messaging/sharing application such as those described herein.

According to one method, the segments of said segmented text may be presented (e.g. automatically or upon an (e.g. receiver's) action)) to the receiver one by one (e.g. one at a time). At any moment, if the receiver attempts to make a copy (e.g. by taking a screenshot or using a camera) of the screen, the system may preferably take any of the protecting actions as described herein.

According to one aspect, the status (e.g. fixed or removable) of a shared mask for each of the receivers may automatically or upon request be displayed on the screen of a receiving party. As an example, a small open or close lock icon on or related to a received mask may inform a receiving party who among the receiving parties can move said mask and who cannot. Optionally, the status (e.g. in form of a list) of a shared mask among a number of users may be presented to one or more, preferably all, of the receivers of said mask. As an example, if a mask is shared among four users the status of the mask for each of said users may be presented to at least one of said users (e.g. by displaying the identity (e.g. the name) of a/each of the user/s and an open lock icon (e.g. for an authorized receiver) or a close lock icon (e.g. for an unauthorized receiver) in front of the identity. According to one method, a predefined interaction such a long pressing action on a mask may present the status of a shared mask to a receiver.

According to a preferred aspect, if a receiver of a mask selects one or more of the users/receivers within (e.g. the/a list of) said status of a shared mask, a chat instance may be opened between said receiver and the selected users/receivers.

Note that a related content may be of any kind such as different portions of a message, different portions of an image, different portions of part of (e.g. image of a person) an image (e.g. at the beach).

Note that the security methods against screenshots and camera can be used separately or be combined together to secure a protected content.

Note that the principles of securing a content described herein may be applied to related and/or none related masks. For example, if a screenshot is taken while a related mask is removed from a (e.g. portion of a) content, at least some preferably all other masks (e.g. related and none related) on said content may become frozen (or vise versa).

Note that content may be audio, video, text, graphics, icons, Internet hyperlinks, or any other kind of content. In general, hiding of a related protected content may be the denial of access to said content by some form of authorization system. In general, the removing and/or unhiding of a related protected content may be the permitting of access to said content by some form of authorization system.

According to one embodiment, upon a user attempting to remove a related mask on a content, before said related mask is removed, preferably, an enquiry/check with a (e.g. remote) controlling system/registry may be carried out to determine if said user has permission to move said related mask. If the controlling system provides the user permission to remove said mask, the controlling system immediately (e.g. simultaneously) denies any other users permission to remove said mask, and optionally any other masks related to said content, preferably on all devices that received said content. Upon said mask returning to its original state (e.g. covering corresponding protected portion), said controlling system/registry is notified, and accordingly said system may immediately (e.g. simultaneously) return permission to other users to remove said mask/s of related content, preferably, unless a screenshot was taken and/or the presence of a suspicious devices such as a camera was detected as described herein.

According to one embodiment, a chatting/messaging system may be created such that a message may include a hidden and/or unhidden portion. As an example, a user may mask/hide or make invisible a portion of a (e.g. text) message he types/creates, and preferably permit the hidden/invisible portion to become unhidden/visible upon completion of at least one condition (e.g. to an authorized person, after a laps of time, for a laps of time, etc.). All of the principles of the content control system/application described herein may be applied with the current chatting/messaging system. As an example, a portion of a message may be masked and unmasked as described herein.

According to a preferred method, a portion of the message (e.g. a (portion) of a line of text, etc.) may become hidden or made invisible upon an interaction such as a sliding action provided on said portion. Preferably with the same manner (e.g. by sliding on the hidden/invisible portion) said portion of the message may become unhidden/visible.

Note that the messaging system may be an independent application or it may be part of the content editing and control application described herein. For example, in the content control application, such a text field (e.g. herein may be referred to as text box) may belong to (e.g. be part of or under control of) said application. As an example, FIG. 112S shows the main menu of a content control application. Said menu has a button 112400 related to a messaging system as described. Preferably, upon interaction with said button, a (e.g. large) text box (e.g. independently or above a main background content, etc.) may become available on the screen and a user may enter text in said text box. The user may hide/mask a portion said text and share said masked text with or without the main background content (e.g. as is) with other people and permit/authorize at least some said other people to unmask said content as described throughout this application. FIG. 112T, shows said shared content being unmasked by a receiving party.

Note that according to one method, the text box may be located on a background (e g main) content or it may not have a background content. Also note that, the text box may be shared as an editable text box so other people can respond within the same box, or it may not be editable (e.g. may be sent as an image (e.g. including its background content).

According to one method, at least a portion of a shared/sent/outgoing message may be encrypted/not-shown/masked (e.g. as described in detail herein) to one or more users among a number users with/to which a message/content is shared/sent.

Note that all of the principles of the data entry system described herein are used by the data entry system of the invention to predict/present words (e.g. to a user) upon receiving a sequence of interaction with the/a keyboard (e.g. of the invention) by a user for entering a word.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

For example, any other kind of keyboard having any number of keys, any kind of key/zone configuration, any type of keys (e.g. physical/hard keys, touch sensitive keys such as on-screen keys, combination of hard and touch sensitive keys, physical keys with touch sensitive surface, keys/zones dynamically (e.g. during interacting with a touch screen) defined, virtual keys interacted (from far) in the air, any size of keyboard, with any kind of configurations of symbols assigned to its keys, etc., may be used with the inventions, principles, aspects, embodiments, methods, etc., described herein.

Note that according to a general aspect, interacting with different keys/zone of any keyboard or any other input means of an input interface may provide corresponding different input signals. To each of at least some of said input signals a number of letters/characters of a language may ambiguously be assigned. By receiving a sequence of one or more such input signals the word predictive system of the invention may predict a word as described throughout this patent application.

For not frequently repeating the principles of the data entry system of the invention, in many paragraphs of this application there is mentioned that one or more symbol such as character/word/portion-of-a-word/function, etc., may be assigned to a key (e.g. or an object other than a key). It is understood that unless otherwise mentioned, said symbols, generally, are intended to be assigned to a predefined simplest interaction with said key which may be a single-pressing action on said key.

Note that although in some embodiments a sensitive surface such as a touch-sensitive pad or a touch screen have been used as examples, it is understood that any other technology detecting and analyzing a user's interaction with an object (e.g. from near or remotely) may be used to define interaction with a keyboard. For example, said technology may be an optically detecting technology, or an (e.g. infrared) IR technology, etc. detecting the user's finger/s touching a virtual keyboard or interacting with it from far (e.g. in the air).

It must be noted that at least one/some of principle, features, aspects, concepts, etc., described throughout this application may be combined together and used in any portion of the description of the invention herein to enhance the invention.

Note that any electronic device such as a mobile phone, tablet, smartwatch, etc. may be used by any of the inventions, concepts, aspects, principles etc. described within this patent application or with any other application and/or product.

Note that at least one or more of the inventions, concepts, aspects, principles etc. described within this patent application can be used separately or in combination within this patent application or with any other application and/or product.

Note that the keys/zones may be of any kind such as mechanical/hard, virtual/on-screen, pad, touch sensitive surface, etc., or combinations of them.

Note that any of the keyboards described herein are used to demonstrate the principles of the inventions described herein. Any other type of keyboard (e.g. soft, hard, etc.) having any number of keys/zones, any size, any key and/or characters configuration, etc. may be used with the inventions. As an example, the space key (e.g. 101308) and the 'dot' key (e.g. 101309) may be swapped in the keyboard of FIG. 101C or in any other keyboard. According to another example, the row of special symbols/functions keys (e.g. 101307, 101308, 101309) may have any number of keys and may be placed in any side of the keyboard or of the screen.

It must also be noted, that any of the systems, features, means, methods, etc., described in this patent application may be used separately or being combined with systems, features, means, methods, etc., of other different embodiments of the invention. Note that a keyboard may have any number of large zones (e.g. 1, 2, 3, or more).

It must be noted, that any of the systems, features, means, methods, etc., described in this patent application may be used separately or being combined with systems, features, means, methods, etc., of other different embodiments of the invention.

For example, the keys/zone of the keyboard may be defined dynamically when a user touches a location on the keyboard. In this case at least some of the characters near the user's finger impact on the keyboard define a (e.g. an ambiguous) key/zone. Said zone may preferably be horizontal zones (e.g. the characters in the corresponding horizontal direction are selected).

Note that although the term(s) keys/zones are used to describe providing input information for entering text, any other input means may be used for the same. In general, the system may receive a sequence of at least one input signal ambiguously corresponding to a group of characters and/or precisely corresponding to an identified character from any input means to predict a word.

Note that any of the data entry systems and/or input means described in this application may be applied to and/or integrated with devices with screens of any size such as a smartwatch, a smartphone, a tablet, and devices with larger screens.

Note that all principles, methods, systems, embodiments, features, functions, etc. described in this application are not limited to the examples described herein. They may be used for a broader purpose. For example, if in an embodiment, a small window is used to remove and/or display a keyboard on the screen, said small window and the corresponding principles may be used for any other purpose such as displaying and/or removing any other interface/content, executing and stopping the execution of a function, etc. Note that according to one aspect the keyboard may include any number of large zones each including any number of small zones.

According to one method, a (e.g. incoming) message may be presented in an (e.g. automatically, linear) scrolling manner.

Note that the history window, at any moment, may present a portion of any (e g main) text field that is interactable and/or interacted by a user.

Note that preferably the keyboard and/or its corresponding features (e.g. the history window) may operate with different/any contents.

It must be noted that in some portions of this application an invention may be described by referring to a specific content and/or function, it is understood that any other content and/or function may be used with any invention described herein.

The invention claimed is:

1. A system comprising:
   a keyboard having a plurality of horizontal rows of letter keys divided into a left large zone and a right large zone, wherein each of said large zones is divided into a plurality of small zones and wherein each of the small zones comprises a plurality of letter keys of the corresponding row of letter keys; and
   a processor executing a word predictive software for:
   assigning an error value to each of at least some of the letter keys of a large zone when an interaction with said large zone is detected, wherein the error value of a letter key of an interacted small zone corresponding to said interaction with the large zone is calculated based on a distance of said letter key from an interaction point corresponding to said interaction with said large zone and wherein an error value of a letter key of another small zone of the interacted large zone is calculated based on a distance of said letter key of said another small zone from said interaction point in addition to a penalty value wherein said penalty value is regardless of the distance of said letter key of said another small zone from said interaction point, and
   predicting at least one word from a database of words based on a sum of error values corresponding to a sequence of interactions provided by a user with the large zones.

2. The system of claim 1, wherein each of said large zones is divided into three small zones and wherein each of the small zones includes a number of letter keys of a different row of letter keys of said horizontal rows of letter keys.

3. The system of claim 1, wherein, among a plurality of predicted words, the system gives priority to a word that has a lowest sum of error values.

4. The system of claim 1, wherein said keyboard is one of a QWERTY, a QWERTZ, and an AZERTY keyboard.

5. The system of claim 1, wherein said keyboard is one of a QWERTY, a QWERTZ, and an AZERTY keyboard and wherein said left large zone comprises four leftmost letter keys of each of the rows of letter keys of said keyboard and wherein said right large zone comprises a rest of the letter keys of said keyboard.

6. The system of claim 1, wherein said keyboard has a slightly modified QWERTY letter key layout in which letter keys O and L are swapped and wherein a rest of the letter keys of the keyboard are located at their conventional locations within said QWERTY letter key layout.

* * * * *